United States Patent
Baker

(10) Patent No.: US 7,076,730 B1
(45) Date of Patent: Jul. 11, 2006

(54) ELECTRONIC MAIL SOFTWARE WITH MODULAR INTEGRATED AUTHORING/READING SOFTWARE COMPONENTS

(75) Inventor: Michelle Baker, New York, NY (US)

(73) Assignee: Intellinet, Inc., New York, NY (US)

( * ) Notice: Subject to any disclaimer, the term of this patent is extended or adjusted under 35 U.S.C. 154(b) by 488 days.

(21) Appl. No.: 09/209,162

(22) Filed: Dec. 10, 1998

(51) Int. Cl.
*G06F 7/00* (2006.01)

(52) U.S. Cl. .................. 715/526; 715/752; 709/206

(58) Field of Classification Search ............. 707/526, 707/530–531; 709/206; 395/752; 715/526, 715/530–531, 752
See application file for complete search history.

(56) References Cited

U.S. PATENT DOCUMENTS

| | | | |
|---|---|---|---|
| 5,117,354 A | 5/1992 | Long et al. ................ 364/401 |
| 5,452,289 A * | 9/1995 | Sharma et al. ............. 370/286 |
| 5,471,470 A * | 11/1995 | Sharma et al. ............. 370/271 |
| 5,508,817 A | 4/1996 | Kunigami .................. 358/402 |
| 5,706,434 A * | 1/1998 | Kremen et al. ............. 709/218 |
| 5,710,883 A * | 1/1998 | Hong et al. ................ 709/246 |
| 5,734,901 A | 3/1998 | Sidhu et al. ............... 395/680 |
| 5,793,497 A | 8/1998 | Funk ........................ 358/402 |
| 5,805,811 A | 9/1998 | Pratt et al. ............. 395/200.36 |
| 5,818,447 A | 10/1998 | Wolf et al. ................ 345/335 |
| 5,826,269 A | 10/1998 | Hussey ...................... 707/10 |
| 5,835,769 A * | 11/1998 | Jervis et al. ............... 717/1 |
| 5,860,068 A | 1/1999 | Cook ........................ 705/26 |
| 5,867,281 A | 2/1999 | Nozoe et al. ............... 258/402 |
| 5,889,518 A * | 3/1999 | Poreh et al. ............... 345/340 |
| 5,890,139 A | 3/1999 | Suzuki et al. ............... 705/27 |
| 5,906,656 A | 5/1999 | Keller et al. ............... 709/200 |
| 5,923,848 A | 7/1999 | Goodhand et al. .......... 709/219 |
| 5,956,486 A | 9/1999 | Hickman et al. ........ 395/200.36 |
| 5,974,416 A * | 10/1999 | Anand et al. ............... 707/10 |
| 5,974,449 A | 10/1999 | Chang et al. ............... 709/206 |
| 5,995,756 A * | 11/1999 | Herrman ..................... 395/712 |
| 6,014,688 A * | 1/2000 | Venkatraman et al. ....... 709/206 |

(Continued)

OTHER PUBLICATIONS

Netscape Communicator 6-in-1, Guildford, Macmillan Comp. Pub., p. 218-223, 259-262, 264-268, Jul. 11, 1997.*

(Continued)

*Primary Examiner*—C. B. Paula
(74) *Attorney, Agent, or Firm*—Gordon & Jacobson, P.C.

(57) ABSTRACT

Electronic mail software includes a main email component and a number installable components. The installable components include authoring/reading components for creating/reading different kinds of documents and mailbox components for listing different kinds of messages or for listing messages in different styles. The main email component provides an underlying graphical user interface for functions directly associated with the storage and transfer of electronic mail messages, and also handles all data bundling and unbundling required to transform a message created by an authoring component into a MIME compliant message. The authoring/reading components act like applications embedded within the email program and allow specific types of documents such as spreadsheets, graphics, databases, etc. to be created from within the email program and emailed directly. The authoring/reading components also allow received documents to be read without the difficulties traditionally associated with attaching binary files to an email letter. The authoring components of the invention pass data to the main email component which packages the data as a MIME compliant message. When the message is received, the main email component concatenates and decodes the MIME message and sends the data to the authoring/reading component associated with the MIME type.

25 Claims, 19 Drawing Sheets

U.S. PATENT DOCUMENTS

| | | | | |
|---|---|---|---|---|
| 6,035,327 | A | 3/2000 | Buckley | 709/206 |
| 6,065,056 | A * | 5/2000 | Bradshaw et al. | 709/229 |
| 6,223,213 | B1 * | 4/2001 | Cleron et al. | 709/206 |
| 6,252,588 | B1 * | 6/2001 | Dawson | 345/752 |
| 6,275,849 | B1 * | 8/2001 | Ludwig | 709/201 |
| 6,377,978 | B1 * | 4/2002 | Nguyen | 709/206 |

OTHER PUBLICATIONS

Internet Explorer 4 6-in-1, Fleming, Macmillan Comp. Pub., p. 182-185, 201-205, 210-217, 265-271, Nov. 3, 1997.*

Microsoft Outlook E-Mail & Fax Guide, Mosher, S., Dec. 1, 1997, 29th Street press, p. 1-4, Fig. 18.5.*

Carlson, C., Graphic E-Mail 1.1c, 1996, p. 1-34.*

The American Heritage Dictionary, Second College Edition, 1982, p. 302.*

The American Heritage Dictionary, Second College Edition, 1982, p. 1234.*

"Eudora extended message Services API Version 3", Lundblade and Blumin, QUALCOMM Incorporated, 1996, pp. 1-18.

"Surf Monkey -Email",:web site: at http://www.surfmonkey.com/quick_tour/qt_email.html, 1998, pp. 1-4.

"Sony Post Pet", at website: http://www.sony.com.sg/postpet/ 1998, pp. 1-5.

"Guide to Software for Email Correspondence Chess" by John H. Mongle, Feb. 1, 1998, at website:http:/www.chessmail.com/mongle.htm, pp. 1-7.

Borenstein, N. et al. *RFC 1521: MIME (Multipurpose Internet Mail Extensions) Part One: Mechanisms for Specifying and Describing the Format of Internet Message Bodies*. Bellcore. Sep. 1993. http://www.ietf.org/rfc/rfc1521.txt,82 pages.

Crocker, David H. et.al. *RFC 822: Standard for the Format of ARPA Internet Text Messages*. University of Delaware. Aug. 13, 1982. http://www.ietf.org/rfc/rfc0822.txt?number=822 53 pages.

Palme, J. and Hopmann, A. *RFC 2110: MIME E-mail Encapsulation of Aggregate Documents, such as HTML (MHTML)*. Stockholm University (Palme) and Microsoft Corporation (Hopmann). Mar. 1997. http://www.ietf.org/rfc/rfc2110.txt, 20 pages.

Postel, Jonathan B. *RFC 821: Simple Mail Transfer Protocol*. University of Southern California. Aug. 1982. http://www.ietf.org/rfc/rfc0821.txt, 74 pages.

From the Internet: MAPI, SAPI, and TAPI Developer's Guide by Michael Amundsen, Chapter 3, "What is MAPI?", Sams, MacMillan Computer Publishing, Oct. 3, 1996, 7 pages.

From the Internet: MAPI, SAPI, and TAPI Developer's Guide by Michael Amundsen, Chapter 5, "Using the Microsoft Exchanger Forms Designer", Sams, MacMillan Computer Publishing, Oct. 3, 1996, 23 pages.

From the Internet: MAPI, SAPI, and TAPI Developer's Guide by Michael Amundsen, Chapter 7, "Creating a simple MAPI Client with MAPI Controls", Sams, MacMillan Computer Publishing, Oct. 3, 1996, 23 pages.

From the Internet: MAPI, SAPI, and TAPI Developer's Guide by Michael Amundsen, Chapter 8, "The OLE Messaging Library", Sams, MacMillan Computer Publishing, Oct. 3, 1996, 43 pages.

* cited by examiner

ELECTRONIC MAIL SOFTWARE WITH MODULAR INTEGRATED AUTHORING/READING SOFTWARE COMPONENTS

This invention was made with Government support under SBIR Grants Nos. 9561725 and 9710619 awarded by the National Science Foundation. The Government has certain rights in this invention.

BACKGROUND OF THE INVENTION

1. Field of the Invention

The invention relates to an electronic mail program. More particularly, the invention relates to an electronic mail program having modular integral authoring/reading applications whereby documents created with the modular integral authoring/reading applications are seamlessly sent and received by the mail program.

2. State of the Art

In recent years electronic mail ("email") has become widely used in business, education, and in personal communications. One of the features of electronic mail which is most convenient, particularly in business and in education, is the ability to attach a binary computer file to an email message. This feature enables email correspondents to rapidly share word processing documents, database documents, spreadsheet documents, multimedia documents, or virtually any kind of binary file created by a computer. There are, however, some serious limitations and inconveniences associated with attaching a binary file to an email message.

The original Internet mail system as defined in 1982 with RFC (Request for Comments) 821 and 822 had a number of important limitations. In particular, the system was not designed to carry large quantities of arbitrary data in an email message. In fact, the 1982 SMTP (Simple Mail Transport Protocol) standard required that an email message consist of a single message containing only ASCII characters in lines of 1000 characters (blocks of 32 k) or less. Moreover, some implementations of SMTP or other mail transport systems (such as UUCP) restricted message lengths to some allowed maximum number of bytes. Messages passing through a mail gateway using one of these implementations were likely to be truncated.

The ability to send large quantities of binary data through the Internet electronic mail system was made possible with the MIME (Multipurpose Internet Mail Extensions) standard for Internet messages. The original MIME standard was published as an Internet Request For Comments document (RFC 1341) and approved in June of 1992. (See Internet RFCs 2045, 2046, and 2047 for the latest MIME standards documents.) The MIME standard describes how an email message should be formatted in order to be considered MIME compliant. MIME defines a set of message header fields and a set of message encoding standards that are designed to overcome the limitations of RFC 822 message formats and still be transportable through any of the numerous legacy mail transport systems in use on the Internet. MIME message header fields extend those defined in RFC 822 and describe the content and encoding type of the email message. Encoding schemes allowed in the MIME standard include "quoted-printable", and "base64". In addition, three unencoded data types are allowed. These are labeled "8 bit", "7 bit", or "binary".

If the sender and the receiver of the email message with the attached binary file are using the same brand and version of email program and both programs are configured in substantially the same way, the receiver's email program should automatically apply the appropriate decoding to the attached binary file and produce a file which is identical to the file which was attached to the email by the sender. However, if the sender and receiver are using different email programs, the recipient may receive a file which must be decoded by the recipient using a separate decoding program. Worse yet, if there is a failure of the receiving email program to properly deal with the MIME protocol, it is possible that the receiver will receive multiple files (each being $\leq 32$ k) which must first be concatenated and then decoded.

Even after the file is properly received and decoded, it is often difficult for the receiver of the file to open the file. The receiver of the file might expect that "clicking" on the file icon will open the file. However, clicking on the file icon will often not open the file. It may result in an error message like "application not found" or, worse, it may result in the file being opened by an inappropriate application thereby displaying "gibberish". The receiver of the file must have a program capable of reading (opening) the file. For example, if one attaches a spreadsheet file to an email message, the receiver of the file must have a spreadsheet program in order to open the file. Technically, it is not necessary that the receiver of the file have the same brand program as that which created the file. However, opening a file with a program which did not create it, though possible, can be very inconvenient. The receiver of the file must know what kind of file is attached to the email message, must know what program on their computer is capable of reading that type of file, must launch the program, must open the file from within the program, and wait while the program translates the file.

The limitations of Internet electronic mail can become even more frustrating if the sender and recipient are not using the same operating system (OS). Some mail attachment encoding schemes (and file compression schemes) are OS-dependent and it is possible that an email recipient could receive a file which is impossible to decode (or decompress).

These limitations in electronic mail have discouraged many people, particularly non-sophisticated computer users, from attaching files to electronic mail messages. In fact, for some novice users, the task of launching one application to create a document, saving the document, launching a separate email application to create an email message, and then locating the saved document for attachment to an email message is daunting enough to discourage them. In addition, novice users often complain that after "downloading" a file attached to an email message they cannot find the file on their hard disk.

SUMMARY OF THE INVENTION

It is therefore an object of the invention to provide an electronic mail program which includes integrated authoring software whereby a document may be created and sent by email in a seamless manner.

It is also an object of the invention to provide an electronic mail program which includes integrated authoring/reading software whereby a document may be received and opened in a seamless manner.

It is another object of the invention to provide an electronic mail program which includes modular integrated authoring software whereby different kinds of documents may be created and sent by email in a seamless manner.

It is still another object of the invention to provide an electronic mail program which includes modular integrated authoring/reading software whereby different kinds of documents may be received and opened in a seamless manner.

It is another object of the invention to provide an electronic mail program which includes modular integrated authoring/reading software whereby the authoring/reading software and the email software present an interface which suggests that a single application is operating.

It is another object of the invention to provide an electronic mail program which includes modular integrated mailbox handling software whereby messages of different types are displayed in different ways in a mailbox listing.

It is still another object of the invention to provide an electronic mail program which includes modular integrated authoring/reading software wherein the functionality of the authoring/reading software is controlled by the "role" of the user when participating in an exchange of messages.

In accord with these objects which will be discussed in detail below, the electronic mail software of the present invention includes a main email component and a number of installable components which communicate bidirectionally with the email component. The installable components include authoring/reading components as well as at least one mailbox browser/editor component. The main email component provides an underlying graphical user interface (GUI) for functions directly associated with the storage and transfer of electronic mail messages. In particular, the main email component provides menu items which allow the user to SEND, READ, REPLY, FORWARD, DELETE, SAVE, PRINT, for example. The main email program also handles all data bundling and unbundling that may be required to transform a message created by an authoring component into a fully MIME compliant message. In addition, the main email component includes "hooks" (an application programming interface or API) for the attachment of the installable components. The authoring/reading components each provide functionality which is particular to the type of document the component is designed to create/display. For example, a text document authoring component includes word processing functionality such as font selection, margin setting, etc. A painting/drawing authoring component includes tools for line drawing, polygon creation, paint brush, paint can, eraser, etc. A spreadsheet authoring component displays a grid and includes formula creation tools as well as formatting tools. A database authoring tool includes tools for creating fields and records, for sorting and searching, for generating reports, etc. A photo editor authoring component includes various imaging editing tools including cropping tools, dodging and burning tools, filters, etc. A presentation authoring component includes tools for creating slides and slide shows. The authoring components act like applications embedded within the email program and allow specific types of documents such as spreadsheets, graphics, databases, etc. to be created from within the email program and emailed directly. In addition, the authoring components allow received spreadsheets, graphics, databases, etc. to be read by the email program without the difficulties traditionally associated with attaching binary files to an email letter. According to the invention, in lieu of authoring components which allow both authoring and reading, separate components may be provided for authoring and reading, or components for reading only may be provided in addition to components which permit authoring as well as reading. The authoring/reading components interface with the main email component via designated "MIME types". The MIME data standard allows developers to define MIME types using the label "/application-x" in the data header. The authoring components of the invention pass data to the main email component which packages the data as a MIME compliant message with the label "/application-x" in the message header, where x identifies the authoring/reading component which created/can display the message. When the message is received, the main email component concatenates and decodes the MIME message, reads the MIME type, sends the data to the component associated with the MIME type, and waits for a user event or a callback from the component. This bidirectional communication between the main email component and the authoring/reading components provides a totally seamless operation wherein the user may send and receive complex documents without any knowledge of attaching files, downloading, decoding, etc.

The mailbox browser/editor (mailbox handler) component is provided preferably as a separate component rather than as part of the main email component so that the software may be more easily customized and upgraded. The mailbox browser/editor component is used to display, edit, and browse mailboxes. Since the invention provides for email messages which contain different kinds of data, the features of the mailbox browser may depend on the type of messages being sent and received. For example, if a graphical authoring/reading component is installed, it may be desirable to provide a mailbox browser which shows a thumbnail of the selected graphic email message when a list of messages is displayed.

The software according to the invention provides a single seamless environment for authoring, reading, and emailing a variety of different types of documents. The user does not need to understand uploading, downloading, file types, file decoding, or any of the other esoteric requirements of attaching files to email. Further, the user does not need to know what kind of application must be launched in order to read a particular type of email message.

An exemplary embodiment of the invention is an email program for school children called KIDCODE®. The KIDCODE® program includes a main email component, a mailbox browser/editor component and several message authoring/reading components. The main email component and the mailbox browser/editor component provide the same functionality as described above. Additional KIDCODE® components include a text authoring tool, rebus game message handler components (encoding and decoding components) which allow children to create and respond to graphical rebus messages, several different game puzzle components, and a workbook which allows a teacher to send workbook problems to a student and allows the student to send the solved problems back to the teacher. According to one inventive aspect of the invention which is exemplified in the workbook and rebus components, an authoring/reading component may assign and track user "roles" by associating a role tag to each message. For example, in the rebus component, the user initiating the rebus exchange will be assigned the role of rebus encoder. The message created by this user will contain a tag identifying it as an "encoded message". When the message is opened by the recipient, the tools available in the rebus component will be different from those available if a message were being encoded. Similarly, the workbook component is preferably provided with a teacher role and a student role, each of which have different tools. Component roles may be selected by the users, assigned by the system administrator, or automatically by components when messages are created/read.

According to a presently preferred embodiment, the KIDCODE® client software is written in the MACROMEDIA DIRECTOR™ LINGO™ scripting language which is cross-platform and thus ideally suited for use in schools which typically have a combination of MAC/OS™ and WINDOWS™ computers. As implemented, the client software operates over a TCP/IP LAN which is the most common type of network used in schools today and is compatible with the Internet. According to a further implementation of the invention, KIDCODE® software permits messages to be sent via the Internet in MIME compliant format.

Additional objects and advantages of the invention will become apparent to those skilled in the art upon reference to the detailed description taken in conjunction with the provided figures.

BRIEF DESCRIPTION OF THE APPENDICES

Appendix A is the LINGO™ script implementation of the KIDCODE® main email component;

Appendix B is the LINGO™ script implementation of the KIDCODE® mailbox handler component;

Appendix C is the LINGO™ script implementation of the KIDCODE® text authoring/displaying component;

Appendix D is the LINGO™ script implementation of the KIDCODE® rebus game coding/decoding component;

Appendix E is a description of the Application Programming Interface for the KIDCODE® main email component which enables installable components to operate with the main email component; and Appendix F is a description of and pseudocode for the Internet implementation of the KIDCODE® software.

DETAILED DESCRIPTION OF THE PREFERRED EMBODIMENTS

As mentioned above, a presently implemented embodiment of the invention is realized utilizing the MACROMEDIA DIRECTOR LINGO™ scripting language. The DIRECTOR™ application was originally intended to be used for authoring interactive multimedia presentations. Therefore, many of the terms used in the LINGO language refer to multimedia objects such as movies, cast members, frames, and sprites. However, it has been found that the LINGO™ language can be used to author many different types of programs including programs which were not traditionally thought of as being multimedia presentation programs. The following description, therefore, of the presently implemented embodiment will be best understood by those familiar with the MACROMEDIA DIRECTOR LINGO™ scripting language. However, those skilled in the art will understand from the functional description which follows that the invention could be implemented in other languages such as C or C++, JAVA™, etc.

Figure 1:
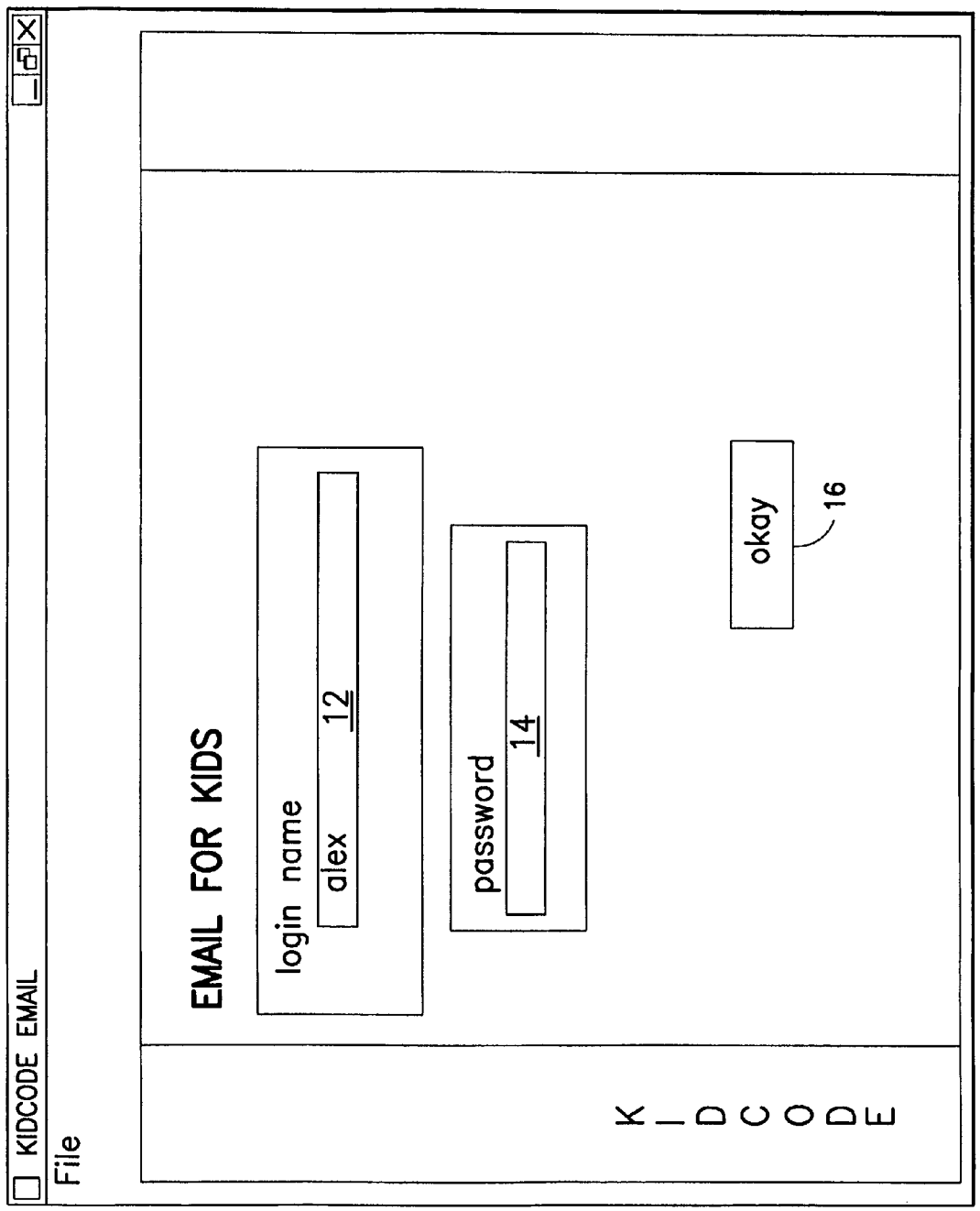
FIG. 1 is a screen shot of the KIDCODE® client login screen.
Figure 1A:
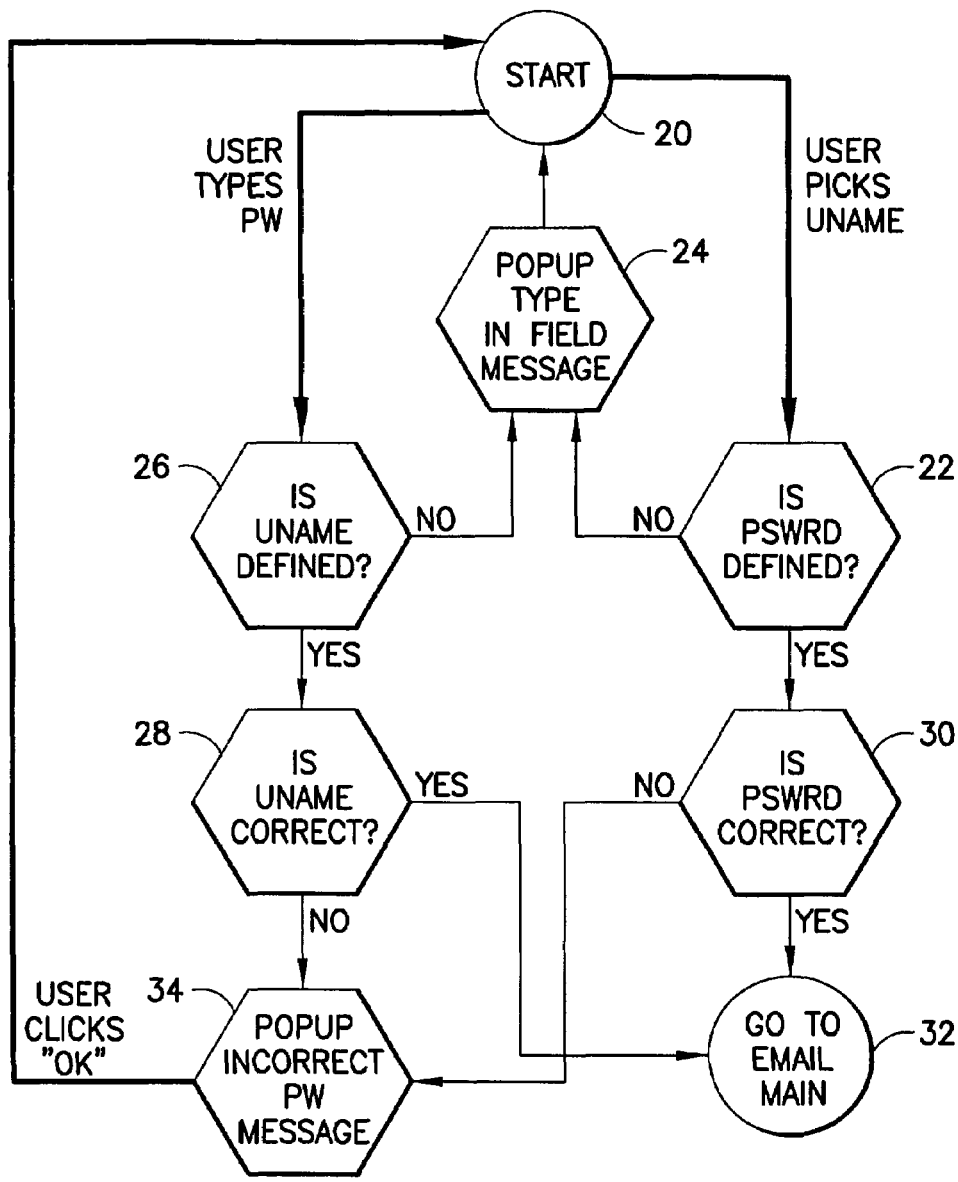
FIG. 1a is a simplified state diagram illustrating the entry from the login screen to the main email component of the KIDCODE® software.

Referring now to FIGS. 1 and 1a, and with reference to Appendix A, the first screen 10 presented by the KIDCODE® program is preferably a login screen where the user enters his or her name and password. According to the presently preferred embodiment, the login name field 12 is implemented as a popup menu (or pull down list box) and the password field 14 is a standard text entry field. See, for example, lines 172–190 of Appendix A. Clicking on the login name field will make a list of names appear and allow the user to highlight one of the names using the mouse. After the user has selected a name and typed in a password, the Okay button 16 must be clicked, or the Return or Enter key may be pressed. See Appendix A, lines 796–846 and lines 879–899. At this screen 10, the only option available under the FILE menu is QUIT. According to the presently preferred embodiment, the usernames and passwords are stored in associative (two property) lists so that a password may be associated with a username and a username may be associated with a password. When the okay button is clicked, the software checks the validity of the username and password. The checking of the username and password is illustrated in the state diagram in FIG. 1a. Starting at 20 in FIG. 1a, if the user selects a username and clicks the okay button, the password field is checked at 22. If no password was entered, a popup message is displayed at 24 indicating to the user that a password must be entered and the system returns to start at 20 waiting for the user to click the okay button. If the user types in a password and clicks the okay button, the username field is checked at 26. If no username was selected, a popup message is displayed at 24 indicating that a username must be selected and the system returns to start at 20 waiting for the user to click the okay button. If the user types in a password and selects a username, it is determined at 28 or 30 whether the username and password match, and if they do, the software enters to the main email component at 32. If the username and password do not match, a popup message is displayed at 34 indicating that the password entered is invalid for the username selected and the system returns to start at 20 waiting for the user to click the okay button. If the username and password are that of the system administrator, a special administration display will be shown in which usernames and passwords may be added/deleted to/from the system. See Appendix A lines 858–875, 900–1016, and 1123–1140.

Figure 2:
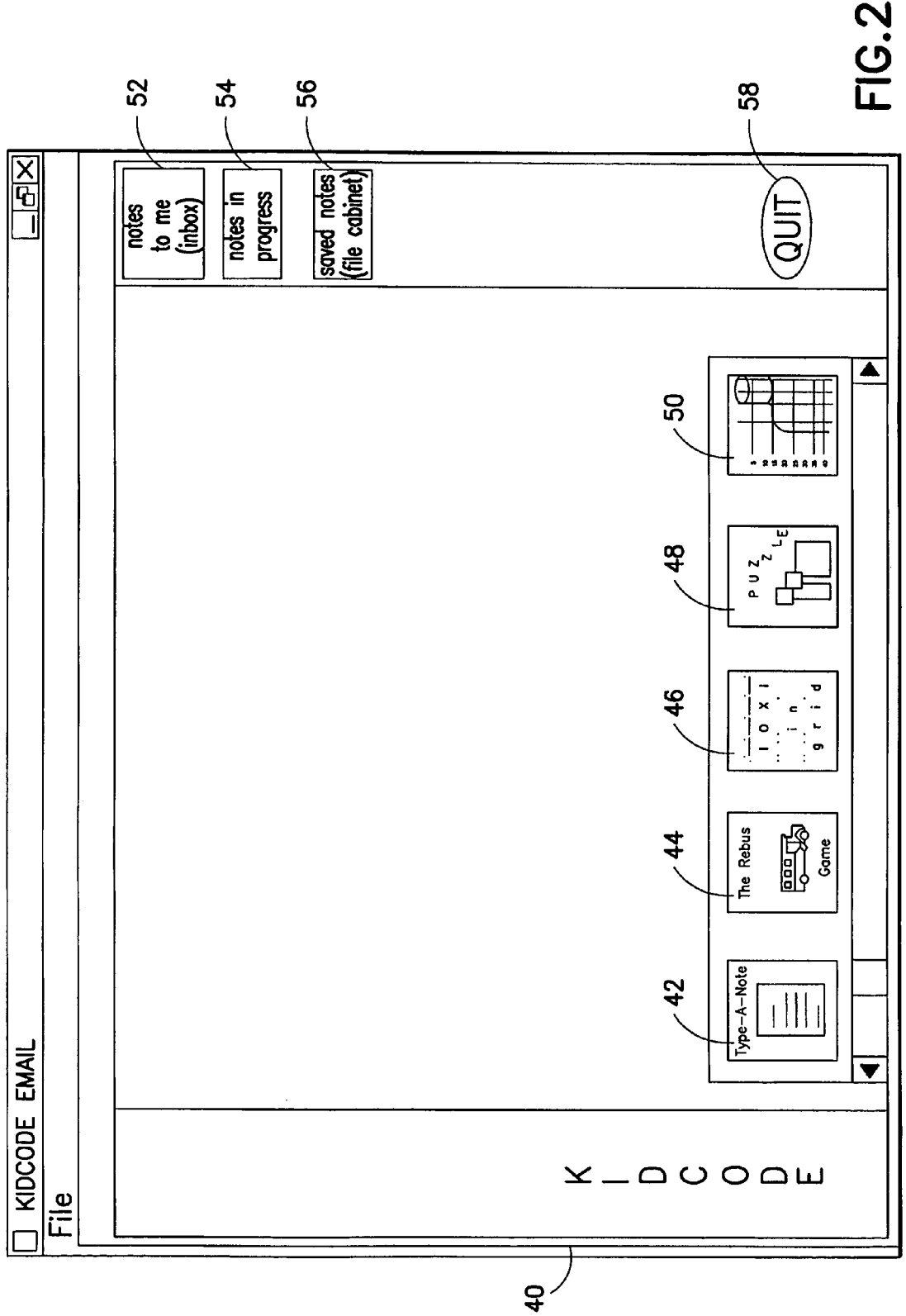
FIG. 2 is a screen shot of the KIDCODE® main email component screen showing a menu of the installed authoring/display components and the mailbox browser component.
Figure 2A:
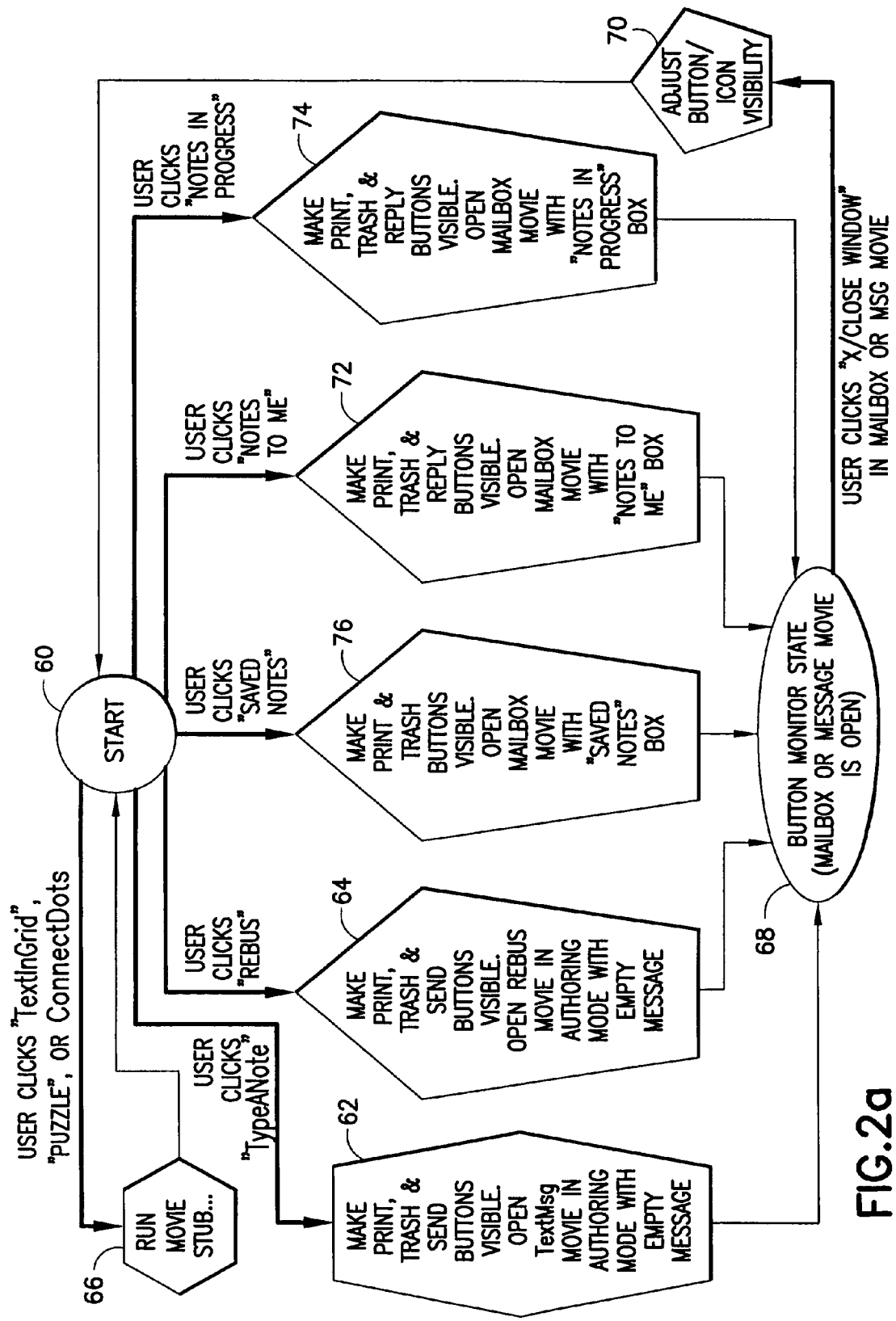
FIG. 2a is a simplified state diagram illustrating the entry from the main email component into the installed components.

Turning now to FIGS. 2 and 2a, once the user has selected a username and entered the correct password, the program displays the screen 40 shown in FIG. 2 (Appendix A lines 851–855). This is the screen of the main email component with no other component selected. The screen 40 includes a scrollable collection of icons 42, 44, 46, 48, 50 and includes buttons 52, 54, 56 for mailbox access and button 58 to quit the program. The icons 42, 44, 46, 48, and 50 represent the installed authoring/reading components. As shown in FIG. 2, the icons represent a text component 42, a rebus component 44, a "text in grid" component 46, a puzzle component 48, and a "connect the dots" component 50. As illustrated in FIG. 2a, starting at 60, if the user clicks on the text icon, the program will, at 62, open the text authoring component with an empty message (Appendix A lines 1422–1438 and 1025–1054). Similarly, if the user clicks on the rebus icon, the program will, at 64, open the rebus authoring component with an empty message (Appendix A lines 1442–1458 and 1025–1054). The main email component will also, when an authoring component is opened, make the print, trash, and send buttons visible as these functions are served by the main email component as illustrated in FIG. 2a (Appendix A lines 489–526 and 1456). Since the presently implemented example does not yet have all components complete, the launching of other components is shown generically at 66 in FIG. 2a. When a component is launched, the main email program suspends execution at 68 awaiting any "call back" from the launched component. The API described in Appendix E includes a set of "call back" functions that can be used by an authoring or mailbox component to communicate with the main email component. See Appendix E pages 4–7 and Appendix A lines 557–744. Further, the main email component serves the email functions of inbox, outbox, and filing cabinet for messages that have not been sent. These functions are illustrated in FIG. 2 as buttons 52, 54, 56 and in FIG. 2a as routines 72, 74, 76.

Figure 3:
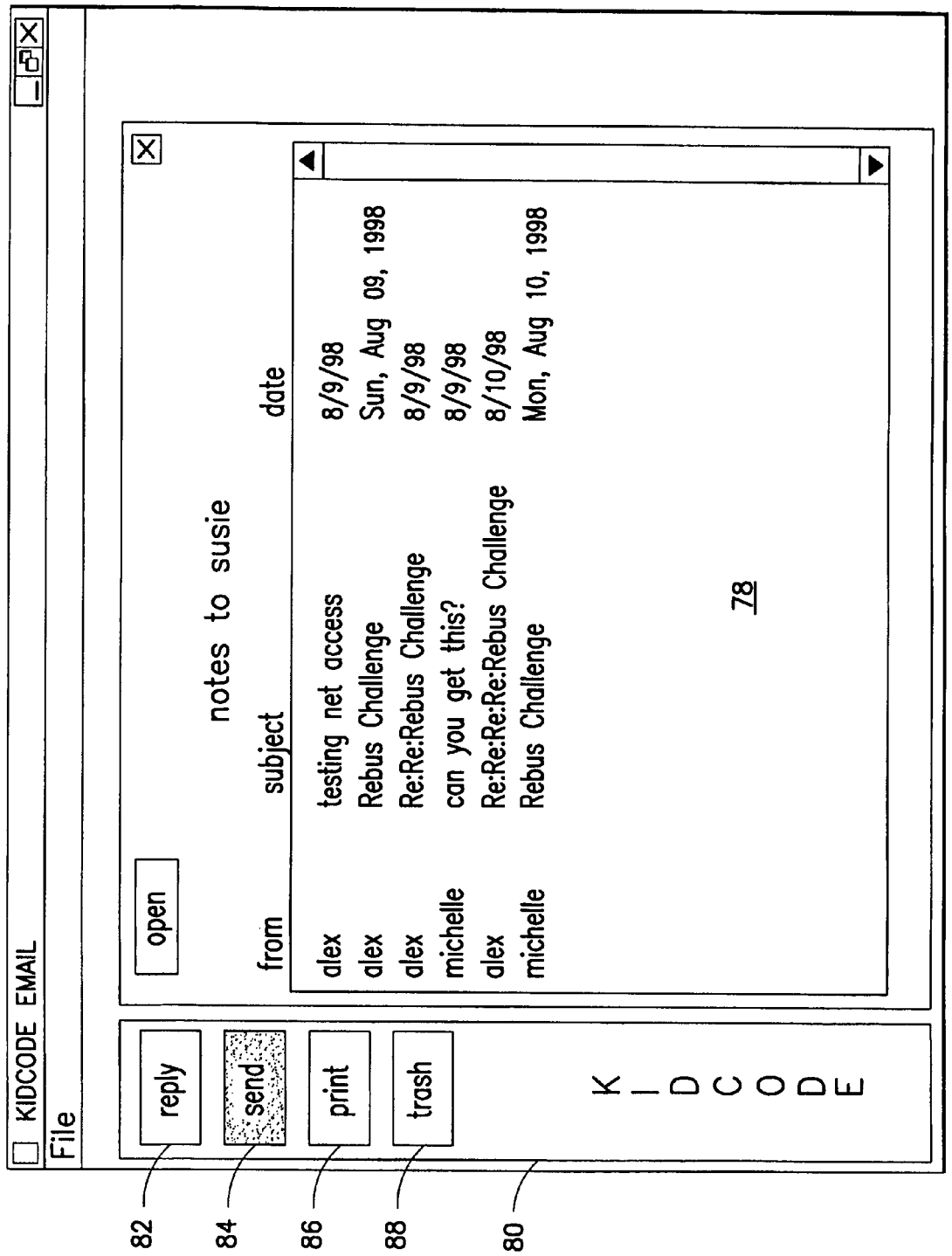
FIG. 3 is a screen shot of the KIDCODE® mailbox browser/editor component screen.

For example, as shown in FIG. 3, when the user enters the inbox, a window 78 and a button bar 80 are displayed. The mailbox component with the appropriate set of messages is launched as shown in Appendix A lines 1533–1558 and 216–247). The window 78 displays a list of new email and the button bar 80 displays buttons for functions common to all components, i.e. buttons for reply 82, send 84, print 86, and trash 88. It will be understood that depending on whether the user is in an authoring or reading mode, either the reply button 82 or the send button 84 will be "grayed out" indicating that that option is not available. As shown in FIG. 3, for example, the send button 84 is not available when looking at the mail inbox. It will also be appreciated that the buttons and icons from the previous screen (FIG. 2) are no longer visible. As stated in FIG. 2a, the user returns to the screen of FIG. 2 when the window 78 is closed. Appendix B lines 440–448 and Appendix A lines 735–744.

Figure 4:
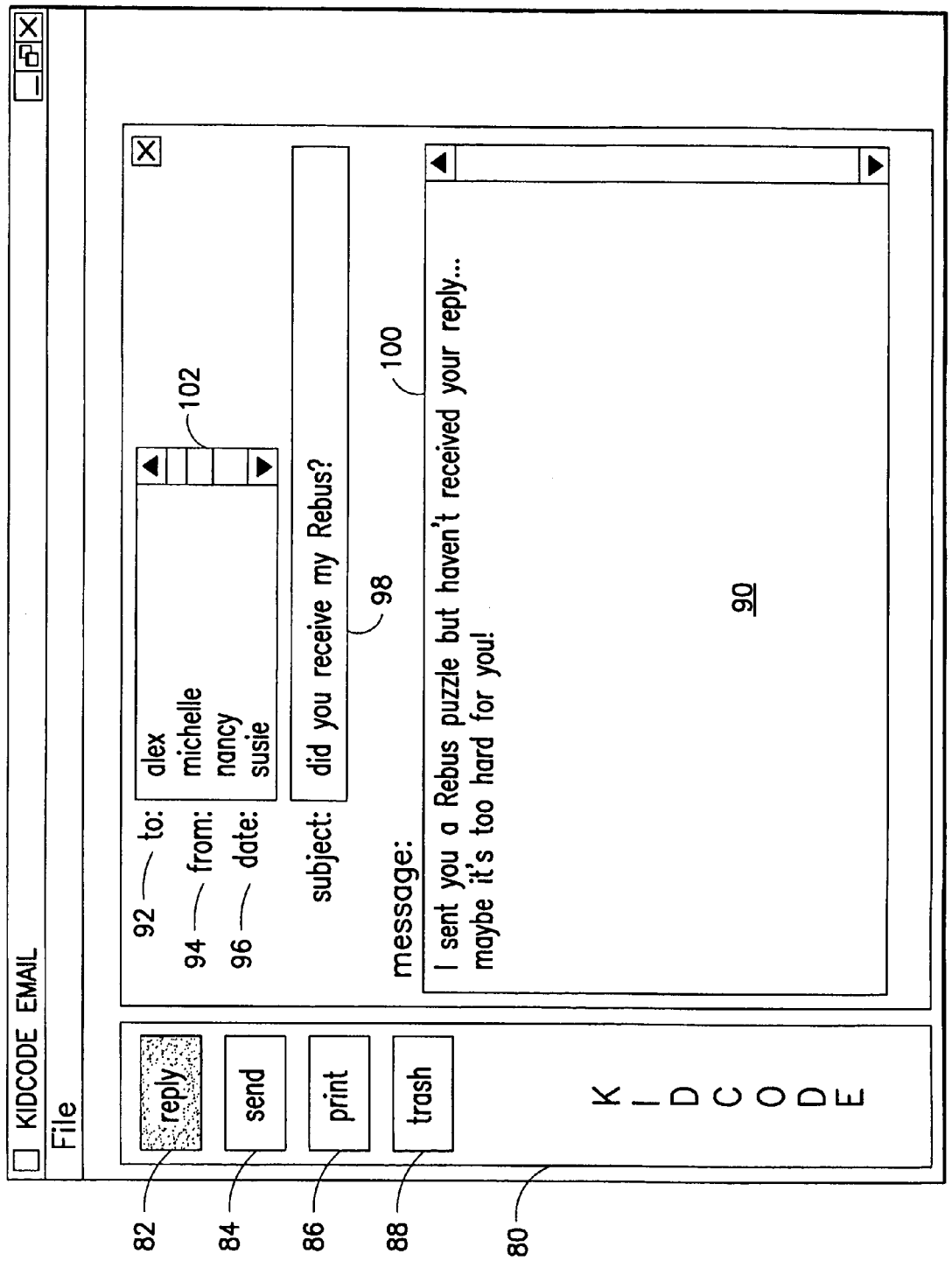
FIG. 4 is a screen shot of the KIDCODE® text message authoring component screen.
Figure 5:
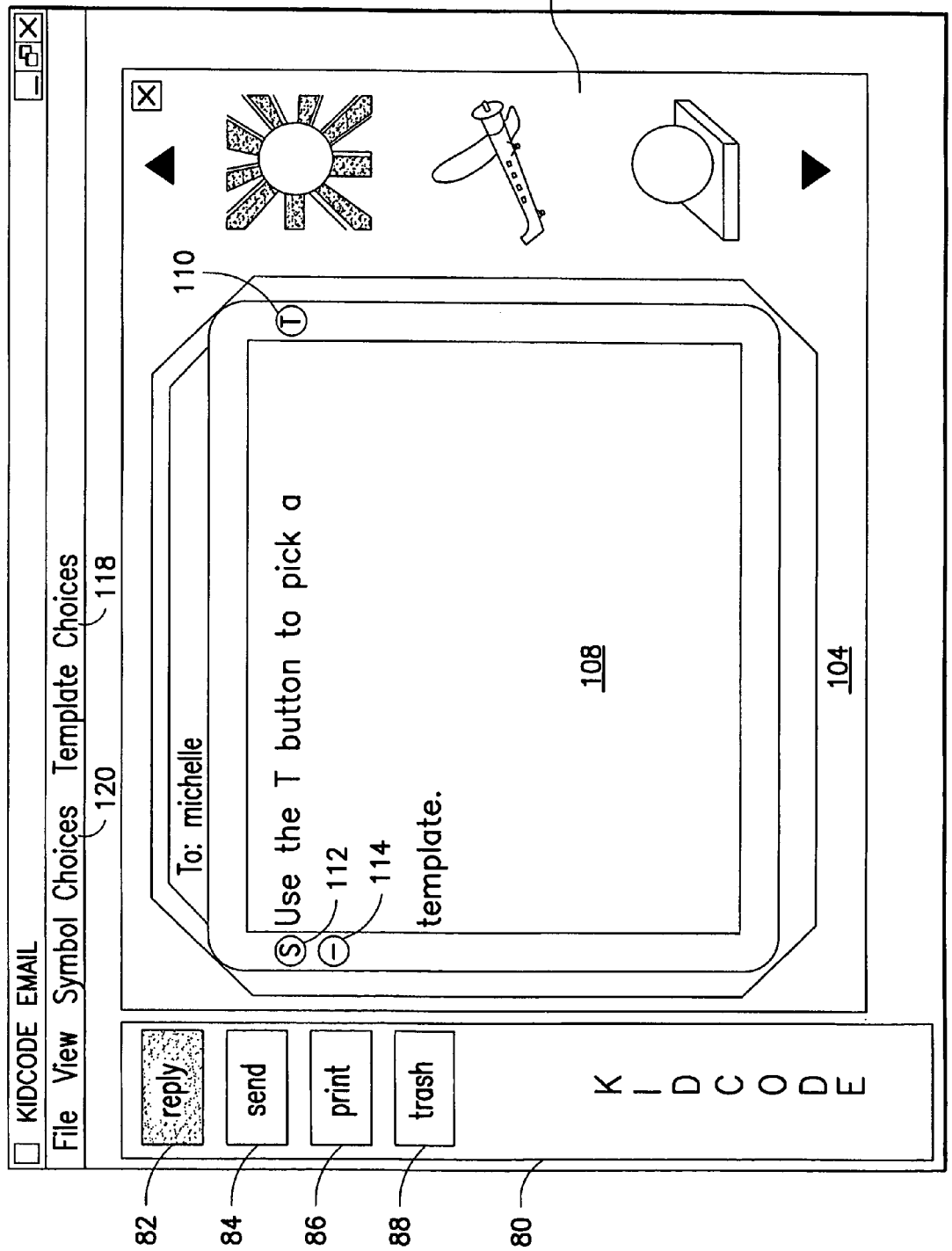
FIG. 5 is a screen shot of the KIDCODE® rebus authoring (encoding) component screen.

The presently implemented text authoring/reading component is illustrated in the authoring mode in FIG. 4 and is described in detail in Appendix C. The window 90 is similar to any email message authoring tool and includes fields for "to:" 92, "from:" 94, "date" 96, "subject" 98, and "message" 100. The "from:" field 94 and "date" field 96 are hidden in FIG. 4 behind the scrollable list box 102. After the addressee is chosen from the list box 102, the box disappears and reveals the "from" and "date" fields. According to the presently preferred embodiment, the list box 102 lists the names of all of the users registered in the local email system. This is handled by a call to the API as indicated at Appendix A lines 726–731 and implemented at Appendix C lines 55–68. Thus, this embodiment prevents users from sending a document to a recipient who is not registered with the system administrator. It also allows users of the system to address messages without typing the recipient's name. According to another embodiment of the invention, shown and described below with reference to FIG. 10, users are permitted to send email to any internet address and a list box is optionally used to display an address book. As seen in FIG. 3, the reply button 82 in the button bar 80 is grayed out because that function is not available when authoring a text message. This is accomplished in Appendix A at lines 1422–1438.

FIGS. 5–8 illustrate the presently implemented rebus component which is described in detail in Appendix D. The rebus component presents a window 104 which includes a "to:" field 106, a message area 108, a "T" button 110 for selecting a template sentence, an "S" button 112 for hiding/displaying symbols, a button 114 for hiding/displaying guesses, and a scrollable area 116 to the right of the message area which displays sets of symbols to be used in coding a rebus. In addition, the rebus component displays several pull down menus which are particular to it. These include the template choices menu 118 and the symbol choices menu 120.

Figure 6:
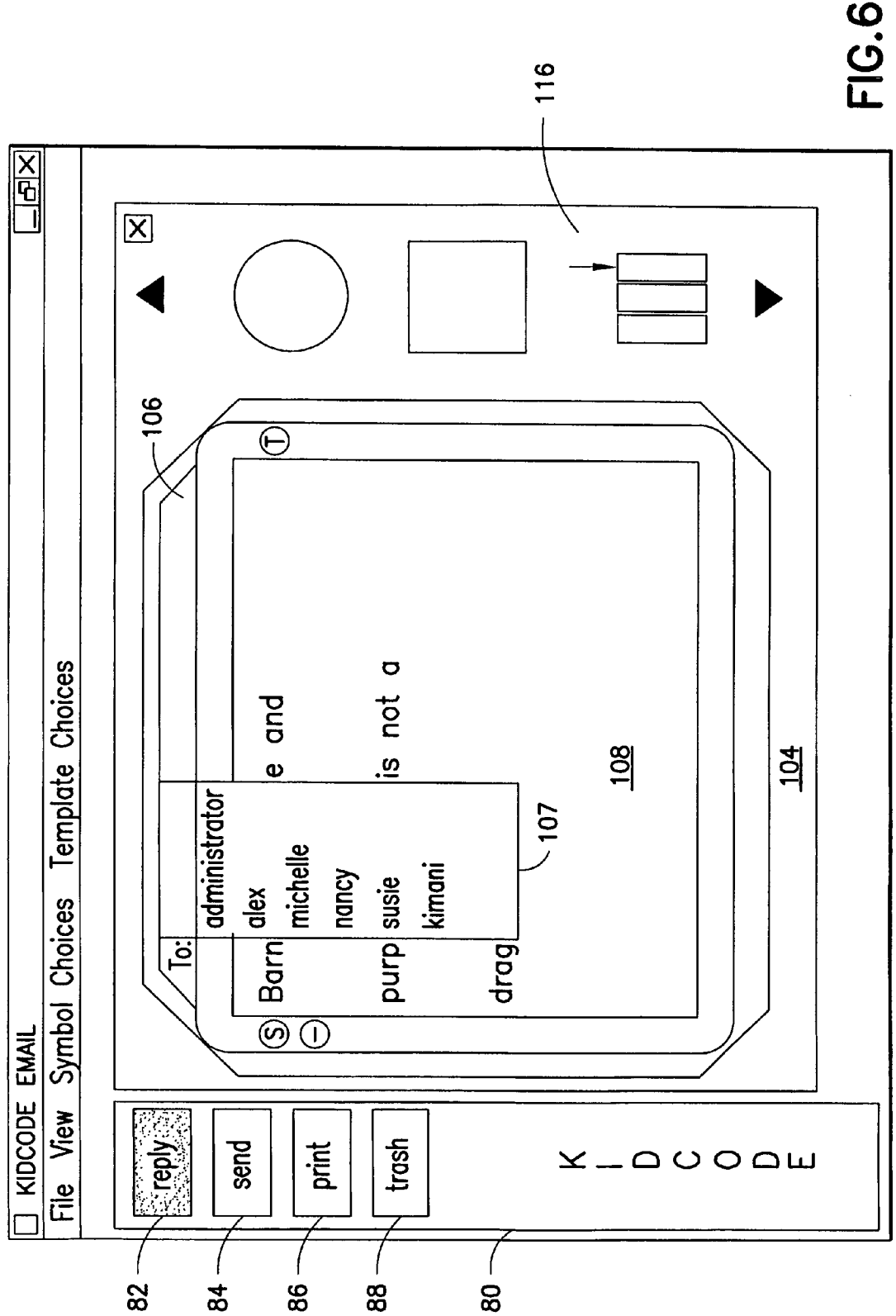
FIG. 6 is a screen shot similar to FIG. 5 illustrating a listbox of users on the network to whom mail may be sent.
Figure 8:
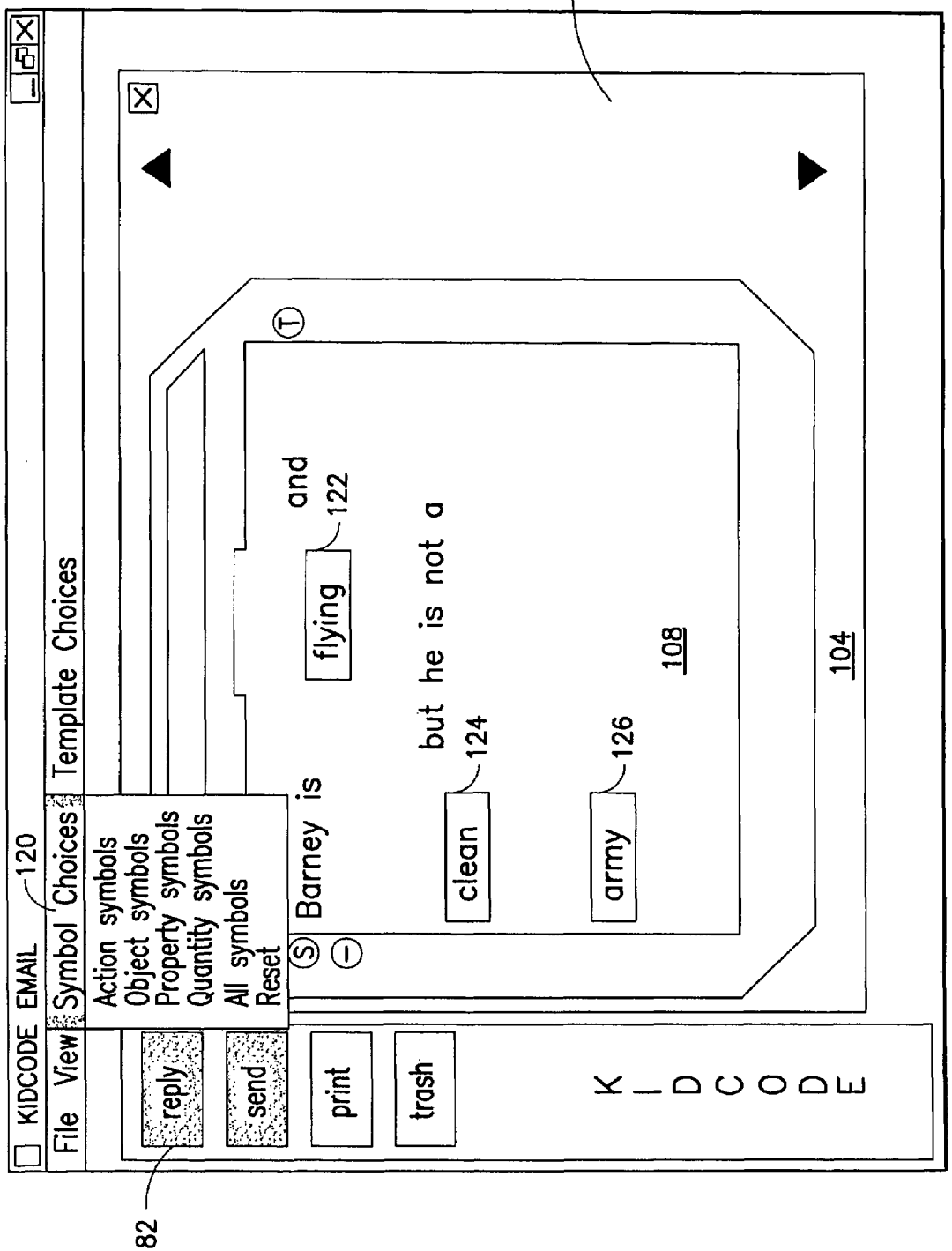
FIG. 8 is a screen shot of the KIDCODE® rebus reading (decoding) component screen.

According to the presently implemented embodiment which is detailed in Appendix D, the author of a rebus begins by selecting a template sentence from a selection of sentences which are capable of being expressed as a rebus using the symbol sets provided. The template selection may be made via the T button 110 or the pull down menu 118. When a template sentence is selected, a suggested set of symbols is displayed in the field 116. Different symbols may be viewed by selecting a symbol set from the Symbol Choices menu 120. As illustrated in FIG. 8, symbols are grouped according to the kinds of words they symbolize such as "action symbols", "object symbols", "quantity symbols", etc. As with other components of the KIDCODE® program, and as shown in FIG. 6, the "to:" field 106 presents a drop down or pop up list box through which the email is addressed by selecting a registered user.

Figure 7:
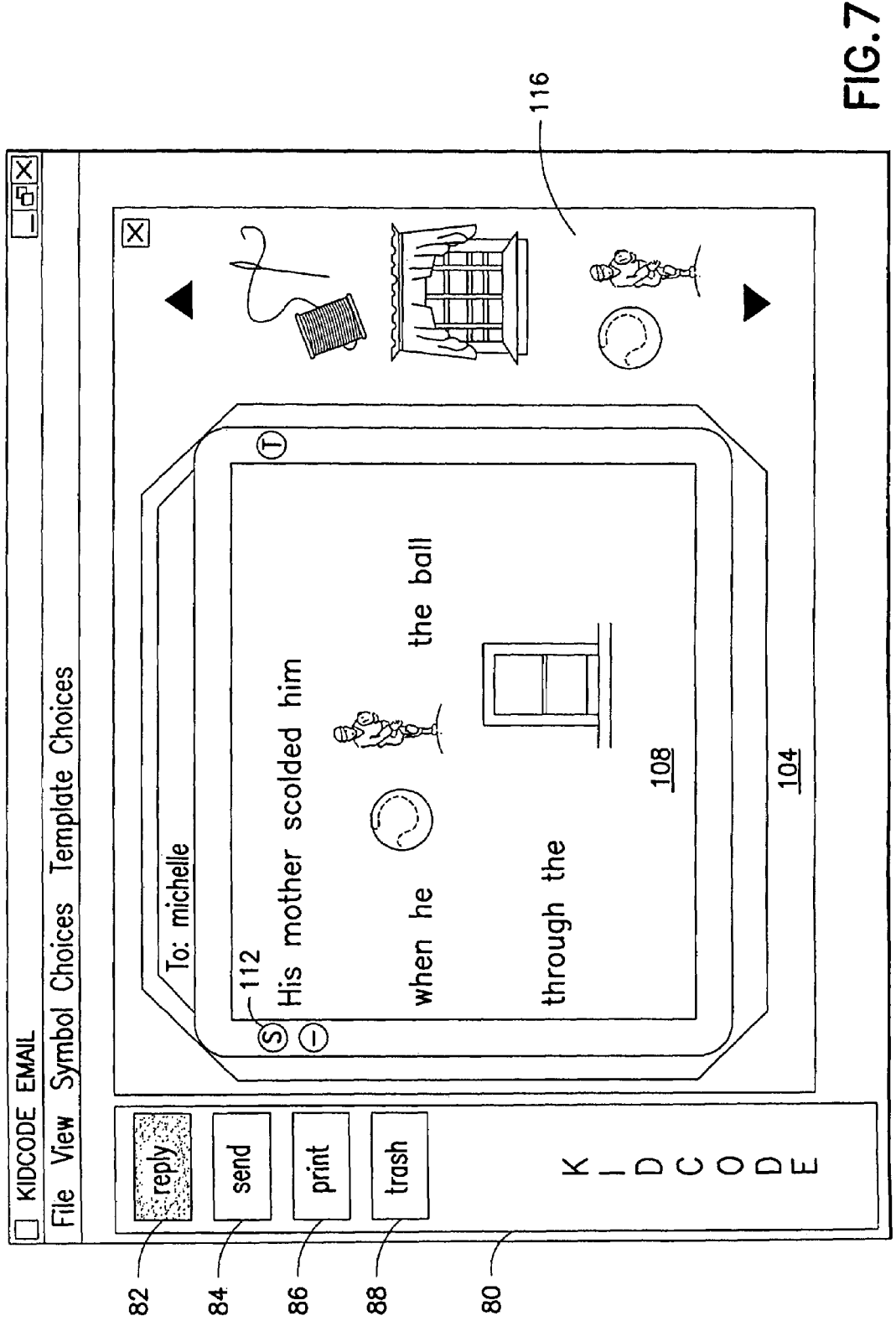
FIG. 7 is a screen shot similar to FIG. 5 illustrating a rebus in the process of being coded by the user.

The author of the rebus codes the template sentence by dragging symbols from the scrollable field 116 to the message area 108. This is best illustrated by FIG. 7. Symbols, when placed on a coded word in the template sentence, will snap into place when they are dragged into the area 108. According to the invention, not every word in the template sentence is designed to be coded with a symbol. According to the presently preferred embodiment, words which are to be coded appear in red text. For example, as shown in FIG. 7, two symbols have been dragged into the message area and have snapped over the now hidden words "threw" and "window". The words "ball and "through" are also red text and can be coded with a proper symbol. The author can hide the symbols and display the words in the sentence which are covered by symbols by clicking on the "S" button 112. (Appendix D lines 2433–2451 and 1348–1349.) However, when the recipient receives the rebus, clicking on the button "S" will not reveal the words beneath the symbols, but will only make the symbols disappear. This is an example of how user "roles" alter the tools available in a component. See Appendix D lines 1351–1365. When the author finishes coding the rebus, he or she clicks on the send button 84. The main email component then automatically encodes the rebus as a MIME attachment to Internet mail and sends the mail to the recipient's mailbox. See Appendix F.

Turning now to FIG. 8, when the recipient of the rebus opens the email message containing a rebus, the KID-CODE® main email component automatically decodes the MIME attachment, determines that it is a rebus, and opens it in the rebus reading component. See Appendix F. The message appears with empty text boxes (e.g. 122, 124, 126) beneath the graphic symbols. The recipient of the message must solve the rebus by typing in the text boxes the words which he/she believes are represented by the graphic symbols. As mentioned above, the "−" button 114 is for hiding/displaying the guesses typed in the boxes. When the recipient has typed in words for all the graphic symbols, he/she clicks on the reply button 82 to send the solution back to the author. FIG. 8 shows the screen after the button 82 has been clicked. Thus it is grayed out to prevent the same message from being sent twice. The palette 116 is available to the decoder for browsing only. The features which allow symbols to be placed on the message are disabled for the decoder.

Figure 9:
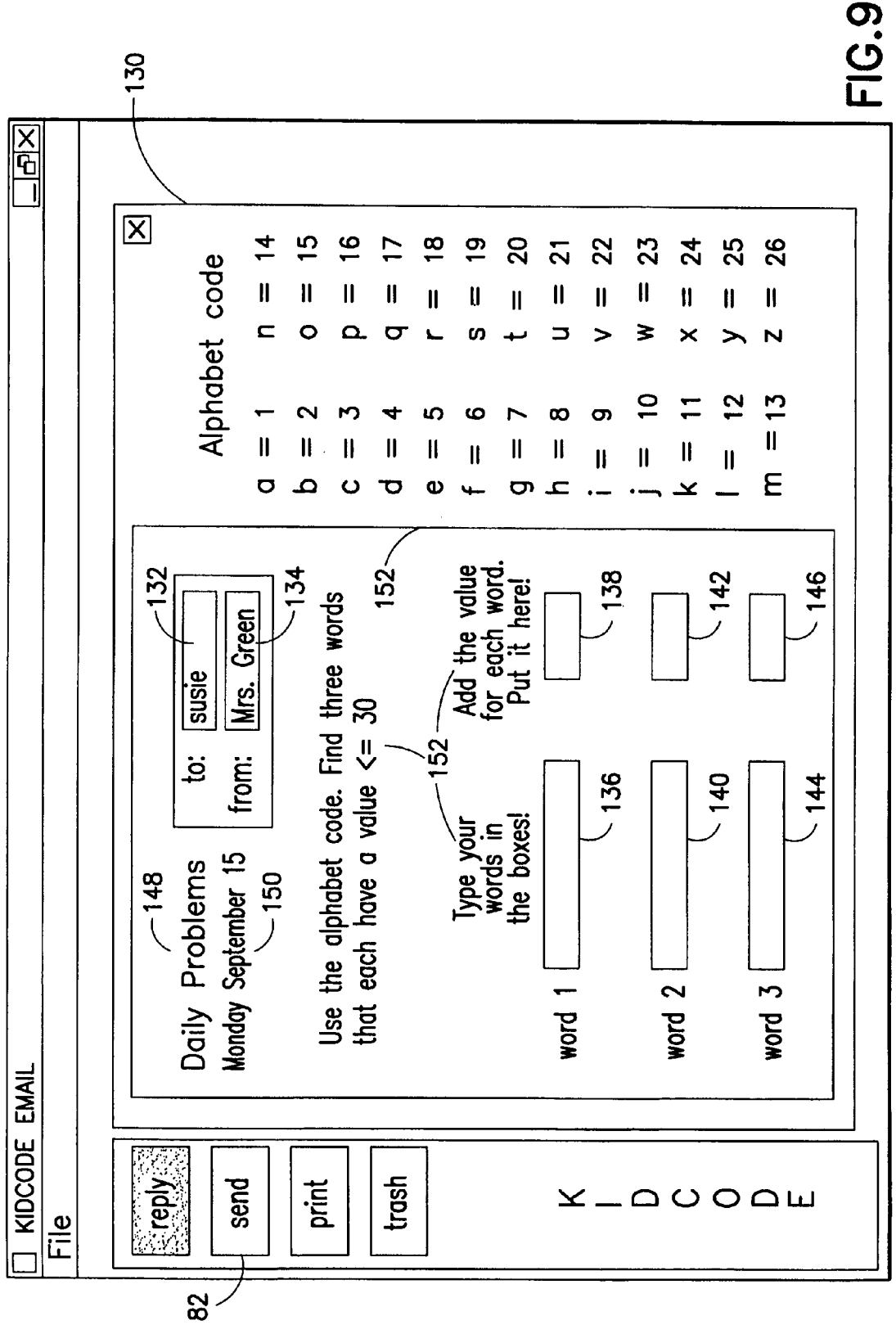
FIG. 9 is a screen shot of the KIDCODE® workbook authoring component screen.

One of the authoring/reading components of the invention is a workbook message handler, an example of which is illustrated in FIG. 9. The screen shot shown in FIG. 9 illustrates the "student role" of a workbook message handler. The window 130 of the student role workbook message handler preferably includes "to:" and "from:" fields 132, 134 which are filled in by the teacher before the message is sent to the student, as well as six fields 136, 138, 140, 142, 144, 146 which must be filled in by the student before the message is returned to the teacher. As shown in FIG. 9, the window 130 also includes a title 148, a date 150 and various instructions 152. Those skilled in the art will appreciate that the date 150 may be automatically entered when the message is sent to the student. The fields 136, 138, 140, 142, 144, 146, the title 148, and the instructions 152 may be manually entered by the teacher or may be selected as part of a template. In other words, the workbook message handler component may be a complex tool which allows teachers to author an infinite number of "problem messages" to students or it may be a modular set of pre-written problems or templates for problems. The workbook message handler component preferably includes many pre-written problems. Additional pre-written problems will be available through additional modular components. One important feature of the workbook message handler components is that they identify user status and automatically present the proper "role" of either teacher or student.

Figure 10:
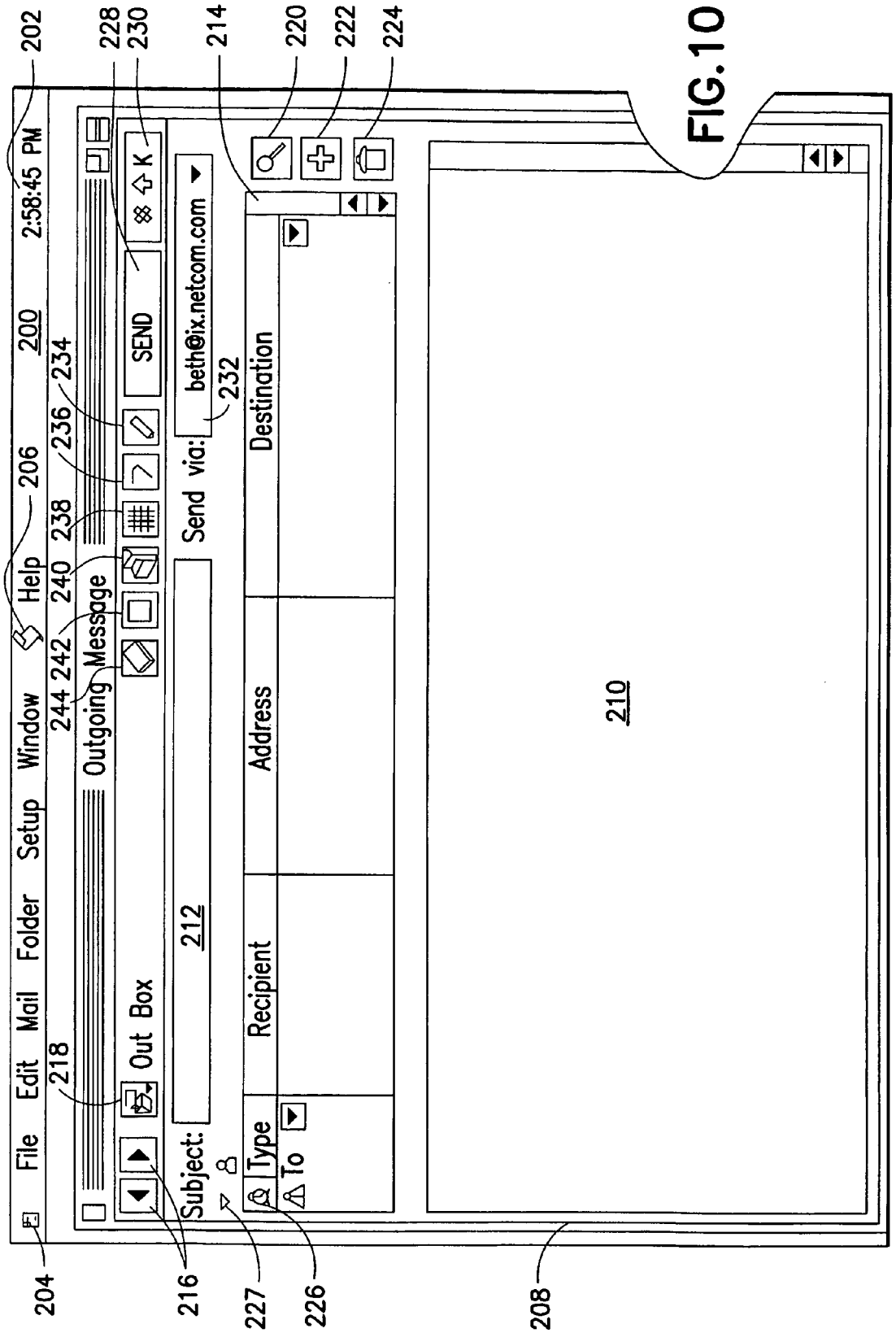
FIG. 10 is a screen shot illustrating the main email component of a second embodiment of the invention.

The KIDCODE® program described above is designed to be easy to use by very young children. FIGS. 10–17 illustrate another embodiment of the invention which is designed for a more sophisticated user, an older child, or an adult. The interface is more complicated, but offers the user more features. Referring now to FIG. 10, the interface of the second embodiment of the invention includes a menubar 200 which lists some standard menus like FILE, EDIT, SETUP, WINDOW, and HELP. The menubar 200 may also include a clock display 202 which is typically supplied by the operating system and a blinking icon 204 which is typically supplied by TCP/IP connection software such as PPP dialup software, to indicate that the computer is connected to the Internet. The menus MAIL and FOLDER in the menubar 200 are particular to the emailing program and the scroll icon 206 is provided by scripting software, typically part of the operating system. Under the MAIL menu, one will find commands such as NEW for creating new mail, REPLY for replying to a mail message being read, FORWARD, etc. Under the FOLDER menu, one will find the names of user created filing cabinets (folders) where incoming mail can be saved. Under the SETUP menu, one will find commands for setting the necessary information to make a connection with the Internet, for storing the user's name and password, for scheduling automatic sending and receiving of mail, for performing automated tasks in response to mail (e.g. for automatically filing certain mail in certain folders, autoresponding to certain mail, etc.), etc. Under the WINDOW menu, the user will have the option of viewing INBOX, OUTBOX, FILING CABINET(s), CONNECTION STATUS, etc. The HELP menu preferably provides a context sensitive alphabetical list of help items which are hot linked to html files.

FIG. 10 illustrates the email program with a new outgoing message window 208 opened. The message window includes a standard text message field 210, a standard subject field 212, standard multiple recipient address fields 214, and a variety of buttons. The arrow buttons 216 allow the user to scroll among messages in the outbox. The outbox button 218 drops down a list of items in the outbox, from which items may be selected. The magnifying glass button 220 is used to search the user's address book. The "+" button 222 adds a recipient to the address field 214. The trash button 224 places the outgoing message in the trash and closes the window 208. The clock button 226 brings up a menu to schedule when the message will be sent. The rotating arrow button 227 causes the address fields 214 to disappear/reappear thereby expanding/contracting the size of the message field 210. The send button 228 sends the message to the outbox (if it is scheduled for delivery at another time or if the computer is not connected to the Internet) and sends the message otherwise. The button 230 labelled "⌁-^-K" causes the computer to connect to the Internet. As shown in FIG. 10, this button 230 is grayed out because, as indicated by the blinking telephone pole icon 204, the computer is already connected to the Internet. The "send via" button 232 allows the user to select from several usernames, email accounts, etc.

The outgoing message window 208 shown in FIG. 10 allows the user to send standard Internet mail by typing a message in the window 210. However, according to the invention, the window 208 also includes buttons 234, 236, 238, 240, 242, and 244, each of which is linked to an installed authoring/reading component. As described above, the number and nature of the authoring/reading components is modularly changeable. In the example shown in FIG. 10, six authoring/reading components are shown to be installed. In practice, more, fewer, and/or different components may be installed. The components shown and described herein are: a word processor authoring/reading component linked to the button 234, a painting/drawing authoring/reading component linked to the button 236, a spreadsheet authoring/reading component linked to the button 238, a database authoring/reading component linked to the button 240, an image editor authoring/reading component linked to the button 242, and a presentation authoring/reading component linked to the button 244.

Figure 11:
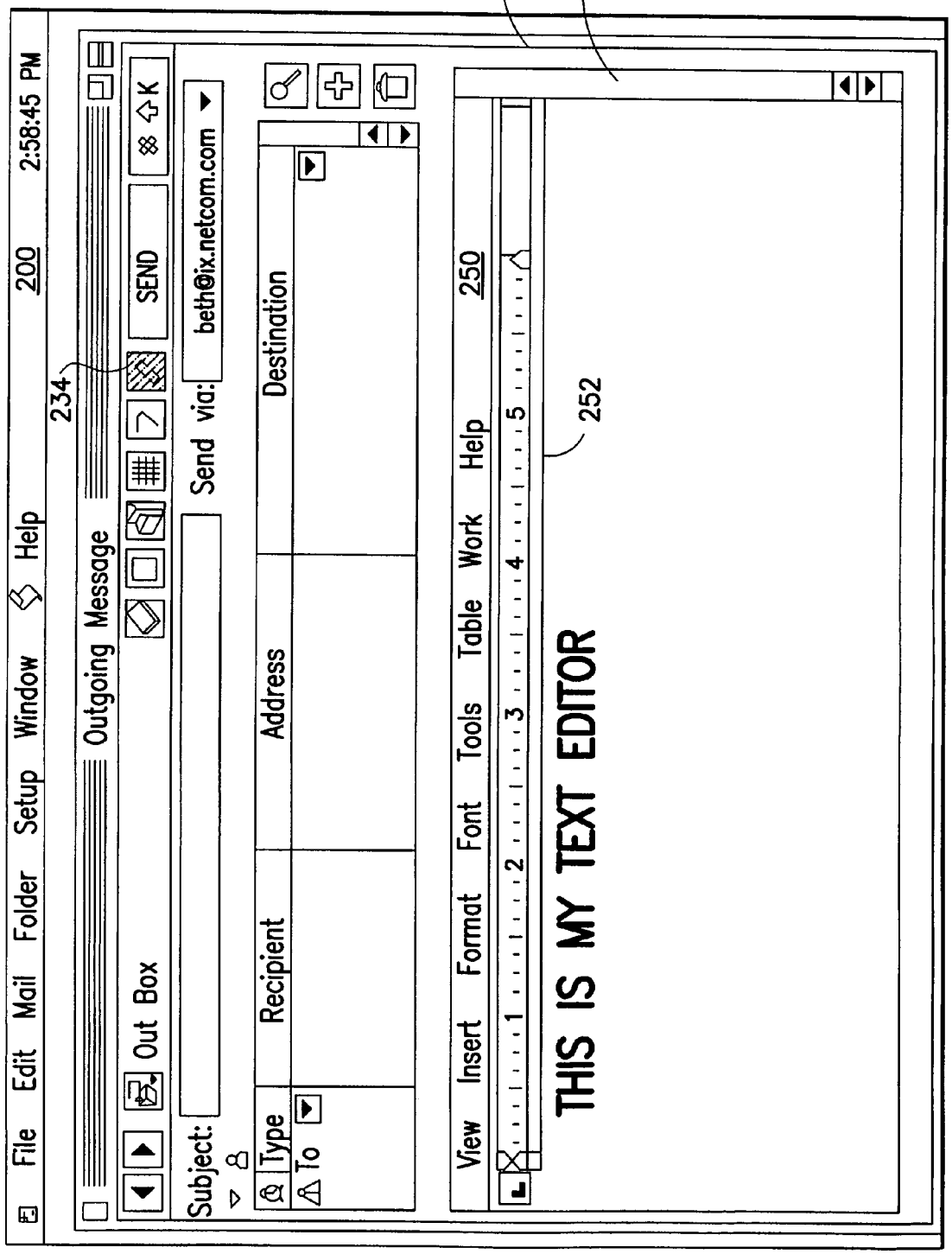
FIG. 11 is a screen shot illustrating a text authoring component in the second embodiment of the invention.

Turning now to FIG. 11, when the user clicks on the button 234, the word processor component is invoked and it causes a new menubar 250 and a ruler 252 to appear inside the message field 210 of the window 208. The word processor component allows sophisticated formatting of messages which would be impossible in a normal Internet email program. For example, margins can be set using the ruler 252; fonts can be changed using the FONT menu from the menubar 250; tables can be created and inserted using the TABLE menu from the menubar 250. In general, the menubar 250 provides much or all of the functionality of a full featured word processor program. Those skilled in the art will appreciate that the word processor interface shown in FIG. 11 is similar to the interface of Microsoft® Word® 98. It will be noted that the menubar 250 provides a separate HELP menu in addition to the HELP menu provided on the menubar 200. It will be appreciated that the HELP menu could be omitted from the menubar 250 and the help files for the word processor component could be accessed from the main HELP menu on the menubar 200. It will also be noted that when the word processor component is invoked, the button 234 is grayed.

After a user creates a message with the word processor component, the addressing and mailing procedure is the same as sending an ordinary email. There is no need to save a file, encode it, or attach it to an email message. The main email component of the invention seamlessly performs all of the saving, encoding, and attaching without any of this being exposed to the user. More particularly, the authoring component and the main email component cooperate to save the authored document as a file on the user's disk. See Appendix E lines 229–238 and Appendix A lines 1293–1333 and 329–450. The main email component encodes the file in the MIME format with as many parts as necessary, and sends the MIME file(s) as Internet email message(s). See Appendix F. When the message is received by a person using a copy of the email program of the invention, the receiver's main email component seamlessly concatenates the MIME parts, decodes the MIME file (Appendix F), determines that it is a message created with the word processing component (Appendix A lines 690–694), invokes the word processing component (Appendix A lines 1019–1054), and opens the message with the word processing component (Appendix A lines 603–614). The receiver of the message does not have to download any file, find any attachment, execute any decoders, or launch any word processor to see the fully formatted document created by the sender.

Figure 12:
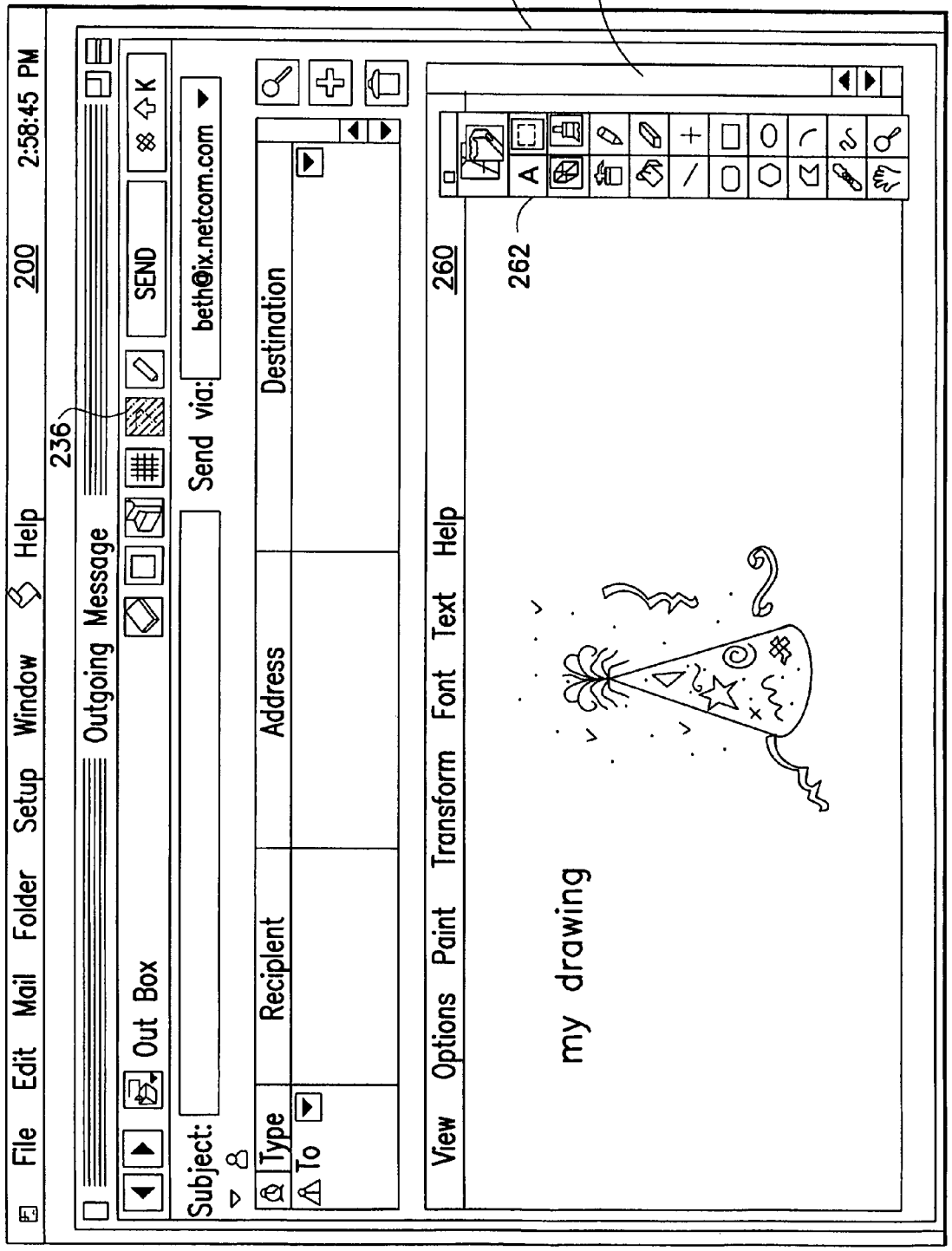
FIG. 12 is a screen shot illustrating a painting/drawing authoring component in the second embodiment of the invention.

Turning now to FIG. 12, when the user clicks on the button 236, the painting/drawing component is invoked and it causes a new menubar 260 and a tool palette 262 to appear inside the message field 210 of the window 208. The painting/drawing component allows the author to create a painting (bitmap) graphic or a drawing (vectormap) graphic and send it to another user for viewing/editing. Those skilled in the art will appreciate that the menubar 260 and palette 262 shown in FIG. 12 contain the menus and tool icons typically found in a full featured drawing/painting program. Those skilled in the art will appreciate that the painting/drawing component interface shown in FIG. 12 is similar to the interface of Aldus® SuperPaint® 3.5. It will be noted that the menubar 260 provides a separate HELP menu in addition to the HELP menu provided on the menubar 200. It will be appreciated that the HELP menu could be omitted from the menubar 260 and the help files for the painting/drawing component could be accessed from the main HELP menu on the menubar 200. It will also be noted that when the painting/drawing component is invoked, the button 236 is grayed.

After a user creates a graphic image with the painting/drawing component, the addressing and mailing procedure is the same as sending an ordinary email. There is no need to save a file, encode it, or attach it to an email message. The main email component of the invention seamlessly performs all of the saving, encoding, and attaching without any of this being exposed to the user. See Appendices A, E and F. When the message is received by a person using a copy of the email program of the invention, the receiver's main email component seamlessly concatenates MIME parts, decodes the MIME file, determines that it is a message created with the painting/drawing component, invokes the painting/drawing component, and opens the message with the painting/drawing component. The receiver of the message does not have to download any file, find any attachment, execute any decoders, or launch any painting/drawing program to view/edit the graphic image created by the sender. See Appendices A, E and F.

Figure 13:
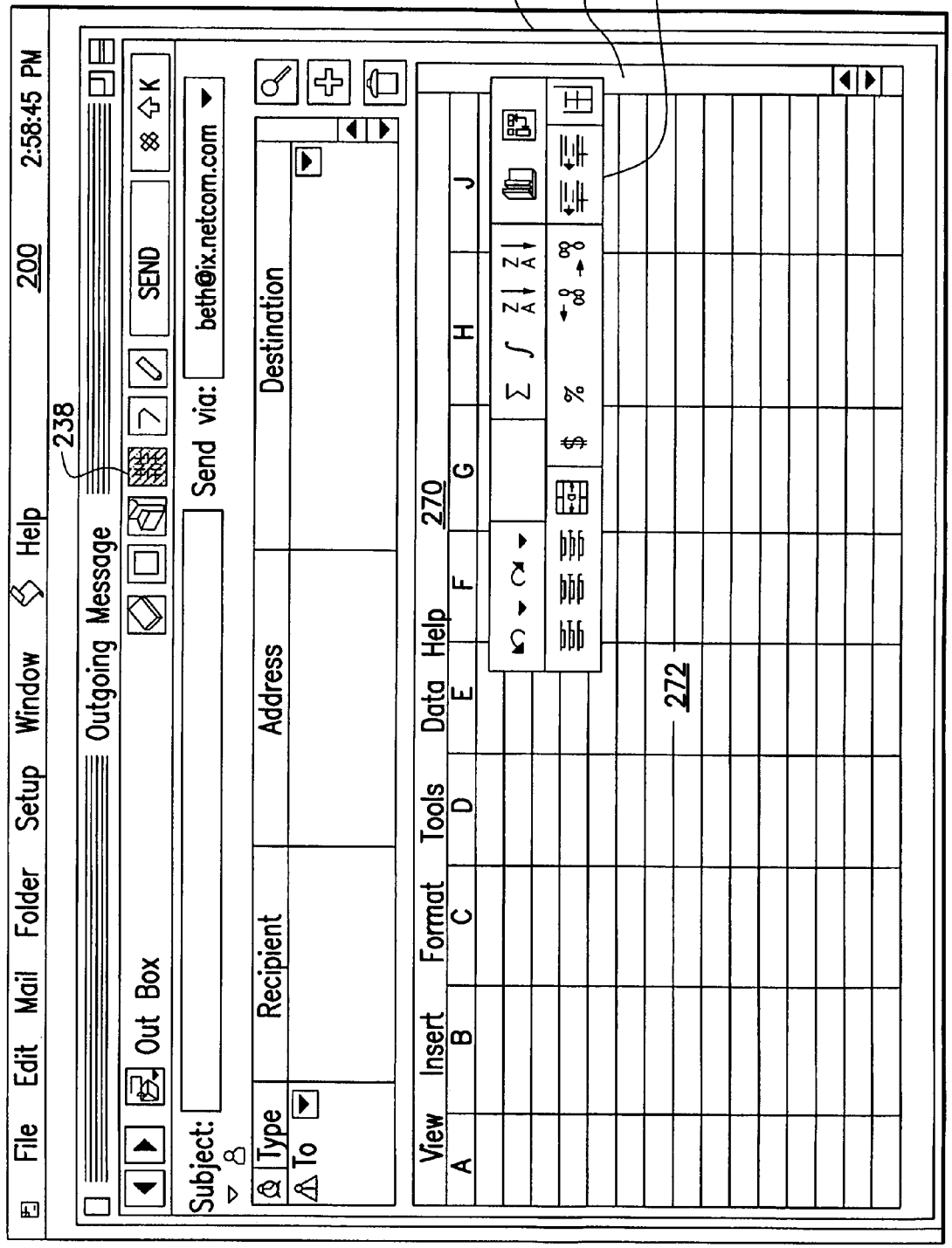
FIG. 13 is a screen shot illustrating a spreadsheet authoring component in the second embodiment of the invention.

Turning now to FIG. 13, when the user clicks on the button 238, the spreadsheet component is invoked and it causes a new menubar 270, a grid 272, and a tool palette 274 to appear inside the message field 210 of the window 208. The spreadsheet component allows the author to create a spreadsheet and send it to another user for viewing/editing. Those skilled in the art will appreciate that the menubar 270 and palette 274 shown in FIG. 13 contain the menus and tool icons typically found in a full featured spreadsheet program. Those skilled in the art will appreciate that the interface of the spreadsheet component shown in FIG. 13 is similar to the interface of Microsoft® Excel® 98. It will be noted that the menubar 270 provides a separate HELP menu in addition to the HELP menu provided on the menubar 200. It will be appreciated that the HELP menu could be omitted from the menubar 270 and the help files for the spreadsheet component could be accessed from the main HELP menu on the menubar 200. It will also be noted that when the spreadsheet component is invoked, the button 238 is grayed.

After a user creates a spreadsheet with the spreadsheet component, the addressing and mailing procedure is the same as sending an ordinary email. There is no need to save a file, encode it, or attach it to an email message. The main email component of the invention seamlessly performs all of the saving, encoding, and attaching without any of this being exposed to the user. See Appendices A, E and F. When the message is received by a person using a copy of the email program of the invention, the receiver's main email component seamlessly concatenates MIME parts, decodes the MIME file, determines that it is a message created with the spreadsheet component, invokes the spreadsheet component, and opens the message with the spreadsheet component. The receiver of the message does not have to download any file, find any attachment, execute any decoders, or launch any spreadsheet program to view/edit the spreadsheet created by the sender. See Appendices A, E and F.

Figure 14:
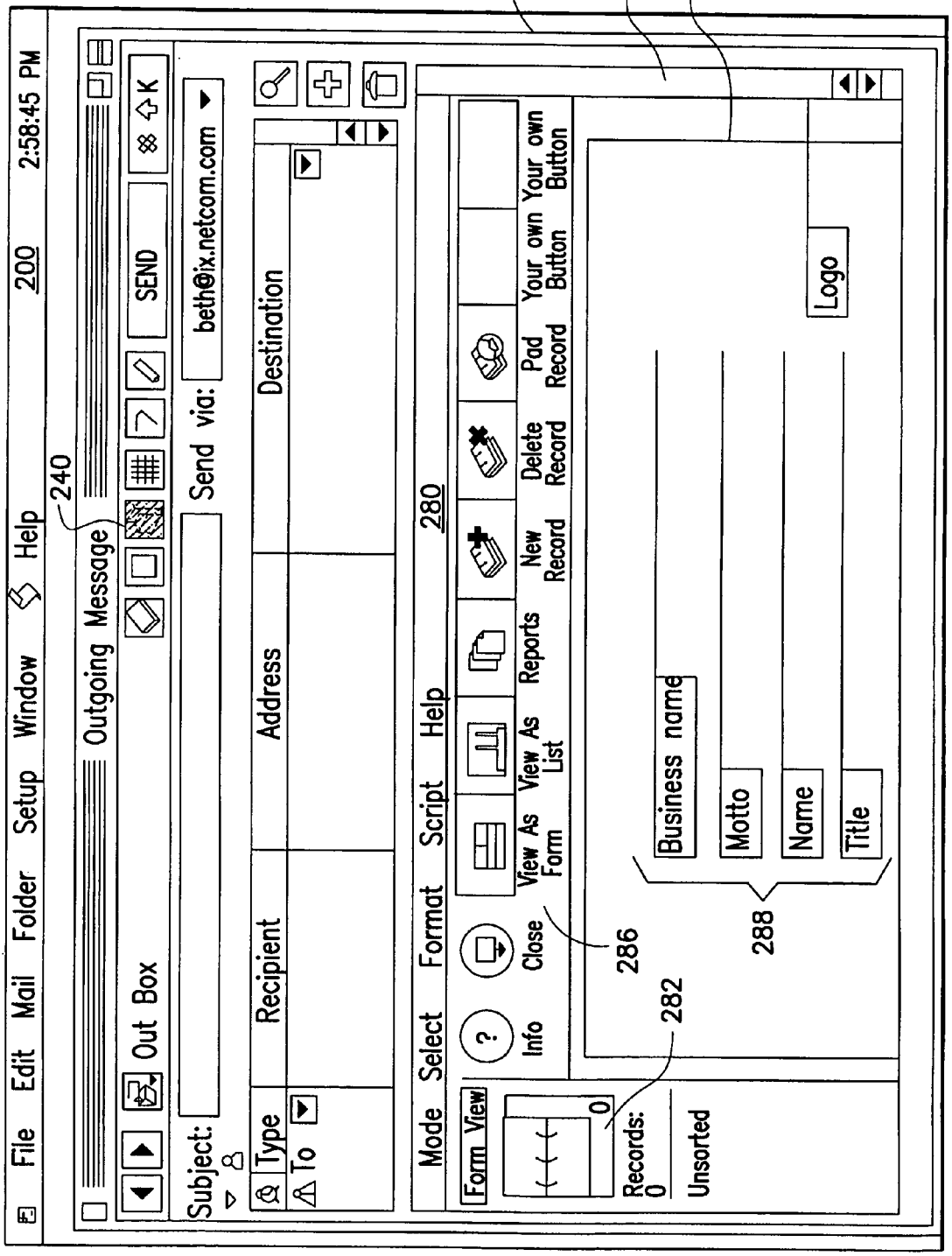
FIG. 14 is a screen shot illustrating a database authoring component in the second embodiment of the invention.

Turning now to FIG. 14, when the user clicks on the button 240, the database component is invoked and it causes a new menubar 280, a record selection tool 282, and a free form space 284 to appear inside the message field 210 of the window 208. The database component allows the author to create a database and one or more reports and forms associated with the database and send it to another user for viewing/editing. Those skilled in the art will appreciate that the button bar 286 and the data fields 288 are defined by the author of the database using authoring tools found in the menus of the menubar 280. In fact, those skilled in the art will appreciate that the database interface shown in FIG. 14 is similar to the interface of Filemaker®Pro 3.0. It will be noted that the menubar 280 provides a separate HELP menu in addition to the HELP menu provided on the menubar 200. It will be appreciated that the HELP menu could be omitted from the menubar 280 and the help files for the database component could be accessed from the main HELP menu on the menubar 200. It will also be noted that when the database component is invoked, the button 240 is grayed.

After a user creates a database with the database component, the addressing and mailing procedure is the same as sending an ordinary email. There is no need to save a file, encode it, or attach it to an email message. The main email component of the invention seamlessly performs all of the saving, encoding, and attaching without any of this being exposed to the user. See Appendices A, E, and F. When the message is received by a person using a copy of the email program of the invention, the receiver's main email component seamlessly concatenates MIME parts, decodes the MIME file, determines that it is a message created with the database component, invokes the database component, and opens the message with the database component. The receiver of the message does not have to download any file, find any attachment, execute any decoders, or launch any database program to view/edit the database created by the sender. See Appendices A, E, and F.

Figure 15:
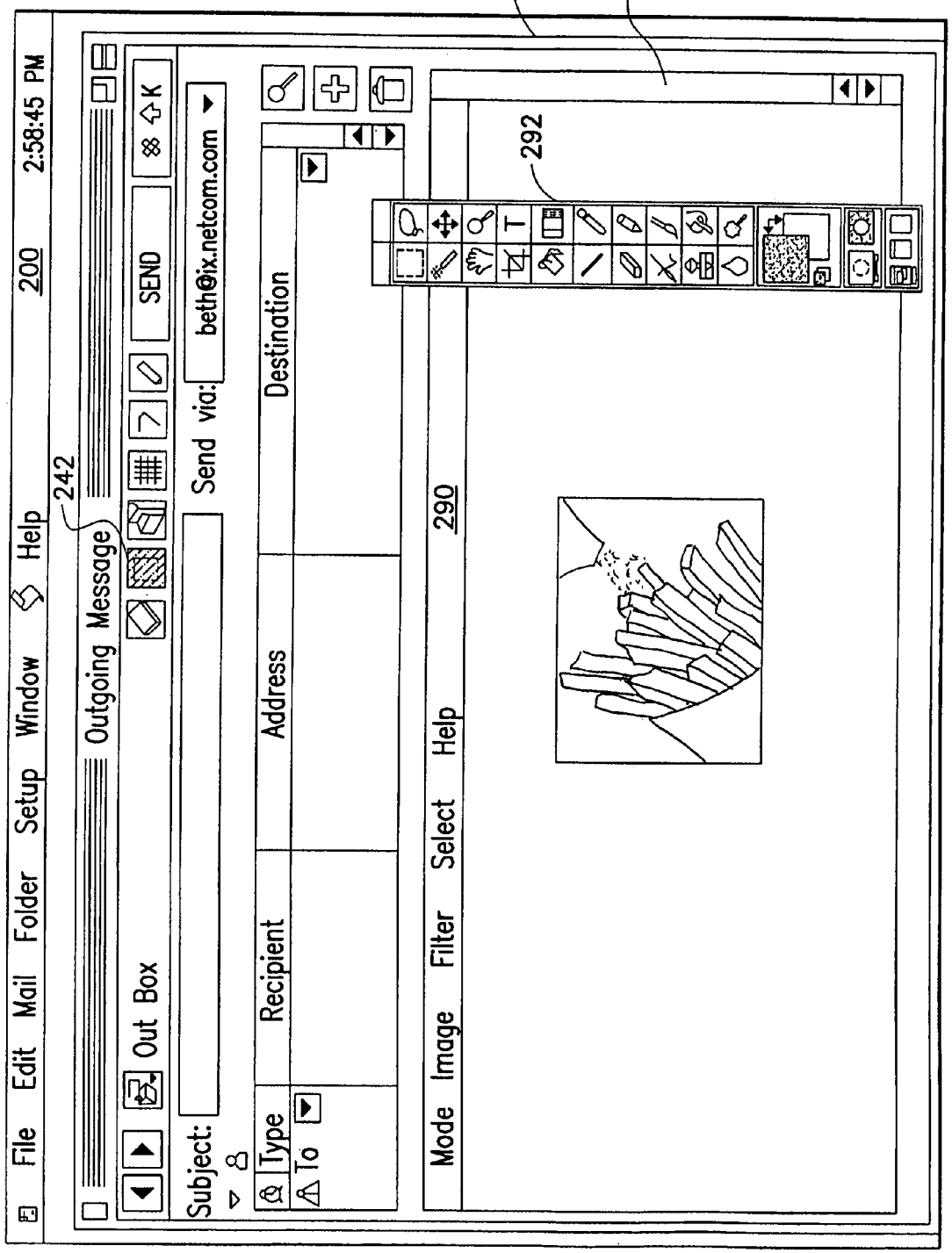
FIG. 15 is a screen shot illustrating a photo editor authoring component in the second embodiment of the invention.

Turning now to FIG. 15, when the user clicks on the button 242, the image editing component is invoked and it causes a new menubar 290 and a floating tool palette 292 to appear inside the message field 210 of the window 208. The image editing component allows the author to edit an image and send it to another user for viewing and/or further editing. Those skilled in the art will appreciate that the menubar 290 and palette 292 shown in FIG. 15 contain the menus and tool icons typically found in a full featured image editing program. Those skilled in the art will appreciate that the interface of the image editing component shown in FIG. 15 is similar to the interface of Adobe® Photoshop® 3.5. It will be noted that the menubar 290 provides a separate HELP menu in addition to the HELP menu provided on the menubar 200. It will be appreciated that the HELP menu could be omitted from the menubar 290 and the help files for the database component could be accessed from the main HELP menu on the menubar 200. It will also be noted that when the database component is invoked, the button 242 is grayed. Those skilled in the art will appreciate that image editing software is typically not used to create an image but to edit an image created by some other hardware/software such as a digital camera or a scanner. As such, there is typically a menu item for opening or capturing an image. As shown in FIG. 15, open/capture commands may be found under the FILE menu in the menubar 200. Alternatively, image acquisition commands may be found under a menu item in the menubar 290.

After a user edits an image with the image editor component, the addressing and mailing procedure is the same as sending an ordinary email. There is no need to save a file, encode it, or attach it to an email message. The main email component of the invention seamlessly performs all of the saving, encoding, and attaching without any of this being exposed to the user. See Appendices A, E, and F. When the message is received by a person using a copy of the email program of the invention, the receiver's main email component seamlessly concatenates MIME parts, decodes the MIME file, determines that it is a message created with the image editor component, invokes the image editor component, and opens the message with the image editor component. The receiver of the message does not have to download any file, find any attachment, execute any decoders, or launch any image editor program to view/edit the image edited by the sender. See Appendices A, E, and F.

Figure 16:
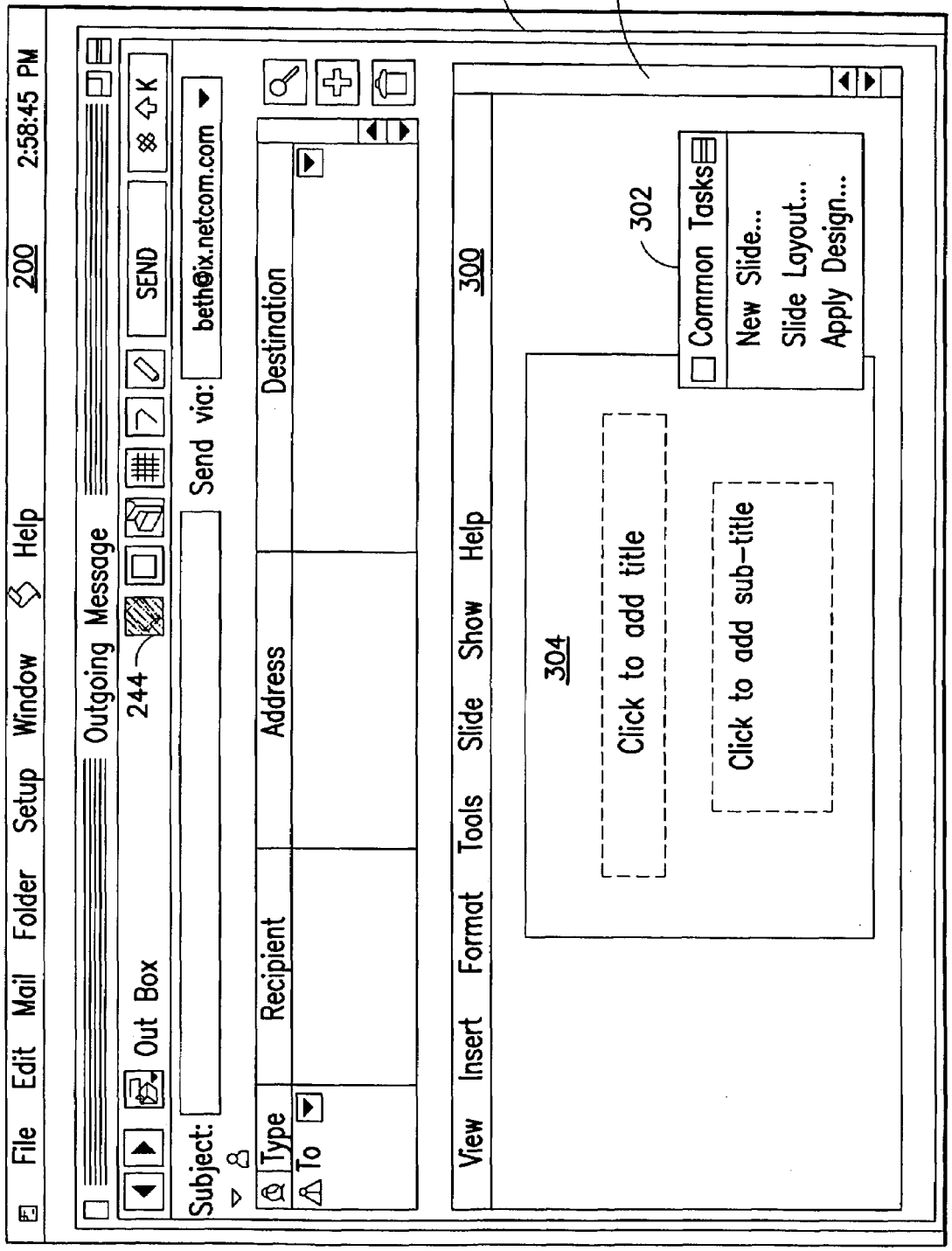
FIG. 16 is a screen shot illustrating a slide show authoring component in the second embodiment of the invention.

Turning now to FIG. 16, when the user clicks on the button 244, the presentation (slide show) component is invoked and it causes a new menubar 300, a floating wizard palette 302, and a blank template 304 to appear inside the message field 210 of the window 208. The presentation component allows the author to create a slide show presentation and send it to another user for viewing and/or editing. Those skilled in the art will appreciate that the menubar 300, palette 302, and template 304 shown in FIG. 16 are typical of those found in a full featured presentation program. In fact, those skilled in the art will appreciate that the interface of the presentation component shown in FIG. 16 is similar to the interface of Microsoft® PowerPoint® 98. It will be noted that the menubar 300 provides a separate HELP menu in addition to the HELP menu provided on the menubar 200. It will be appreciated that the HELP menu could be omitted from the menubar 290 and the help files for the database component could be accessed from the main HELP menu on the menubar 200. It will also be noted that when the database component is invoked, the button 244 is grayed.

After a user creates a presentation with the presentation component, the addressing and mailing procedure is the same as sending an ordinary email. There is no need to save a file, encode it, or attach it to an email message. The main email component of the invention seamlessly performs all of the saving, encoding, and attaching without any of this being exposed to the user. See Appendices A, E, and F. When the message is received by a person using a copy of the email program of the invention, the receiver's main email component seamlessly concatenates MIME parts, decodes the MIME file, determines that it is a message created with the presentation component, invokes the presentation component, and opens the message with the presentation component. The receiver of the message does not have to download any file, find any attachment, execute any decoders, or launch any presentation program to view/edit the presentation created by the sender. See Appendices A, E, and F.

Figure 17:
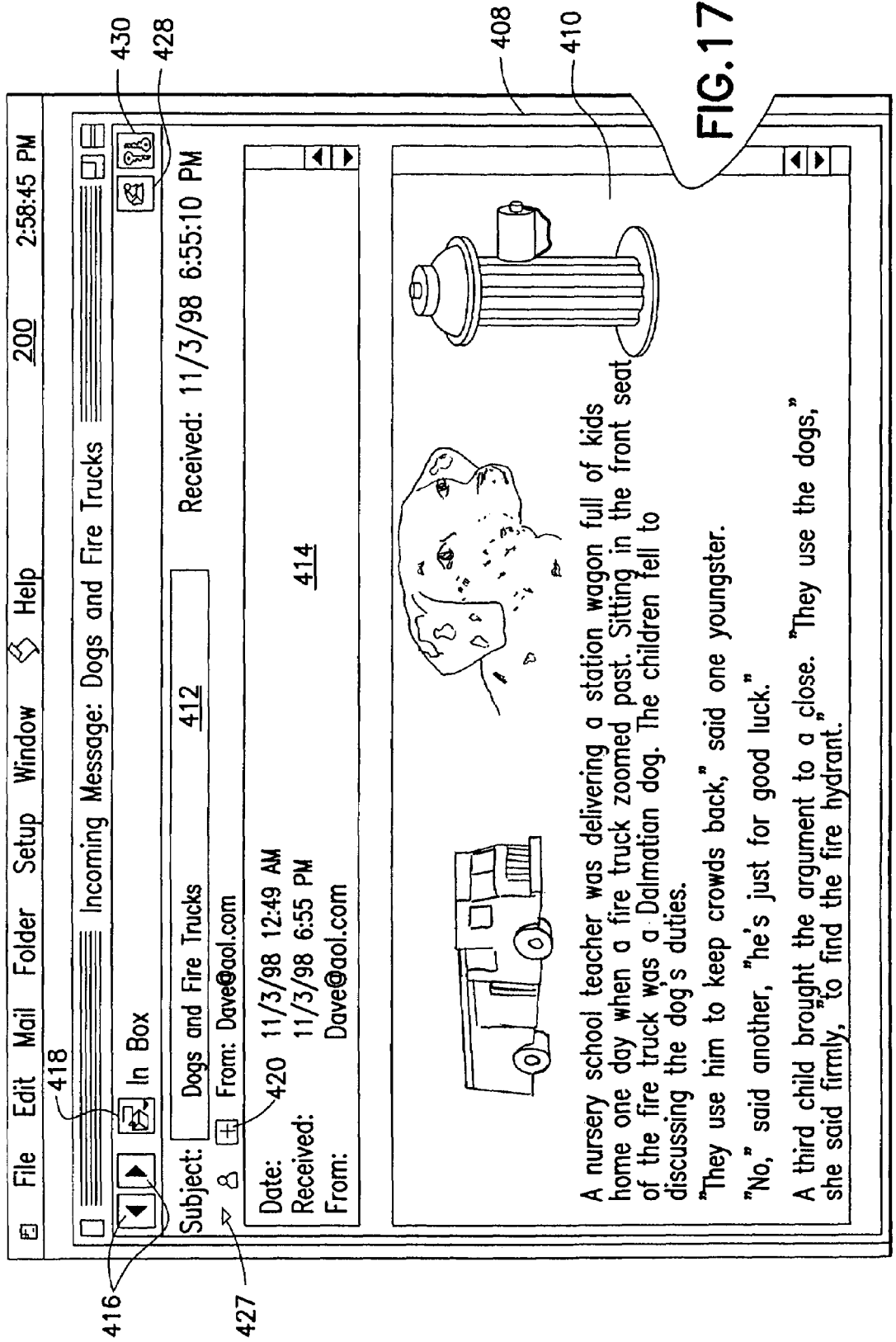
FIG. 17 is a screen shot illustrating a display-only component in the second embodiment of the invention.

As described above, messages received by the email software according to the invention are seamlessly decoded and displayed. FIG. 17 illustrates an incoming message window 408 which displays a message containing a combination of text and graphics in the message field 410. The incoming message window 408 also includes a subject field 412 and a "from:" address field 414 which includes information about the time the message was sent and received. Arrow buttons 416 allow the user to scroll through messages in the "in box". Button 418 drops a menu list of messages in the in box from which a message may be selected. The "+" button 420 adds the sender's address to the recipient's address book. The rotating arrow 427 hides the address field 414 and expands the message field 410. Buttons 428 and 430 are not implemented, but may be used for public key decryption, etc.

As mentioned above, the modular components of the invention may be authoring/reading components or read only components. FIG. 17 illustrates an incoming message window 408 which displays a message containing a combination of text and graphics in message field 410 without any editing/authoring tools. The message may have been created with the word processing component or the painting and drawing component. The component used to create the message need not be known by the recipient of the message when it is opened with a read only component as shown. It will be appreciated that the message could also be automatically opened with an authoring/reading component, in which case, the message field 410 in FIG. 17 would also include a menubar, and perhaps a tool palette. According to the invention, the email client software may be provided with a full complement of read only components and the authoring components may be installed according to the user's choices. Additionally, the email client software may be programmed to automatically download a reading component from an ftp site when it encounters a message which requires a component which is not yet installed.

There have been described and illustrated herein several embodiments of electronic mail software with modular integrated authoring/reading software components. While particular embodiments of the invention have been described, it is not intended that the invention be limited thereto, as it is intended that the invention be as broad in scope as the art will allow and that the specification be read likewise. Thus, while particular graphical interfaces have been disclosed, it will be appreciated that other interfaces could be utilized. Also, while particular authoring/reading components have been shown, it will be recognized that other types of authoring/reading components could be provided in the spirit of the invention. Moreover, while particular configurations have been disclosed in reference to the code in the appendices, it will be appreciated that other configurations could be used as well. Further, while particular software code and pseudocode have been disclosed to perform various functions, it will be appreciated that other code and/or hardware could be utilized to accomplish those functions and should be considered the equivalents thereof. It will therefore be appreciated by those skilled in the art that yet other modifications could be made to the provided invention without deviating from its spirit and scope as so claimed.

Appendix A:    KidCode® Lingo Client/Server Email Main Scripts

Page 1

```
1   on startMovie
2
3     global emG_passwordList, emG_userGroupList, emG_userGroup,
4   emG_userName, emG_registeredUsers, emG_msgNumber, emG_maildata,
5   emG_mode, emG_noSimulate, emG_mailFileList, emG_boxName
6
7     --- Register the "YAK YAK" text to speech xtra
8     -- register xtra "Yak", "XXXXXXXXXXXXX"
9
10    -- VARIABLE LIST
11    ---  emG_userName:  Tracks current user by name
12    ---  emG_msgNumber:  Tracks if a message is new (empty) or old
13  (number)
14    ---  emG_registeredUsers:  Tracks users for to boxes in movies
15    ---  emG_passwordList:  List of passwords for user logon:
16  [password:name]
17    ---  emG_maildata:  Message data list:
18    ---         #to, #from, #re, #date, #mimetype, #mbxName, #msgbody
19    --   NOT IMPLEMENTED -> #mbxName: now takes the place of #status -
20  eliminate case statement...
21    ---  emG_mode: flag for message movies; #author, #display
22    ---  emG_noSimulate: disable simulate Mode for message handler movies
23    ---  emG_userGroupList:  for testing rebus game
24    ---  emG_userGroup:   for testing rebus
25    ---  emG_mailFileList: List of locations of mailfiles for each user:
26    ---                     [uname:filename]
27    ---  emG_boxName:  a mailbox datastructure; used to pass mailboxes to
28  the mailbox movie
29
30    -- Install the menu
31    installMenu "main menu"
32
33    -- Clear all global variables
34
35    set emG_noSimulate = TRUE
36
37    --- Make sure the AddUsers button is not visible
38    set the visible of sprite 20 = FALSE
39
40    initSystemUsersData()
41    initializeUser()
42    initializeFields()
43    fillStudentName()
44    clearPassword()
45
46  end
47
48
```

Appendix A:  KidCode® Lingo Client/Server Email Main Scripts

Page 2

```
49  on stopMovie
50
51     global instanceOfXtra, emG_passwordList, emG_userGroupList,
52  emG_userGroup, emG_userName, emG_msgNumber, emG_maildata, emG_mode
53
54     -- Clear all fields and global variables
55
56     put "" into field "addPass"
57     put "" into field "addUserGroup"
58     put "" into field "addName"
59     put "" into field "userList"
60     put "" into field "studentName"
61     put "" into field "studentUpName"
62     put "" into field "studentPass"
63
64     put "" into emG_userName
65     set emG_msgNumber = 0
66     set emG_registeredUsers = []
67     set emG_passwordList = [:]
68     set emG_userGroupList = [:]
69     set emG_maildata = [:]
70
71     set emG_userGroup = 0
72     set emG_mode = #empty
73
74     clearPassword()
75
76     -- empty the script used to read in mailboxes
77     set the scriptText of member 65 = ""
78
79     --- Make sure the AddUsers button is not visible
80     set the visible of sprite 20 = FALSE
81
82  end
83
84
85  --   score script 3  ss_goTheFrame
86
87  on exitFrame
88
89     go the frame
90
91  end
92
93
```

Appendix A: KidCode® Lingo Client/Server Email Main Scripts

Page 3

```
94   --- Modified 8-9-98. To include a mailfile location for each
95   --- user. Added global variable emG_mailFileList. Also changed
96   --- format of the users file to be comma delimited items. This
97   --- will avoid problem with spaces in full pathnames for
98   --- user mailbox files.
99
100  on initSystemUsersData
101     global emG_registeredUsers
102     global emG_passwordList, emG_userGroupList, emG_mailFileList
103
104     set emG_registeredUsers = []
105     set emG_passwordList = [:]
106     set emG_userGroupList = [:]
107     set emG_mailFileList = [:]
108
109     set usersData = readUsersFile()
110
111     put the number of lines of usersData into totalLines
112     repeat with i = 1 to totalLines
113
114       if line i of usersData = EMPTY then
115         nothing
116       else
117         set uname = item 1 of line i of usersData
118         set pw = item 2 of line i of usersData
119         set ugroup = value(item 3 of line i of usersData)
120         set mfile = item 4 of line i of usersData
121
122         add emG_registeredUsers, uname
123         addProp emG_passwordList, uname, pw
124         addProp emG_userGroupList, uname, ugroup
125         addProp emG_mailFileList, uname, mfile
126       end if
127
128     end repeat
129
130     sortRegisteredUsers()
131
132  end initSystemUsersData
133
134  -------------------------------------------------------------
135  on initializeUser
136
137     global emG_userGroup, emG_userName
138     global emG_msgNumber, emG_maildata, emG_mode
139
140     put "" into emG_userName
141     set emG_msgNumber = 0
142     set emG_maildata = [:]
143     set emG_userGroup = 0
144     set emG_mode = #empty
145
146  end initializeMyGlobals
147
```

Appendix A: KidCode® Lingo Client/Server Email Main Scripts

Page 4

```
148   -----------------------------------------------------------------
149   -- Initialize formatting of all visible text fields
150   -- Should be called when movie starts
151
152   on initializeFields
153
154      -- SetTextInfo "StudentName", " ", "left", "arial", 14, "bold"
155      SetTextInfo "StudentUpName", "your username here ", "left", "arial",
156   14, "bold"
157      SetTextInfo "StudentPass", "", "left", "arial", 14, "bold"
158
159      put "" into field "addPass"
160      put "" into field "addUserGroup"
161      put "" into field "addName"
162      put "" into field "userList"
163
164      -- set the lineHeight of field "To" = 18
165      -- set the border of member "To" = 1
166      -- set the border of member "ToDown" = 1
167      -- set the margin of member "ToDown" to 8
168
169   end initializeFields
170
171   -----------------------------------------------------------------
172   --   THIS HANDLER FILLS THE STUDENT LOGON NAME FIELD
173   --   WITH THE CURRENT LIST OF STUDENT NAMES
174
175   on fillStudentName
176      global emG_registeredUsers
177
178      -- Clear the student name field for the kids' logon
179      put "" & RETURN into field "studentName"
180
181      repeat with uname in emG_registeredUsers
182
183         put uname & RETURN after field "studentName"
184
185      end repeat
186
187      -- Bring the field back to the top line
188      set the scrollTop of member "studentName" = 0
189
190   end
191
192   -----------------------------------------------------------------
193   -- For convenience of all the message handleing movies
194   -- keep emG_registeredUsers in a special sorted order:
195   -- alphabetic with "administrator" at the end.
196   .
197   on sortRegisteredUsers
198      global emG_registeredUsers
199
200      -- fix up emG_registeredUsers in sorted order but
201      -- with "administrator" at the end
```

Appendix A: KidCode® Lingo Client/Server Email Main Scripts

Page 5

```
    deleteOne(emG_registeredUsers, "administrator")
    sort(emG_registeredUsers)
    append(emG_registeredUsers, "administrator")

end sortRegisteredUsers
--mailbox handlers

-----------------------------------------------------------
--- openMailbox starts the mailbox movie
--- because the call must be continued in emh_continue
--- it is necessary to use a global variable for the
--- mailbox name.

on openMbx boxName
  global emG_boxName set emG_BoxName = boxName go to frame "movie"

-- since all sprites are automatically puppets in Dir 6.0
  -- next should not be necessary
  -- Take control of the sidebar buttons puppetSprite 6, TRUE
  puppetSprite 7, TRUE
  puppetSprite 8, TRUE
  puppetSprite 9, TRUE set mbxMovie = window "mailbox.dir"
  set the titleVisible of mbxMovie to FALSE
  set the rect of mbxMovie = getMovieRect("mailbox")

open mbxMovie
  set the name of mbxMovie to "childWindow"

tell window "childWindow"
    -- next is a hack to get around Macromedia MIAW bug
    -- see emh_continue for calls to real handlers
    emc_startMeUp()

end tell

-- CONTINUES in emh_continue
end

-----------------------------------------------------------
-- Read mailbox accepts a string that is the mailbox name
-- and returns a mailbox datastructure that is the
-- mailbox name and a list of the messages in that box on readMailbox boxName
  global emG_userName, emG_mailFileList
```

Appendix A:   KidCode® Lingo Client/Server Email Main Scripts

Page 6

```
256    --
257    --   "inbox"    : set bxstring = "#mbxName: #received"
258    --   "outbox"   : set bxstring = "#mbxName: #sent"
259    --   "savebox"  : set bxstring = "#mbxName: #saved"
260    --   "trashbox" : set bxstring = "#mbxName: #trashed"
261
262       set msgList = []
263
264
265       set mbxStruc = list(boxName, msgList)
266       set mailFileName = getProp(emG_mailFileList, emG_userName)
267
268       --  Start up Fileio Xtra
269       set instanceOfXtra = new(xtra "fileio")
270
271       --  Set up Fileio to read from users file
272       openFile(instanceOfXtra, mailFileName, 1)
273
274
275       --  If file users doesn't exist, create it and set it up for read
276       if status(instanceOfXtra) <> 0 then
277         createFile(instanceOfXtra, mailFileName)
278         openFile(instanceOfXtra, mailFileName, 1)
279       end if
280
281       --  Read what's currently in the file
282       set whatText = readFile(instanceOfXtra)
283
284       -- put msgs from appropriate box into the message list
285       -- this needs to be fixed after the mail file datastructure
286       -- is changed...
287
288    --   if value(#mbxname) <> 0 then
289    --     alert "Invalid mailbox name."
290    --     return(0)
291    --   end if
292
293       --OLD case statement
294         case boxname of
295           "inbox"    : set bxstring = "#status: #received"
296           "outbox"   : set bxstring = "#status: #sent"
297           "savebox"  : set bxstring = "#status: #saved"
298           "trashbox" : set bxstring = "#status: #trashed"
299
300           otherwise:
301             alert "Invalid mailbox name."
302             return(0)
303         end case
304
305       -- inefficient to have to look for the "#status...string"
306       -- now is changed to value(#string) turning the string into a value, as
307
308       -- Director has difficuties with strings w/in property lists...
309
```

Appendix A: KidCode® Lingo Client/Server Email Main Scripts

Page 7

```
310    repeat with i = 1 to the number of lines in whatText
311
312      if line i of whatText contains bxstring then
313        append(msgList, value(line i of whatText))
314      end if
315
316    end repeat
317
318
319    -- Close Fileio Xtra
320
321    closeFile(instanceOfXtra)
322
323    set instanceOfXtra = 0
324
325    return(mbxStruc)
326
327  end
328
329  on messageHandler msgStatus
330
331    global emG_userName, emG_maildata, emG_msgNumber, emG_mode,
332  emG_mailFileList
333
334    put "" into sendData
335
336    setProp emG_maildata, #status, msgStatus
337
338
339    -- Set up where to find the users mailfile
340    set whatFile = getProp(emG_mailFileList, emG_userName)
341
342
343    -- Start up Fileio Xtra
344    set instanceOfXtra = new(xtra "fileio")
345
346
347    -- Set up Fileio to read and write from/to users file
348    openFile(instanceOfXtra, whatFile, 0)
349
350
351    -- If file users doesn't exist, create it and set it up for
352  read/write
353    if status(instanceOfXtra) <> 0 then
354      createFile(instanceOfXtra, whatFile)
355      openFile(instanceOfXtra, whatFile, 0)
356    end if
357
358
359    -- Read what's currently in the file
360    set whatText = readFile(instanceOfXtra)
361
362
363    -- Add message to current user's mailbox
```

Appendix A:   KidCode® Lingo Client/Server Email Main Scripts

Page 8

```
364      ---  if it previously existed, then write over the old message
365      ---  if not, add it to the bottom
366      --- Only messages with a status = #saved can be changed.
367
368      if emG_msgNumber <> 0 then
369        repeat with i = 1 to the number of lines in whatText
370          if i = emG_msgNumber then
371            put emG_maildata & RETURN after sendData
372          else if line i of whatText <> "" then
373            put line i of whatText & RETURN after sendData
374          end if
375        end repeat
376
377      else if emG_msgNumber = 0 then
378        put whatText into sendData
379        put emG_maildata & RETURN after sendData
380      end if
381
382
383      --  Put the cursor at the begining of the users file
384      setPosition(instanceOfXtra, 0)
385
386
387      --  Overwrite users file with updated list
388      writeString(instanceOfXtra, sendData)
389
390
391      --  Close Fileio Xtra
392
393      closeFile(instanceOfXtra)
394
395      set instanceOfXtra = 0
396
397
398      -- ON SEND, PUT IN OTHER CHILD'S MAILBOX, TOO
399
400      if msgStatus = #sent then
401
402        setaProp emG_maildata,#status,#received
403
404        put getaProp(emG_maildata,#to) into sendingTo
405
406        put "" into sendData
407
408
409        --  Set up where to find the users file
410        -- put the pathName & sendingTo into whatFile
411        set whatFile = getProp(emG_mailFileList, sendingTo)
412
413
414        --  Start up Fileio Xtra
415        set instanceOfXtra = new(xtra "fileio")
416
417
```

Appendix A:  KidCode® Lingo Client/Server Email Main Scripts

Page 9

```
418        -- Set up Fileio to read and write from/to users file
419        openFile(instanceOfXtra, whatFile, 0)
420
421
422        -- If file users doesn't exist, create it and set it up for
423     read/write
424        if status(instanceOfXtra) <> 0 then
425           createFile(instanceOfXtra, whatFile)
426           openFile(instanceOfXtra, whatFile, 0)
427        end if
428
429
430        -- Read what's currently in the file
431        set whatText = readFile(instanceOfXtra)
432
433        -- Add message to recipient's mailbox
434        put emG_maildata & RETURN after whatText
435
436        -- Put the cursor at the begining of the users file
437        setPosition(instanceOfXtra, 0)
438
439        -- Overwrite users file with updated list
440        writeString(instanceOfXtra, whatText)
441
442
443        -- Close Fileio Xtra
444
445        closeFile(instanceOfXtra)
446        set instanceOfXtra = 0
447
448     end if
449
450  end
451  ------------------------------------------------------------
452  on createMailData  userName,  type
453
454     set newmsg = [:]
455     addProp(newmsg, #to, "")
456     addProp(newmsg, #from, userName)
457     addProp(newmsg, #re, "")
458     addProp(newmsg, #date, the abbreviated date)
459     addProp(newmsg, #mimetype, type)
460     addProp(newmsg, #status, #new)
461     addProp(newmsg, #msgbody, [])
462     return(newmsg)
463
464  end createMailData
465
466  ------------------------------------------------------------
467  --- Make sure there is something in each of the "to"
468  --- and "from" fields and that the messagebody has the
469  --- right format.
470
471  on isValidMessage  maildata
```

Appendix A:  KidCode® Lingo Client/Server Email Main Scripts

Page 10

```
     repeat with prop in [#to, #from]
       if getProp(maildata, prop) = "" then
         alert "But who do you wish to send this message to?"
         --return(0)
       end if
     end repeat if not listp(getProp(mailData, #msgBody)) then return(0)

return(1)

end isValidMessage

------------------------------------------------------------ on setReply

--   TAKES CARE OF SWITCHING THE SIDEBAR BUTTONS WHEN REPLY
     --   IS HIT FROM AN OPEN MESSAGE go to "Movie"   -- make sure the frame is correct -- Set the buttons with reply off and send on
     disableReply()
     enableSend()

end

------------------------------------------------------------ on disableSend
     go to "movie"
     puppetsprite 7, TRUE
     set the member of sprite 7 = member "SendNo"
  end disableSend on enableSend
     go to "movie"
     puppetsprite 7, TRUE
     set the member of sprite 7 = member "Send"
  end enableSend on disableReply
     go to "movie"
     puppetsprite 6, TRUE
     set the member of sprite 6 = member "ReplyNo"
  end disableSend on enableReply
     go to "movie"
     puppetsprite 6, TRUE
     set the member of sprite 6 = member "Reply"
```

Appendix A:  KidCode® Lingo Client/Server Email Main Scripts

Page 11

```
526   end enableSend
527
528   _____
529   on returnToMain
530
531      global emG_msgNumber, emG_maildata, emG_mode
532
533      -- Clear the variables
534
535      set emG_msgNumber = 0
536      set emG_maildata = [:]
537      set emG_mode = #empty
538
539      --- unpuppet the left panel buttons which reuse sprite
540      --- channels 6-9
541      -- MB 10-13-98 I don't like this method... it is safer
542      -- to use new sprite channels.
543      -- is there a good reason for reusing channels...does it
544      -- affect performance?
545
546      puppetsprite 6, FALSE
547      puppetsprite 7, FALSE
548      puppetsprite 8, FALSE
549      puppetsprite 9, FALSE
550
551      -- Go back to the main menu
552
553      go to "open"
554
555   end
556
557   -- API handlers
558
559   --- emh_getUserMailbox returns the current user's mailbox specified
560   --- by the mailBoxName parameter.
561
562   on emh_getUserMailbox  mailboxName
563
564      return(readMailbox(mailBoxName))
565
566   end emh_getUserMailbox
567
568   ----------------------------------------------------------------
569
570   on emh_getUserName
571      global emG_userName
572
573      return(emG_userName)
574
575   end emh_getUserName
576
577   ----------------------------------------------------------------
578
579   on emh_getUserData  userName
```

Appendix A: KidCode® Lingo Client/Server Email Main Scripts

Page 12

```
580    global emG_userGroupList, emG_mailFileList
581
582    return(list (username, ¬
583    username, getProp(emG_userGroupList, username),
584    getProp(emG_mailFileList, userName), [], list ( "inbox", "outbox",
585    "savebox") ))
586
587  end emh_getUserData
588
589
590  -- more API handlers
591
592  ----------------------------------------------------------------
593  --- A curse on Macromedia.  This ugly hack is used to get
594  --- around a Macromedia bug which causes the startMovie
595  --- handler of a MIAW to run only after control has been
596  --- transferred back to the calling movie and the calling
597  --- movie advances a frame.
598
599  --- This handler is called by the startMovie handler of the
600  --- MIAW.  This way we ensure that these scripts only run
601  --- after the MIAW has been properly initialized.
602
603  on emh_continue  componentType
604     global emG_userName, emG_maildata, emG_mode, emG_boxName,
605  emG_userGroup
606
607     -- Since this function can only be called by a MIAW component
608     -- we assume that the "childwindow" is running
609
610     if componentType = #msgHandler then
611        tell window "childwindow"
612           emc_initWindow(emG_userName)
613           msh_openMessage(emG_maildata, emG_mode)
614        end tell
615
616     else if componentType = #mailbox then
617        tell window "childwindow" to emc_initWindow(emG_userName)
618        set success = the result
619        if not success then
620           alert "Could not initialize mailbox movie"
621           forget window "childwindow"
622           return(0)
623        end if
624
625        set mbx = readMailbox(emG_boxName)
626        tell window "childwindow" to mbx_openMailbox(mbx)
627        set success = the result
628        if not success then
629           alert "Could not open mailbox."
630           forget window "childwindow"
631           return(0)
632        end if
633
```

Appendix A: KidCode® Lingo Client/Server Email Main Scripts

Page 13

```
634     else alert "ERROR invalid componenttype."
635
636   end emh_continue
637
638
639   -- more API handlers
640   ------------------------------------------------------------
641   -- The emh_passMessage handler is used to pass a message from
642   -- a mailbox to the appropriate message handler
643
644   on emh_passMessage maildata, messageNumber
645
646     global emG_maildata, emG_msgNumber, emG_mode
647
648     -- should check for errors in the parameters
649
650     set emG_maildata = mailData
651     set emG_msgNumber = messageNumber
652
653     -- If a mailbox window is open we need to close that window.
654     -- The window will not actually close until this function completes
655     -- and returns control to the caller function in the mailbox movie.
656     -- Therefore, we need to move it to the back so it is no longer
657   visible.
658
659     moveToback window "childwindow"
660     updatestage
661
662     tell window "childWindow" to emc_getComponentInfo()
663     set cInfo = the result
664     if getComponentProp(cInfo, #ComponentType) = #mailbox then
665       tell window "childWindow" to emc_closeWindow()
666       forget window "childWindow"
667     end if
668
669     go to frame "movie"
670     -- set up the button bar on the left
671
672     set msgStatus = getProp(emG_maildata, #status)
673     if msgStatus = #received then     -- from inbox
674       set emG_mode = #display
675       disableSend()
676       enableReply()
677     else if msgStatus = #sent then    -- from outbox
678       set emG_mode = #display
679       disableSend()
680       disableReply()
681     else if msgStatus = #saved then   -- from savebox
682       set emG_mode = #author
683       disableReply()
684       enableSend()
685     else    -- error
686       alert "passing message with invalid status"
687       return(0)
```

Appendix A: KidCode® Lingo Client/Server Email Main Scripts

Page 14

```
688      end if
689
690      --- OPEN MESSAGE HANDLER MOVIE
691
692      openMsgHandler(getaProp(emG_maildata,#mimetype), emG_maildata)
693
694    end emh_passMessage
695
696    -- more API handlers
697    ------------------------------------------------------------------
698    -- THIS CODE IS BASED ON OLD STUFF WHICH USES MESSAGE NUMBER
699    -- TO IDENTIFY MESSAGES ACROSS MAILBOXES.  THIS SYSTEM
700    -- NEEDS TO BE CHANGED TO IDENTIFY MESSAGES BY A MAILBOXNAME
701    -- AND A MESSAGE NUMBER WITHIN THE BOX
702
703    on emh_getMessage messageNumber, typeorBoxName
704
705      global emG_userName, emG_msgNumber, emG_mailData
706
707      set emG_msgNumber = messageNumber
708
709      if messageNumber = 0 then   -- return new message data
710         --typeorBoxName should have mimetype
711         set emG_maildata = createMailData(emG_userName, typeorBoxName)
712         return(emG_maildata)
713      end if
714
715      -- otherwise find an existing message
716      -- typeorboxname should have boxName
717
718      set theBox = readMailbox(typeorBoxName)
719      set emG_mailData = getat(getAt(theBox, 2), messageNumber)
720      return(emG_maildata)
721
722    end emh_getMessage
723
724    ------------------------------------------------------------------
725
726    on emh_getRegisteredUsers
727       global emG_registeredUsers
728
729       return(emG_registeredUsers)
730
731    end emh_getRegisteredUsers
732
733    ------------------------------------------------------------------
734
735    on emh_killComponent
736
737      tell window "childwindow" to emc_closeWindow()
738      if the result = 0 then alert "TROUBLE CLOSING WINDOW!"
739      else
740         forget window "childwindow"
741      end if
```

Appendix A: KidCode® Lingo Client/Server Email Main Scripts

Page 15

```
742    returnToMain()
743
744  end emh_killComponent
745
746  ----------------------------------------------------------------
747  --- Initialize formatting of text fields
748  --- Thanks to Frank Leahy, maricopa site for this one
749
750  on SetTextInfo fldName, fldValue, fldAlign, fldFont, fldSize,
751  fldStyle
752
753    put fldValue into field fldName
754    set the textAlign of field fldName = fldAlign
755    set the textFont of field fldName = "arial"    --fldFont
756    set the textSize of field fldName = fldSize
757    set the textStyle of field fldName = fldStyle
758
759  end
760
761  ----------------------------------------------------------------
762
763  -- script of cast member studentName
764  -- emG_userName should not be set here
765  -- because it could be invalid
766
767  on mouseUp
768
769    --  Put selected user name into up version of student field
770    --  switch the field from down to up
771
772    put word 1 of line(the mouseLine) of field "studentName" into field
773  "studentUpName"
774
775    set the member of sprite 14 to member "StudentUpName"
776
777  end
778
779
780  -- script of cast member studentUpName
781
782  on mouseUp
783
784    --  Pull down student field: change field from
785    --  up (sprite 17) to down (sprite 16)
786
787    set the member of sprite 14 to member "StudentName"
788
789    -- clear password field
790    clearPassword()
791
792  end
793
794
795
```

Appendix A:    KidCode® Lingo Client/Server Email Main Scripts

Page 16

```
796   -- scripts of cast member studentPassword
797
798
799   on keyUp
800      global gpw, gpwlen
801      --gpw is global password and
802      --gpwlen is global password length
803
804      hideAlert()   -- user maybe trying again...hide badPwMsg
805
806      if the key = RETURN then
807         if checkPassword(field "studentUpName", gpw) then
808            enterMainEmail(field "studentUpName")
809         else --- invalid password
810            alertBadPassword()
811         end if
812         set gpw = ""
813         set gpwlen = 0
814         put "" into field "studentPass" -- reset the password field
815      end if
816
817   end keyUp
818
819   --------------------------------------------------------------------
820
821   on keyDown
822      global gpwlen, gpw
823
824      --eats the key, otherwise it will appear until keyup
825
826      if the key = BACKSPACE then
827         put "" into char gpwlen of field "studentPass"
828         put "" into char gpwlen of gpw
829         if gpwlen > 0 then
830            set gpwlen = gpwlen - 1
831         end if
832      else if the key = RETURN then
833         nothing
834      else if the keycode >= 117 and the keycode <= 126 then
835         nothing
836      else
837         put "*" after field "studentPass"
838         put the key after gpw
839         set gpwlen = gpwlen + 1
840
841      end if
842
843      set the selstart = gpwlen
844      set the selend = the selstart
845
846   end keyDown
847
848
849   -- script of cast member goStudentLog
```

Appendix A: KidCode® Lingo Client/Server Email Main Scripts

Page 17

```
on mouseUp go to frame "pass"

end

-- script of cast member editUsers on mouseUp

-- set the default pathname for the mail file location
   put the pathname into field "addMailFileLoc"

go to frame "edit"

end

-- script of cast member okUser on mouseDown
   set the member of sprite 7 = "okay down"
end -- script of cast member okDown on mouseUp
   global gpw, gpwlen   --- see script of field studentPass set the member of sprite 7 = "okayUser"

if checkPassword(field "studentUpName", gpw) then
      -- valid user & pw
      enterMainEmail(field "studentUpName")

else   -- password invalid alertBadPassword()

end if clearPassword()

end
```

Appendix A: KidCode® Lingo Client/Server Email Main Scripts

Page 18

```
900  -- script of cast member addUser
901
902  on mouseUp
903    global emG_registeredUsers
904    global emG_passwordList, emG_userGroupList, emG_mailFileList
905
906    --check that username is filled and is unique
907
908    if field "addName" = EMPTY then
909      alert "No username"
910      return(0)
911    else if getOne(emG_registeredUsers, field "addName") then
912      alert "Username already in system.  Choose a different name"
913      return(0)
914
915    else set uname = field "addName"
916
917    --NEED TO TAKE CARE OF THIS!!!!
918    -- check that the mailfile location is a valid directory
919    -- there are serious problems with this at present
920    -- for now assume pathnames are valid
921
922
923    --  add new User data to system global variables
924    add(emG_registeredUsers, uname)
925    addProp(emG_passwordList, uname, field "addPass")
926    addProp(emG_userGroupList, uname, field "addUserGroup")
927    -- append username to the mailfile location directory
928    addProp(emG_mailFileList, uname, field "addMailFileLoc" & uname)
929
930    sortRegisteredUsers()
931
932    -- write the users file with system users data
933    writeUsersFile()
934
935    --  Put the updated user list into the userList field
936    put "" into field "userList"
937    repeat with uname in emG_registeredUsers
938      put uname after field "userList"
939      put " " & getProp(emG_passwordList, uname) after field "userList"
940      put " " & getProp(emG_userGroupList, uname) after field "userList"
941      put " " & getProp(emG_mailFileList, uname) after field "userList"
942      put RETURN after field "userList"
943    end repeat
944
945
946    --  reset the User data fields
947
948    put "" into field "addUserGroup"
949    put "" into field "addPass"
950    put "" into field "addName"
951    put the pathname into field "addMailFileLoc"
952
953    -- Refill the kids' logon name field
```

Appendix A: KidCode® Lingo Client/Server Email Main Scripts

Page 19

```
954      fillStudentName()
955
956   end
957
958   -- script of cast member seeUserList
959
960   on mouseUp
961
962      global instanceOfXtra
963
964
965      put "" into field "userList"
966
967
968      -- Set up where to find the users file
969      put the pathName & "users" into whatFile
970
971
972      -- Start up Fileio Xtra
973      set instanceOfXtra = new(xtra "fileio")
974
975
976      -- Set up Fileio to read from users file
977      openFile(instanceOfXtra, whatFile, 1)
978
979
980      -- If file users doesn't exist, create it and set it up for read to
981   avoid error
982
983      if status(instanceOfXtra) <> 1 then
984         createFile(instanceOfXtra, whatFile)
985         openFile(instanceOfXtra, whatFile, 1)
986      end if
987
988
989      -- Read what's currently in the file
990      set whatText = readFile(instanceOfXtra)
991
992
993      -- Put the updated user list into the userList field
994      put whatText into field "userList"
995
996      -- Close Fileio Xtra
997      closeFile(instanceOfXtra)
998
999      set instanceOfXtra = 0
1000
1001  end
1002
1003
1004
1005  -- script of cast member DoneAdmin
1006
1007  on mouseUp
```

Appendix A: KidCode® Lingo Client/Server Email Main Scripts

```
1008
1009      go to frame "open"
1010
1011      put "" into field "addName"
1012      put "" into field "addUserGroup"
1013      put "" into field "addPass"
1014      put "" into field "addMailFileLoc"
1015
1016   end
1017   -- msgHandlers scripts
1018   ----------------------------------------------------------
1019   --- openMsgHandler starts the appropriate Message Handling movie.
1020   --- The call must be continued in emh_continue.
1021   --- It is necessary that the global variable emG_mailData is
1022   --- set up. Therefore, we pass it as a parameter to make it
1023   --- clear that the variable is necessary.
1024
1025   on openMsgHandler mimetype, mailData
1026
1027      set movieName = getMessageHandler(mimetype)
1028      go to frame "movie"
1029
1030      -- since all sprites are automatically puppets in Dir 6.0
1031      -- next should not be necessary
1032      -- Take control of the sidebar buttons
1033
1034      puppetSprite 6, TRUE
1035      puppetSprite 7, TRUE
1036      puppetSprite 8, TRUE
1037      puppetSprite 9, TRUE
1038
1039      set mshMovie = window movieName
1040      set the titleVisible of mshMovie to FALSE
1041      set the rect of mshMovie = getMovieRect(mimetype)
1042
1043      open mshMovie
1044      set the name of mshMovie to "childWindow"
1045
1046      tell window "childWindow"
1047         -- next is a hack to get around Macromedia MIAW bug
1048         -- see emh_continue for calls to real handlers
1049         emc_startMeUp()
1050
1051      end tell
1052
1053      -- CONTINUES in emh_continue
1054   end openMsgHandler
1055
1056
1057   ----------------------------------------------------------
1058   -- getMessageHandler returns filename of movie to handle mimetype.
1059   -- This code makes it easy to make changes in movie filenames
1060   -- and to add new message handling movies.
1061
```

Appendix A:   KidCode® Lingo Client/Server Email Main Scripts

Page 21

```
on getMessageHandler  mimetype case mimetype of
    "text": return("text.dir")
    "rebus": return("rebus.dir")
    "grid": return("grid.dir")
    "connect": return("connect.dir")
    "puzzle" : return("puzzle.dir")

otherwise:
      alert "Invalid mimetype of message."
      return("")
  end case end getMessageHandler
----------------------------------------------------------- on getMovieRect  whichMovie

--- the top of green panel
  set movieTop = the top of sprite 3
  --- the left of green panel
  set movieLeft = the left of sprite 3 case whichMovie of
    "rebus", "rebus.dir":
      set theRect= rect(movieLeft, movieTop, ¬
                       movieLeft + 640, movieTop +480)
    "text", "text.dir":
      set theRect= rect(movieLeft, movieTop, ¬
                       the stageRight - 5, the stageBottom -5)
    "puzzle", "puzzle.dir":
      set theRect= rect(movieLeft, movieTop, ¬
                       the stageRight - 5, the stageBottom -5)
    "grid", "grid.dir", "connect", "connect.dir":
      set theRect= rect(movieLeft, movieTop, ¬
                       the stageRight - 5, the stageBottom -5)
    "mailbox", "mailbox.dir":
      set theRect= rect(movieLeft, movieTop, ¬
                       the stageRight - 5, the stageBottom -5)
    otherwise:
      alert "ERROR: invalid movieName: " & whichMovie
      set theRect = rect(0,0,0,0)

end case return(theRect)

end getMovieRect

-- score script    fr_installMenu
```

Appendix A: KidCode® Lingo Client/Server Email Main Scripts

Page 22

```
1116   on prepareFrame
1117     --first clear away any old menus
1118     installMenu 0
1119     installMenu "main menu"
1120   end
1121
1122
1123   -- password verification and user init
1124
1125
1126
1127   on enterMainEmail username
1128     global emG_userName, emG_userGroup, emG_userGroupList
1129
1130     set emG_userName = username
1131     set emG_userGroup = getProp(emG_userGroupList, emG_userName)
1132
1133     -- ADMINISTRATOR has access to the "Edit Users" button
1134     if emG_userName = "administrator" then
1135       set the visible of sprite 20 = TRUE
1136     end if
1137
1138     go to frame "open"
1139
1140   end enterMainEmail
1141
1142   ------------------------------------------------------------
1143
1144
1145   on checkUserName userName
1146     global emG_registeredUsers
1147
1148     if getone(emG_registeredUsers, userName) then
1149       return(1)    -- username is in system
1150
1151     else
1152       alert "User " & userName & "not a KidCode authorized user." & RETURN
1153   & "You cannot login without a valid user name."
1154
1155     end if
1156
1157   end checkUsername
1158
1159   -- more password handling scripts
1160
1161   on checkPassword userName, password
1162     global emG_passwordList
1163
1164     -- if the username is not valid quit this...
1165     if not checkUserName(userName) then return(0)
1166
1167     -- username is valid
1168
1169     --  First part of loop changes capital letters to lower case
```

Appendix A: KidCode® Lingo Client/Server Email Main Scripts

Page 23

```
1170      -- Second part puts lower case letters into password check
1171      -- This eliminates all spaces and/or unacceptable characters
1172
1173      set checkPassword = ""
1174      repeat with i = 1 to the number of chars in password
1175
1176        put char(i) of password into capital
1177        put charToNum(capital) into capital
1178
1179        if capital <= 90 and capital >= 65 then
1180          put numToChar(capital + 32) after checkPassword
1181        else if capital >= 97 and capital <= 122 then
1182          put numToChar(capital) after checkPassword
1183        end if
1184
1185      end repeat
1186
1187      -- CHECK PASSWORD
1188
1189      set realPassword = getProp(emG_passwordList, username)
1190
1191      if realpassword = checkPassword then
1192        return(1)   --TRUE
1193      else
1194        return(0)
1195      end if
1196
1197
1198    end checkPassword
1199
1200    ----------------------------------------------------------------
1201
1202    on clearPassword
1203      global gpw, gpwlen
1204
1205      set gpw = ""
1206      set gpwlen = 0
1207      put "" into field "StudentPass"
1208
1209    end clearPassword
1210
1211    ----------------------------------------------------------------
1212
1213    on alertBadPassword
1214
1215      set the loc of sprite 17 to point(231, 350)
1216      beep()
1217
1218    end alertBadPassword
1219    on hideAlert
1220
1221      set the loc of sprite 17 to point(-188, -31)
1222
1223    end hideAlert
```

Appendix A: KidCode® Lingo Client/Server Email Main Scripts

Page 24

```
-- script of cast member reply on mouseUp
  global emG_userName, emG_msgNumber
  global emG_maildata, emG_mode, emG_userGroup -- abandon current MailData which should be in the inbox.
  -- Later, the user may choose to either abandon or send
  -- the new replyTo message. That is not a concern.

-- If a mailbox window is open need to get the message
  -- and close that window.

tell window "childWindow" to emc_getComponentInfo()
  set cInfo = the result
  if getComponentProp(cInfo, #ComponentType) = #mailbox then
    tell window "childwindow" to mbx_GetMessageNumber()
    set emG_msgNumber = the result
    if emG_msgNumber <= 0 then
      alert "You must select a message."
      return()    -- abandon the request to reply
    end if tell window "childwindow" to mbx_GetMessage(emG_msgNumber)
    set emG_maildata = the result --- forget window "childwindow" -- done in passMessage --- Now open the appropriate Message Handler
    --- to display the message emh_PassMessage(emG_maildata, emG_msgNumber)

end if

-- If we got to this point message handler is open.
  -- Presumably it has a message displayed. If the message
  -- is empty only the message handler knows that and it
  -- will need to catch the error and return an error code
  -- to msh_replyMessage.

-- The message handling movie's replyMessage handler
  -- should swap "to" and "from"
  -- fields and make the message editable -- set mode to author to keep it consistent with msg handler
  set emG_mode = #author set emG_msgNumber = 0   -- this is now a new message tell window "childWindow"
    global emG_userGroup
```

Appendix A: KidCode® Lingo Client/Server Email Main Scripts

Page 25

```
            -- msg handler will swap "to" with "from" and change
            -- mode to author
            moveToFront window "childWindow"
            msh_replyMessage()
          end tell set emG_maildata = the result -- Toggle the send and reply buttons
          setreply    -- disable reply and enable send buttons end -- script of cast member send on mouseUp
   global emG_maildata, emG_userGroup -- Could check that the childwindow is a messagehandler
   -- but this may not be necessary.

tell window "childWindow"
     global emG_userGroup
     msh_sendMessage()
     set emG_maildata = the result
   end tell if not isValidMessage(emG_maildata) then
     alert "ERROR not a valid message."
     return(0)           -- abandon attempt to send
   end if --- otherwise continue to send message -- NEED TO FIX THIS SO THAT MESSAGE STATUS DOES NOT
   -- BECOME "#sent" if it fails to be saved to both
   -- mail files messageHandler(#sent)   -- for now this uses global emG_maildata -- tell window "childWindow" to msh_clearMessage()

end

-- script of cast member print on mouseUp tell window "childwindow" to emc_getComponentInfo()
   set cInfo = the result
   set cType = getComponentProp(cInfo, #ComponentType)
```

Appendix A: KidCode® Lingo Client/Server Email Main Scripts

Page 26

```
1332      if cType = #mailbox then
1333        -- need to pass the message to its message handling
1334        -- component for printing.  Ideally this can be done
1335        -- without opening a window and laying out the message.
1336
1337        alert "I can't do that right now. Open the message and then print."
1338
1339      else if cType = #msgHandler then
1340
1341        tell window "childwindow"
1342          msh_PrintMessage()
1343        end tell
1344
1345      else alert "ERROR invalid componenttype."
1346
1347    end
1348
1349
1350    -- script of cast member Quit
1351
1352    on mouseUp
1353
1354      handleQuit()
1355
1356    end
1357  _____
1358
1359
1360    on handleQuit
1361
1362      initializeUser()
1363      clearPassword()
1364      go to frame 2
1365
1366      -- make sure the editUsers button is invisible
1367      set the visible of sprite 20 = FALSE
1368
1369    end handleQuit
1370
1371    -- script of cast member trash
1372
1373    --- Email Main now handles all aspects of trashing a
1374    --- message by writing the mail files.  The components
1375    --- are instructed to update their state by clearing the
1376    --- message (if the component is a message handler) or
1377    --- redrawing the message list (if the component is a
1378    --- mailbox.)
1379
1380    --- Should add a confirmation dialog with the user
1381
1382    on mouseUp
1383      global emG_msgNumber   -- number of the current message
1384
1385      tell window "childwindow" to emc_getComponentInfo()
```

Appendix A:  KidCode® Lingo Client/Server Email Main Scripts

Page 27

```
1386     set cInfo = the result
1387     set cType = getComponentProp(cInfo, #ComponentType)
1388
1389
1390     if cType = #mailbox then
1391        -- need to determine which message(s) are currently
1392        -- selected and instruct the mailbox to update its
1393        -- display
1394
1395        -- temporary implementation of mbx_trashMessages does
1396        -- not handle multiple messages as a result the
1397        -- arguments are ignore...
1398
1399        tell window "childwindow" to mbx_trashMessages([])
1400
1401        -- the following lines will be neceessary when
1402        -- mbx_trashMessages is properly implemented. For
1403        -- now, the temporary implementation trashes the
1404        -- message itself.
1405        -- set messageNumbers = the result
1406        -- delete each message in the list of messageNumbers
1407
1408
1409     else if cType = #msgHandler then
1410
1411        -- rewrite the message into the mailfile
1412        messageHandler(#trash)
1413
1414        tell window "childwindow" to msh_clearMessage()
1415
1416     else alert "ERROR invalid componenttype."
1417
1418
1419   end
1420
1421
1422   -- script of cast member text
1423
1424   on mouseUp
1425     global emG_msgNumber
1426     global emG_maildata, emG_mode
1427
1428     -- START A NEW MESSAGE
1429
1430     set emG_msgNumber = 0
1431     set emG_mode = #author
1432     set emG_maildata = createMailData(emG_userName, "text")
1433
1434     openMsgHandler("text", emG_mailData)
1435
1436     disableReply()
1437
1438   end
1439
```

Appendix A: KidCode® Lingo Client/Server Email Main Scripts

Page 28

```
1440  ----------------------------------------------------------------
1441  ---
1442  -- script of cast member Rebus
1443
1444  on mouseUp
1445    global emG_msgNumber
1446    global emG_maildata, emG_mode
1447
1448    -- START A NEW MESSAGE
1449
1450    set emG_msgNumber = 0
1451    set emG_mode = #author
1452    set emG_maildata = createMailData(emG_userName, "rebus")
1453
1454    openMsgHandler("rebus", emG_mailData)
1455
1456    disableReply()
1457
1458  end
1459
1460
1461  --- script of cast member grid
1462
1463  on mouseUp
1464    global emG_msgNumber
1465    global emG_maildata, emG_mode
1466
1467    -- START A NEW MESSAGE
1468
1469    set emG_msgNumber = 0
1470    set emG_mode = #author
1471    set emG_maildata = createMailData(emG_userName, "grid")
1472
1473    openMsgHandler("grid", emG_mailData)
1474
1475    disableReply()
1476
1477  end
1478
1479  _____
1480  --- script of cast member puzzle
1481
1482  on mouseUp
1483    global emG_msgNumber
1484    global emG_maildata, emG_mode
1485
1486    -- START A NEW MESSAGE
1487
1488    set emG_msgNumber = 0
1489    set emG_mode = #author
1490    set emG_maildata = createMailData(emG_userName, "puzzle")
1491
1492    openMsgHandler("puzzle", emG_mailData)
1493
```

Appendix A: KidCode® Lingo Client/Server Email Main Scripts
Page 29

```
1494      disableReply()
1495
1496   end
1497
1498
1499   --- script of cast member connect
1500
1501   on mouseUp
1502      global emG_msgNumber
1503      global emG_maildata, emG_mode
1504
1505      -- START A NEW MESSAGE
1506
1507      set emG_msgNumber = 0
1508      set emG_mode = #author
1509      set emG_maildata = createMailData(emG_userName, "connect")
1510
1511      openMsgHandler("connect", emG_mailData)
1512
1513      disableReply()
1514
1515   end
1516
1517
1518   on getComponentProp infoList, prop
1519
1520      --- need to add error checking code
1521
1522      case prop of
1523         #componentName: return(getAt(infolist, 1))
1524         #componentID: return(getAt(infolist, 2))
1525         #componentType: return(getAt(infolist, 3))
1526         #componentMIMEtype: return(getAt(infolist, 4))
1527
1528         otherwise: alert "ERROR no component property."
1529      end case
1530
1531   end getComponentProp
1532
1533   -- script of cast member savebox
1534
1535   on mouseUp
1536
1537      openMbx("savebox")
1538
1539   end
1540
1541
1542   -- script of cast member inbox
1543
1544   on mouseUp
1545
1546      openMbx("inbox")
1547
```

Appendix A: KidCode® Lingo Client/Server Email Main Scripts

Page 30

```
1548    end
1549
1550
1551
1552    -- script of cast member outbox
1553
1554    on mouseUp
1555
1556      openMbx("outbox")
1557
1558    end
1559
1560
1561    --- Users File functions
1562
1563    -- returns a string of all users data from the users file.
1564
1565    -- THIS FUNCTION NEEDS TO CHECK THAT DATA IS VALID
1566
1567    on readUsersFile
1568
1569      -- Set up where to find the users file
1570      put the pathName & "users" into whatFile
1571
1572      -- Start up Fileio Xtra
1573      set instanceOfXtra = new(xtra "fileio")
1574
1575      -- Set up Fileio to read from users file
1576      openFile(instanceOfXtra, whatFile, 1)
1577
1578
1579      -- If file users doesn't exist, create it
1580
1581      if status(instanceOfXtra) <> 0 then
1582        createFile(instanceOfXtra, whatFile)
1583        openFile(instanceOfXtra, whatFile, 1)
1584      end if
1585
1586
1587      -- Read what's currently in the file
1588      set whatText = readFile(instanceOfXtra)
1589
1590
1591      -- if no users are defined, assume administrator as default user
1592      -- Administrator info is not written into the user's file until at
1593      -- least one user is defined.  This occurs in AddUsers functions.
1594
1595      if whatText = "" then
1596        -- for now, assume admin has mail file in each
1597        -- location where kidcode is installed
1598        put "administrator,kidcode,0," & the pathName & "administrator" &
1599    RETURN into whatText
1600      end if
1601
```

Appendix A: KidCode® Lingo Client/Server Email Main Scripts

Page 31

```
1602       -- Close Fileio Xtra
1603       closeFile(instanceOfXtra)
1604       set instanceOfXtra = 0
1605
1606       return(whatText)    -- string read from users file
1607
1608    end readUsersFile
1609
1610
1611    ------------------------------------------------------------
1612    -- more users file scripts
1613
1614    on writeUsersFile
1615       global emG_registeredUsers, emG_passwordList, emG_userGroupList,
1616    emG_mailFileList
1617
1618       -- Set up where to find the users file
1619       put the pathName & "users" into whatFile
1620
1621       -- Start up Fileio Xtra
1622       set instanceOfXtra = new(xtra "fileio")
1623
1624       -- Set up Fileio to read and write from/to users file
1625       openFile(instanceOfXtra, whatFile, 0)
1626
1627       -- If file users doesn't exist, create it and set it up for
1628    read/write
1629
1630       if status(instanceOfXtra) <> 0 then
1631          createFile(instanceOfXtra, whatFile)
1632          openFile(instanceOfXtra, whatFile, 0)
1633       end if
1634
1635       -- Put the cursor at the begining of the users file
1636       setPosition(instanceOfXtra, 0)
1637
1638       --- put together string of usersData
1639       set whatText = ""
1640       repeat with uname in emG_registeredUsers
1641
1642          set pw = getProp(emG_passwordList, uname)
1643          set ugroup = getProp(emG_userGroupList, uname)
1644          set mfile = getProp(emG_mailFileList, uname)
1645          set whatText = whatText & uname & "," & pw & "," & ugroup & "," &
1646    mfile & RETURN
1647
1648       end repeat
1649
1650       -- Overwrite users file with updated list
1651       writeString(instanceOfXtra, whatText)
1652
1653       -- Close Fileio Xtra
1654
1655       closeFile(instanceOfXtra)
```

Appendix A: KidCode® Lingo Client/Server Email Main Scripts

Page 32

```
1656
1657     set instanceOfXtra = 0
1658     return(1)
1659
1660   end writeUsersFile
1661
1662   ---------------------------------------------------------------
1663   --- these next functions are created to do file checking
1664   --- however they appear to suffer from severe crash problems
1665   --- these problems will also effect mail file creation if
1666   --- path names are invalid...we need to fix this
1667
1668   on pathp pathname
1669
1670     set instanceOfXtra = new(xtra "fileio")
1671     openFile(instanceOfXtra, pathname, 1)
1672     set theval = status(instanceofxtra)
1673
1674     case theval of
1675       0 :
1676         closeFile(instanceOfXtra)
1677         set instanceOfXtra = 0
1678         return(1)
1679
1680       -36:  -- I/O Error...likely to cause system crash
1681         alert "System has become unstable. " & RETURN & "Please save your
1682   work."
1683         -- next call to fileio xtra may crash system
1684         set instanceOfXtra = 0
1685         return(0)
1686
1687       otherwise :
1688         alert " " & error(instanceOfXtra, theval)
1689         closeFile(instanceOfXtra)
1690         set instanceOfXtra = 0
1691         return(0)
1692
1693     end case
1694
1695   end pathExists
1696
1697
1698   on foldertest
1699     getNthFileNameInFolder("C:\windows", 1)
1700   end foldertest
```

Appendix B: KidCode® Lingo Client/Server Sample Mailbox Component Scripts

Page 1

```
1   --Mailbox movie contains the following variables:
2
3   on startMovie
4     global mbxG_username      -- current user name
5     global mbxG_messages      -- list of messages
6     global mbxG_nMsgs         -- number of messages in mailbox
7     global mbxG_boxName       -- current mailbox name
8     global mbxG_whichLine     -- current hilite line = msgNumber
9     global mbxG_subtractLine  -- does this read the previous line as
10  well?
11
12    -- global mbxG_clickCount
13    -- may be used for double click on message to pass
14    --   message to API
15    -- used because "if the doubleClick" in Director is buggy, but
16
17      -- called by API to Main Movie
18    tell the stage to emh_continue(#mailbox)
19
20  end
21
22  ------------------------------------------------------------
23  -- StopMovie handler in a MIAW is called only when the movie
24  -- plays through to the end or jumps to another movie.
25  -- It isn't called when the window is closed or the window
26  -- is deleted by the forget window command.
27
28  on stopMovie
29
30    cleanUpMovie()
31
32  end
33
34  ------------------------------------------------------------
35  -- called to close a MIAW or automatically whenever
36  -- forgetWindow is called
37
38  on closeWindow
39
40    cleanUpMovie()
41
42  end
43
44  ------------------------------------------------------------
45  -- cleanUpMovie can be called by both stopMovie and
46  -- closeWindow.
47  clickCount is a global for the doubleclicking function..
48
49  on cleanUpMovie
50    global mbxG_whichLine, mbxG_subtractLine
51    global mbxG_nMsgs, mbxG_username, mbxG_clickCount
52
53    -- CLEAR FIELDS AND GLOBAL VARIABLES
```

Appendix B: KidCode® Lingo Client/Server Sample Mailbox Component Scripts

Page 2

```
54
55      put "" into field "MailboxTitle"
56      put "" into field "prepositionTitle"
57      put "" into field "MailboxTo"
58      put "" into field "MailboxSubject"
59      put "" into field "MailboxDate"
60
61      set mbxG_whichLine = 0
62      set mbxG_subtractLine = 0
63      set mbxG_nMsgs = 0
64      set mbxG_clickCount = 0
65
66      if findEmpty(member 50) > 50 then
67         set the scriptText of member 50 = ""
68      end if
69
70      -- SET HIGHLIGHT OFF STAGE
71
72      set the loc of sprite 11 to point (11, -17)
73
74   end cleanUpMovie
75
76
77   -- API Public Handlers
78   ------------------------------------------------------
79
80   --- Ugly hack to work around problem with Director startup
81   --- of MIAWs.  The problem is that, after calling a handler in the
82   --- MIAW, the StartMovie handler for the MIAW does not run until
83   --- the calling movie advances to its next frame.
84   --- Therefore, the calling sequence in the calling movie
85   --- has to be engineered so that the real handlers in the MIAW do not
86   --- run until after control has been transfered back to the calling
87   --- movie. However, at least one handler in the MIAW must be called
88   --- by the calling movie before the StartMovie handler will run.
89
90   --- startMeUp is the fake handler that, when called by the
91   --- main movie, will upon return to the main movie,
92   --- cause this movie's startMovie handler to run.
93
94   --- The second part of this wormy hack is contained in the MIAW's
95   --- startMovie handler... It is a call to a workAround handler in
96   --- the calling movie called continueComponent
97   --- The calling movie's continueRebus handler calls the real handlers
98   --- in the MIAW.
99
100  on emc_startMeUp
101     -- put "Macromedia sucks!"
102     return(1)
103  end emc_startMeUp
104
105  ------------------------------------------------------
106  ------------------------------------------------------
```

Appendix B: KidCode® Lingo Client/Server Sample Mailbox Component Scripts

Page 3

```
107   -- initWindow is called by email main when a message handler
108   -- is opened
109
110   on emc_initWindow userName
111     global mbxG_whichLine, mbxG_subtractLine, mbxG_username
112     -- mbxG_whichLine:   track user line selected
113     -- mbxG_subtractLine:  allow highlight to follow user selection
114     -- mbxG_msgNum:   tracks user selected message number
115
116     set mbxG_username = userName
117     set mbxG_whichLine = 0
118     set mbxG_subtractLine = 0
119
120     -- PUPPET THE HIGHLIGHT
121
122     puppetSprite 11, TRUE
123
124     -- SET HIGHLIGHT OFF STAGE
125
126     set the loc of sprite 11 to point (11, -17)
127
128     return(1)
129   end emc_initWindow
130
131   ------------------------------------------------------------------
132
133   -- more API Public Handlers
134   ------------------------------------------
135
136   --- closeWindow is not called unless Rebus plays as a MIAW.
137
138   on emc_closeWindow
139     closeWindow()
140     return(1)
141   end emc_closeWindow
142
143
144   ------------------------------------------------------------------
145
146   on emc_getComponentInfo
147
148     -- eventually the MIMEtype field will be application/txt
149     return( list( "SimpleMail", 1, #mailbox, "" ) )
150
151   end emc_getComponentInfo
152
153
154   ------------------------------------------------------------------
155   -- the following was called "mbx_giveMessage" with return(0),
156   -- but was not called from anywhere and not on API sheet, thus
157   -- no longer a part of the API.
158
159   on mbx_getMessage
```

Appendix B: KidCode® Lingo Client/Server Sample Mailbox Component Scripts

Page 4

```
160
161     -- "open" button and doubleClick of highlighted message (not
162     -- yet implemented) calls to email main to hand the message
163     -- selected to a message handling movie
164     -- This script was previously the "open" cast memeber script:
165
166     global mbxG_whichLine, mbxG_messages
167
168     set mailData = getAt(mbxG_messages, mbxG_whichLine)
169
170     tell the stage
171       emh_passMessage(mailData, mbxG_whichLine)
172     end tell
173
174   end mbx_getMessage
175
176   ------------------------------------------------------------------
177
178   on mbx_getMessageNumbers
179
180     -- fill me in!
181     --   list of int mbx_getMessageNumbers
182
183   end mbx_getMessageNumbers
184
185   ------------------------------------------------------------------
186   -- Trash messages should return a list of message numbers that are to
187   -- be trashed in the mailfile. Email main will rewrite the mail file
188   -- When implemented correctly, it will determine which message numbers
189   -- are associated with the currently selected lines in the mailbox
190   -- display, update the display to remove these messages from the
191   -- list, and return the list of deleted message numbers.
192
193   on mbx_trashMessages
194
195     --- needs implementation that can handle multiple messages
196     --- also need to rewrite trashIt which does not conform to
197     --- API rule that only API handlers can be called in other movies
198
199     trashIt()
200     return([])
201
202   end mbx_trashMessages
203
204   ------------------------------------------------------------------
205   ------------------------------------------------------------------
206   -- accepts a mailbox datastructure that consists of a boxname and
207   -- a list of messages
208
209   on mbx_openMailbox  mailbox
210     global mbxG_username, mbxG_messages, mbxG_boxName, mbxG_nMsgs
211
212     set mbxG_boxName = getAt(mailbox, 1)
```

Appendix B: KidCode® Lingo Client/Server Sample Mailbox Component Scripts

Page 5

```
213    put mbxG_userName & "'s " & mbxG_boxName into field "mailboxTitle"
214
215    set mbxG_messages = getAt(mailbox, 2)
216    set mbxG_nMsgs = count(mbxG_messages)
217
218    displayMailbox(mbxG_messages)
219    return(1)
220
221  end mbx_openMailbox
222
223  -------------------------------------------------------------------
224
225  --- score script ss_goTheFrame
226
227  on exitFrame
228
229    go the frame
230
231  end
232
233  _____
234  on formatFields
235
236    -- FORMAT THE TEXT FIELDS
237
238    setTextInfo "MailboxTo", " ", "left", "arial", 14, "bold"
239    setTextInfo "MailboxSubject", " ", "left", "arial", 14, "bold"
240    setTextInfo "MailboxDate", " ", "left", "arial", 14, "bold"
241
242  end formatFields
243
244  _____
245  -- places the appropriate components from each message
246  -- into field members with lines aligned for display
247
248  on displayMailBox msgList
249
250    repeat with msg in msgList
251      put getProp(msg, #from) & RETURN after field "MailboxTo"
252      put getProp(msg, #re) & RETURN after field "mailboxSubject"
253      put getProp(msg, #date) & RETURN after field "mailboxDate"
254    end repeat
255
256  end displayMailbox
257
258  on hiliteMessage
259    global mbxG_nMsgs, mbxG_whichLine, mbxG_subtractLine
260
261    --  KEEP TRACK OF SELECTED LINE
262
263    set mbxG_whichLine = the mouseLine
264
265    -- MAKE SURE LINE IS VALID
```

Appendix B: KidCode® Lingo Client/Server Sample Mailbox Component Scripts

Page 6

```
        if mbxG_whichLine <= 0   then
          return(0)   -- do nothing, errors are caught elsewhere
             else if mbxG_whichLine > mbxG_nMsgs then
             -- user clicked somewhere else in field
             set mbxG_whichLine = 0   -- reset to 0
             return(0)
        end if

--   HIGHLIGHT SELECTED LINE set whichHighlight = mbxG_whichLine +  mbxG_subtractLine -- since all field members in display are kept synchronized
  -- any one will do for linePosToLocV
  -- use "MailboxTo", it's small set the locV of Sprite 11 to ¬
       (99 + linePosToLocV(member "MailboxTo", whichHighlight))

end hiliteMessage

---  script  of  cast  member  mailboxTo on mouseUp hiliteMessage()

end

---  script  of  cast  member  mailboxSubject on mouseUp hiliteMessage()

end

---  script  of  cast  member  mailboxDate on mouseUp hiliteMessage()

end
```

Appendix B: KidCode® Lingo Client/Server Sample Mailbox Component Scripts

Page 7

```
319   --- script of cast member Up
320
321   on mouseDown
322
323      global mbxG_whichLine, mbxG_subtractLine
324
325      -- SCROLL UP WITH HIGHLIGHT
326
327      repeat while the mouseDown = TRUE
328
329         -- GET NUMBER.USED TO CORRECT FOR DISCREPANCY BETWEEN
330         -- THE MOUSELINE AND THE LINEPOSTOLOCV
331         -- THE MOUSELINE GIVES LINE WITHIN FIELD TOTAL
332         -- THE LINEPOSTOLOCV USES LINE OF FIELD ON SCREEN
333
334         set mbxG_subtractLine = mbxG_subtractLine + 1
335
336         if mbxG_subtractLine > 0 then
337            set mbxG_subtractLine = 0
338         end if
339
340
341         -- SCROLL ALL FIELDS TOGETHER
342
343         scrollByLine member "MailboxTo", -1
344         scrollByLine member "MailboxSubject", -1
345         scrollByLine member "MailboxDate", -1
346
347
348         -- MOVE HIGHLIGHT WITH LINE, MOVING HIGHLIGHT
349         -- OFF SCREEN WHEN LINE MOVES OFF SCREEN
350
351         set whichHighlight = mbxG_whichLine + mbxG_subtractLine
352
353         if whichHighlight <= 0 or whichHighlight >= 22 then
354            set the loc of sprite 11 to point (11, -17)
355         else
356            set the locV of Sprite 11 to (99 + linePosToLocV(member
357   "MailboxTo", whichHighlight))
358         end if
359
360         updateStage
361
362      end repeat
363
364   end
365
366   -- script of cast member Down
367
368   on mouseDown
369
370      global mbxG_whichLine, mbxG_subtractLine
371
```

Appendix B: KidCode® Lingo Client/Server Sample Mailbox Component Scripts

Page 8

```
372      --  SCROLL DOWN WITH HIGHLIGHT
373
374
375      --  SCROLL ALL FIELDS TOGETHER
376
377      repeat while the mouseDown = TRUE
378
379         scrollByLine member "MailboxTo", 1
380         scrollByLine member "MailboxSubject", 1
381         scrollByLine member "MailboxDate", 1
382
383
384         --  GET NUMBER USED TO CORRECT FOR DISCREPANCY BETWEEN
385         --  THE MOUSELINE AND THE LINEPOSTOLOCV
386         --  THE MOUSELINE GIVES LINE WITHIN FIELD TOTAL
387         --  THE LINEPOSTOLOCV USES LINE OF FIELD ON SCREEN
388
389         set  mbxG_subtractLine =  mbxG_subtractLine - 1
390
391         set amountOfMail = the lineCount of member "MailboxTo"
392
393         if  mbxG_subtractLine < - amountOfMail + 1 then
394            set  mbxG_subtractLine = - amountOfMail + 1
395         end if
396
397
398         --  MOVE HIGHLIGHT WITH LINE, MOVING HIGHLIGHT
399         --  OFF SCREEN WHEN LINE MOVES OFF SCREEN
400
401         set whichHighlight = mbxG_whichLine +  mbxG_subtractLine
402
403         if whichHighlight <= 0 or whichHighlight >= 22 then
404            set the loc of sprite 11 to point (11, -17)
405         else
406            set the locV of Sprite 11 to (99 + linePosToLocV(member
407   "MailboxTo", whichHighlight))
408         end if
409
410         updateStage
411
412      end repeat
413
414   end
415
416   --  script of cast member Open
417
418   on mouseUp
419
420      global mbxG_whichLine, mbxG_messages
421
422      if mbxG_whichLine = 0 then
423         alert "Select a message by clicking with your mouse."
424         return(0)
```

Appendix B: KidCode® Lingo Client/Server Sample Mailbox Component Scripts

Page 9

```
425     end if
426
427     set mailData = getAt(mbxG_messages, mbxG_whichLine)
428
429
430     tell the stage
431
432        emh_passMessage(mailData, mbxG_whichLine)
433
434     end tell
435
436  end
437
438
439
440  -- script of cast member closeWindow
441
442  on mouseUp
443
444     -- Close the mailbox window
445
446     tell the stage to emh_killComponent()
447
448  end
449
450
451
452  _____
453  -- script of cast member mailBoxHilight
454
455  on mouseUp
456
457     if the doubleClick then mbx_getMessage()
458
459     -- Jeff is working on this:
460
461     -- global mbxG_whichLine, mbxG_subtractLine, mbxG_messages,
462  mbxG_clickCount
463     --
464     -- set whichHighlight = mbxG_whichLine + mbxG_subtractLine
465     -- set mailData = getAt(mbxG_messages, mbxG_whichLine)
466     --
467     -- repeat while whichHighlight <> 0
468     --
469     --       put "true"
470     --       tell the stage
471     --          emh_passMessage(mailData, mbxG_whichLine)
472     --       end tell
473     --    end if
474     -- end repeat
475  end
```

Appendix C:  KidCode® Lingo Client/Server Text Message Handling Component Scripts

Page 1

```
1   on startMovie
2     global gLipsCursor
3
4     set gLipsCursor = 0
5     put " " into field "Message"
6     set the fontsize of member "Message" = 24
7
8     -- work around Director MIAW bug
9     tell the stage to emh_continue(#msgHandler)
10
11  end startMovie
12
13
14
15  on stopMovie
16    clearMessage()
17    set the member of sprite 2 = "lipsUp"
18    cursor 0
19  end
20
21  _____
22  -- API Public Handlers ---------------------------------
23  --- Ugly hack to work around problem with Director startup
24  --- of MIAWs.  The problem is that, after calling a handler in the
25  --- MIAW, the StartMovie handler for the MIAW does not run until
26  --- the calling movie advances to its next frame.
27  --- Therefore, the calling sequence in the calling movie
28  --- has to be engineered so that the real handlers in the MIAW do not
29  --- run until after control has been transfered back to the calling
30  --- movie. However, at least one handler in the MIAW must be called
31  --- by the calling movie before the StartMovie handler will run.
32
33  --- startMeUp is the fake handler that, when called by the
34  --- main movie, will upon return to the main movie,
35  --- cause this movie's startMovie handler to run.
36
37  --- The second part of this wormy hack is contained in the MIAW's
38  --- startMovie handler... It is a call to a workAround handler in
39  --- the calling movie called continueComponent
40  --- The calling movie's continueRebus handler calls the real handlers
41  --- in the MIAW.
42
43  on emc_startMeUp
44    -- put "Macromedia sucks!"
45    return(1)
46  end startUp
47
48  -------------------------------------------------------------------
49
50  -------------------------------------------------------------------
51  -- initWindow is called by email main when a message handler
52  -- is opened
53  --
```

Appendix C:    KidCode® Lingo Client/Server Text Message
Handling Component Scripts Page 2

```
54
55    on emc_initWindow  userName
56       global tm_RegisteredUsers, tm_UserName, tm_MailData
57
58       set tm_MailData = [:]
59       set tm_UserName = userName
60
61       tell the stage to emh_getRegisteredUsers()
62       set tm_RegisteredUsers = the result
63       fillToList(tm_RegisteredUsers)
64
65       -- put "EXIT initWindow" && "in frame" && the frame
66
67       return(1)
68    end initWindow
69
70    ------------------------------------------------------------------------
71
72    --- closeWindow is not called unless Rebus plays as
73    --- a MIAW.
74
75    on emc_closeWindow
76       stopMovie
77       return(1)
78    end closeWindow
79
80    ------------------------------------------------------------------------
81
82    on emc_getComponentInfo
83
84       -- the MIMEtype field will be application/txt
85
86       return( list( "Text", 2, #msgHandler, "text" ) )
87
88    end msh_getComponentInfo
89
90    ------------------------------------------------------------------------
91
92
93    on msh_OpenMessage  mailData, mode
94
95       return(openMessage(maildata, mode))
96
97    end msh_openMessage
98
99    ------------------------------------------------------------------------
100
101
102
103   on msh_clearMessage
104
105      clearMessage()
106      return(1)
```

Appendix C: KidCode® Lingo Client/Server Text Message Handling Component Scripts

Page 3

```
107   end msh_clearMessage
108
109   ------------------------------------------------------------------------
110
111   on msh_sendMessage
112      global gMsgBody, tmG_mailData, gState, gMode
113
114      -- CLEAN RETURNS and QUOTES FROM TEXT MESSAGES (not needed in other
115   MIME types)
116
117      put "" into messageFinal
118      set messageVar = the text of field "Message"
119
120      repeat with i = 1 to the number of chars in messageVar
121
122         if char(i) of messageVar = RETURN then
123            put " $0D$ " after messageFinal
124         else if char(i) of messageVar = QUOTE then
125            put " $2C$ " after messageFinal
126         else
127            put char(i) of messageVar after messageFinal
128         end if
129
130      end repeat
131
132      --   PREPARE DATA STRUCTURES FOR EMAIL MAIN
133
134      setaProp tmG_mailData, #to, the text of field "To"
135      setaProp tmG_mailData, #from, the text of field "From"
136      setaProp tmG_mailData, #re, the text of field "Subject"
137      setaProp tmG_mailData, #status, #sent
138      setaProp tmG_mailData #date, the text of field "Date"
139      setaProp tmG_mailData, #msgbody, list(messageFinal)
140
141
142      --   SEND MESSAGE TO EMAIL MAIN
143      ---   NOTE: sendToggle lets messageHandler know to send the message
144      ---   rather than simply save a previously sent message
145
146      clearMessage()
147      -- alertSent()
148      return(tmG_mailData)
149
150   end msh_sendMessage
151
152   ------------------------------------------------------------------------
153   --- This function called only when a message is already displayed
154   --- Therefore data structures should be already setup.  We just
155   --- need to toggle the "to" and "from" fields.
156
157   on msh_replyMessage
158
159      global gMode, tmG_mailData
```

Appendix C:  KidCode® Lingo Client/Server Text Message Handling Component Scripts Page 4

```
  set gMode = #author
  put getProp(tmG_mailData, #to) into field "From"
  put getProp(tmG_mailData, #from) into field "To"

replyIt()

return(tmG_mailData)
end msh_replyMessage on msh_PrintMessage

-- minimal implementation printFrom the frame, the frame, 100 return(1)

end msh_PrintMessage
```

---

```
--- score script ss_goTheFrame on exitFrame go the frame end
```

---

```
on flashSprite spriteNum
  set the visible of sprite spriteNum = ¬
            not (the visible of sprite spritenum)

starttimer
  repeat while the timer < 30
    nothing
  end repeat end flashSprite
```

---

```
-- score scripts fr_sentmsg on exitFrame
  flashSprite(17)   --edit the "49" to be the sprite number
                    --for the sprite that has the upper left hand corner
  "x"
                    --that is used to close the movie.
```

Appendix C: KidCode® Lingo Client/Server Text Message Handling Component Scripts

Page 5

```
213     go to the frame
214   end
215
216
217   on mouseDown
218
219     -- make sure the flashing sprite is visible
220     set the visible of sprite 17 = TRUE
221     go to frame 2
222
223   end
224
225
226
227   --Utilities
228
229   ----------------------------------------------------------------
230   --- LocToWordPos returns the index of the word under loc in
231   --- the field. Vertical space in the field is assigned to the
232   --- closest char in the field. If loc is on a space between
233   --- words (horizontal only, see below), the function returns 0.
234   --- If the loc is not in the field, results are unpredictable.
235   --- The Lingo loctoCharPos function will return either the first
236   --- or the last character in the field, depending upon the loc.
237   --- Comparable to the built-in Lingo locToCharPos function,
238   --- the location argument is assumed to be relative to the origin
239   --- of the text field.
240
241   --- Uses the Lingo function locToCharPos. locToCharPos is not
242   --- subject to the Lingo lineHeight bug. All locations with
243   --- vertical coordinates within a lineheight return a character
244   --- on that line. For example, if lineheight is 36 then any location
245   --- in the interval, [point(x,0) point(x, 36)] with return a character
246   --- on the first line, any location in the interval,
247   --- [point(x, 37) point(x, 72)] will return a character in the second
248   --- line, etc. Note: a character is returned even if the location
249   --- is on the white space between lines.
250
251   on locToWordPos fieldMember, locInField
252
253     set charPos = locToCharPos(fieldMember, locInField)
254
255     -- FIX THIS TO CHECK THAT LOC IS IN FIELD ELSE RETURN 0.
256     -- locTocharPos will return 1 if the loc is above or left of the field
257     -- It will return lenght(text) + 1 if the loc is below or right of
258   field
259
260     if char charPos of field fieldMember = " " then -- on a space
261       return(0)
262     else
263       return(the number of words in char 1 to charPos of field
264   fieldMember)
265     end if
```

Appendix C:  KidCode® Lingo Client/Server Text Message Handling Component Scripts Page 6

```
266
267    end locToWordPos
268
269    ------------------------------------------------------------
270
271    on fillToList  userNames
272
273      put "" into field "ToDown"
274      repeat with uname in userNames
275        put uname & RETURN after field "ToDown"
276      end repeat
277
278    end fillToList
279
280
281    ------------------------------------------------------------
282
283    on alertSent
284      go to frame "fr_sentMsg"
285    end alertsent
286
287
288    on saveIt
289
290      global tmG_messageNumber, tmG_mailData, gMode
291
292
293      --  Put fields into variables
294
295      put field "To" into toVar
296      put field "Subject" into subjectVar
297      put field "Message" into messageVar
298
299
300      -- CLEAN RETURNS FROM TEXT MESSAGES (not needed in other MIME types)
301
302      put "" into messageFinal
303
304      repeat with i = 1 to the number of chars in messageVar
305
306        if char(i) of messageVar = RETURN then
307          put " $0D$ " after messageFinal
308        else if char(i) of messageVar = QUOTE then
309          put " $2C$ " after messageFinal
310        else
311          put char(i) of messageVar after messageFinal
312        end if
313
314      end repeat
315
316
317      --  PREPARE DATA STRUCTURES FOR EMAIL MAIN
318
```

Appendix C: KidCode® Lingo Client/Server Text Message Handling Component Scripts

Page 7

```
319       setaProp tmG_mailData, #to, toVar
320       setaProp tmG_mailData, #re, subjectVar
321       setaProp tmG_mailData, #msgbody, messageFinal
322
323
324       -- SEND MESSAGE TO EMAIL MAIN
325
326       set sendToggle = 0
327
328       tell the stage
329
330          global tmG_messageNumber, tmG_mailData
331
332          messageHandler sendToggle
333
334       end tell
335
336
337    end
338
339    on replyIt
340
341       global tmG_messageNumber, tmG_mailData, gMode
342
343       -- Swap the "to" and "from" fields
344       -- Put header information into variables and clear message number
345
346       put the abbreviated date into field "Date"
347       put "Re: " & getaProp(tmG_mailData,#re) into field "Subject"
348       set the editable of member "Message" to TRUE
349       put"---- " & getProp(tmG_mailData, #to) & "'s Note ----" & RETURN ¬
350         before field "Message"
351       put  RETURN  before field "Message"
352
353    end
354
355
356
357    -- script of cast member closeWindow
358
359    on mouseUp
360
361       -- Should check whether user wants to Save the message
362       ---  saveIt
363
364       tell the stage to emh_killComponent()
365
366    end
367
368
369
370
371
```

Appendix C: KidCode® Lingo Client/Server Text Message Handling Component Scripts Page 8

```
372    --- script of cast member read Message Button
373
374    on mouseUp
375      speak(the text of member "Message")
376    end
377
378  _____
379
380    on openMessage mailData, mode
381
382      global gToBoxDown, tm_RegisteredUsers
383      global tmG_mailData, gMode
384
385      set tmG_mailData = maildata
386      set gMode = mode
387
388      -- Pull out the info from tmG_mailData and place where needed
389
390      put getaProp(tmG_mailData,#to) into field "To"
391      put getaProp(tmG_mailData,#from) into field "From"
392      put getaProp(tmG_mailData,#re) into field "Subject"
393      put getaProp(tmG_mailData,#date) into field "Date"
394
395      put getaProp(tmG_mailData,#status) into statusVar
396
397      set msgBody = getaProp(tmG_mailData,#msgbody)
398      if count(msgBody) = 0 then
399        put "" into messageVar
400      else
401        put getAt(msgbody, 1) into messageVar
402      end if
403
404      -- Reinstate returns and quotes into the message
405
406      put "" into messageFinal
407
408      repeat with i = 1 to the number of words in messageVar
409
410        if word(i) of messageVar = "$0D$" then
411          put RETURN after messageFinal
412        else if word(i) of messageVar = "$2C$" then
413          put QUOTE after messageFinal
414        else
415          put " " & word(i) of messageVar & " " after messageFinal
416        end if
417
418      end repeat
419
420      put messageFinal into field "Message"
421
422
423      -- allow or disallow user changes (gToBoxDown is for the "To" field)
424
```

Appendix C: KidCode® Lingo Client/Server Text Message Handling Component Scripts

Page 9

```
425    if gMode = #display OR statusVar = #sent then
426       set the editable of member "Message" to FALSE
427       set the editable of member "Subject" = FALSE
428       set gToBoxDown = 0
429    else if gMode = #author then
430       -- else if statusVar = #saved then
431       fillToList(tm_RegisteredUsers)
432       set the editable of member "Message" to TRUE
433       set the editable of member "Subject" = TRUE
434       set gToBoxDown = 1
435    end if
436
437    return(1)   -- need error checking and return meaningful val
438  end
439
440  ─────────────────────────────────────────────────
441  on clearMessage
442
443    global tmG_mailData, gToBoxDown
444    --  CLEAR FIELDS
445
446    put "" into field "To"
447    put "" into field "Date"
448    put "" into field "Subject"
449    put "" into field "Message"
450
451    -- NEXT TWO FIELDS NOT CLEARED SO THAT USER CAN SEND
452    -- MULTIPLE MESSAGES WITHOUT CLOSING THE MOVIE
453    -- put "" into field "ToDown"
454    -- put "" into field "From"
455
456    -- NOT SURE ABOUT WHAT TO DO ABOUT MAILDATa????
457
458    -- SET UP TO BEGIN A NEW MESSAGE
459
460    set the editable of member "Message" = TRUE
461    set the editable of member "Subject" = TRUE
462    set gToBoxDown = 1
463    cursor 0
464
465  end clearMessage
466
467
468
469  -- script of cast member To
470
471  on mouseUp
472
473    global gToBoxDown, gLipsCursor
474
475    --  Pull down student field: change field from
476    --  up (member 11) to down (member 12)
477
```

Appendix C: KidCode® Lingo Client/Server Text Message Handling Component Scripts Page 10

```
478
479      if gLipsCursor then
480         speak(the text of field "To")
481
482      else if gToBoxDown = 1 then
483         set the member of sprite 11 to member "ToDown"
484      end if
485
486   end
487
488  _____
489  -- script of cast member toDown
490
491  on mouseUp
492
493      --  KEEP TRACK OF SELECTED NAME
494
495      set whoTo = word 1 of line(the mouseLine) of field "ToDown"
496
497      --  Put selected user name into up version of student field and
498   switch the
499      --  field from down (member 12) to up (member 11)
500
501      put whoTo into field "To"
502
503      set the member of sprite 11 to member "To"
504
505   end
506
507  _____
508  -- script of cast member From
509
510  on mouseUp
511      global gLipsCursor
512
513      if gLipsCursor then
514         speak(the text of field "From")
515      end if
516  end
517
518
519
520  -- script of cast member Date
521
522  on mouseDown
523      global gMode, gLipsCursor
524
525      if field "Date" = EMPTY and gMode = #author then
526         put the abbreviated date into field "Date"
527      end if
528
529      if gLipsCursor then
530         speak(the text of field "Date")
```

Appendix C:   KidCode® Lingo Client/Server Text Message Handling Component Scripts Page 11

```
531     end if
532   end
533
534
535
536   -- script of cast member Subject
537
538   on mouseUp
539     global gLipsCursor
540
541     if gLipsCursor then
542       speak(the text of field "Subject")
543     end if
544
545   end
546
547
548   -- script of cast member Message
549
550   on mouseDown
551     global gLipsCursor
552
553     if gLipsCursor then
554       set textOrigin = the loc of sprite 15
555       set upLoc = point(the mouseH, the mouseV) - textOrigin
556       set myword = loctowordpos(member "Message", upLoc)
557
558       if myword > 0 then
559         set astr = word myword of field "Message"
560         speak( astr)
561       else alert "Click on a word." & RETURN & "I will read it."
562     end if
563
564   end
565
566
567
568   --- script of cast member lipsDown
569
570   on mouseUp
571     global glipsCursor, gmode
572
573     -- reset the lipsCursor
574     cursor 0
575     if gmode = #author then
576       -- set the editable of member "To" = TRUE
577       set the editable of member "Subject" = TRUE
578       set the editable of member "Message" = TRUE
579     end if
580     set gLipsCursor = 0
581     set the member of sprite 2 = "lipsUp"
582
583   end
```

Appendix C: KidCode® Lingo Client/Server Text Message Handling Component Scripts Page 12

```
--- script of cast member lipsUp on mouseUp
   global glipsCursor

-- reset the lipsCursor
   cursor [27]

set the editable of member "To" = FALSE
   set the editable of member "Subject" = FALSE
   set the editable of member "Message" = FALSE set gLipsCursor = 1
   set the member of sprite 2 = "lipsDown"

end
```

Appendix D:  KidCode® Lingo Client/Server Rebus Message Handling Component Scripts Page 1

```
 1  ---  Main Movie Scripts
 2  -----  Sprite Assignments
 3  --
 4  -- sprite 3          reserved for the ViewSymbols buttons
 5  -- sprite 4          reserved for the ViewGuesses buttons
 6  -- sprite 5          reserved for the NewTemplate buttons
 7  -- sprites 45 thru 48  buttons for scrolling symbol palette
 8
 9  ---- Sprites below are assigned to cast members dynamically
10  --
11  -- sprites 15 thru 20  reserved for symbols in symbol palette
12  -- sprites 21 thru 35  reserved for symbols in Rebus message
13  -- sprites 39 thru 44  reserved for typein text guesses
14
15
16  on startMovie
17     -- Public Globals
18     global rmG_registeredUsers   -- list of KidCode system usernames
19     global rmG_userName          -- records username
20     global rmG_mode              -- #display, #display_noReply, or
21  #author
22     global rmG_mailData          -- the active message including
23  header
24     global rmG_messageNumber
25     global rmG_testState         -- 0,1,2,3  template set for user
26  tests
27     global rmG_userGroup
28
29     -- private internal globals
30     global rmG_traceFlag         -- for debugging
31
32     global rmG_symbolcastName -- name of cast library of symbols to use
33     global rmG_templates      --- list of template names for this user
34  group
35     global rmG_theTemplateIndex  --- index of the current template
36     global rmG_symbolGroup    --- lists symbol cast members for current
37  template
38
39     global rmG_msgBody           -- the active messageBody
40     global rmG_state             -- #decIn, #codIn, #new, or #gotIt
41     global rmG_guesses           -- list of property lists with info on
42  guesses
43
44     set rmG_traceFlag = 0    -- set to 1 to turn on tracing, else 0
45
46     set the fileName of castLib "Templates" to the pathName &
47  "Templates.cst"
48     set the fileName of castLib "Symbols" to the pathName & "Symbols.cst"
49
50     -- NEXT EXISTS SO THAT REBUS MOVIE CAN BE RUN IN SIMULATION MODE
51     -- IT IS SET TO TRUE BY THE INITWINDOW FUNCTION WHEN RUN AS
52     -- EMAIL COMPONENT!!!!
53
```

Appendix D:  KidCode® Lingo Client/Server Rebus Message Handling Component Scripts Page 2

```
54      global rmG_noSimulate
55      --  set rmG_noSimulate = TRUE
56
57      if rmG_noSimulate then  -- all globals initialized in initWindow
58         tell the stage to emh_continue(#msgHandler)
59
60      else   -- SIMULATE MODE
61         initSimulation
62
63      end if -- SIMULATE MODE
64
65   end
66
67   -- When email main opens the Rebus movie this function is called.
68   -- The openwindow function cannot accept an argument.
69   -- Therefore initwindow below is necessary to pass the initial
70   -- arguments to Rebus.
71
72   on openWindow
73      -- put "EXIT OpenWindow" & " in frame" & the frame
74   end openWindow
75
76
77   on initSimulation
78      -- Public Globals
79      global rmG_registeredUsers    -- list of KidCode system usernames
80      global rmG_userName           -- records username
81      global rmG_mode               -- #display, #display_noReply, or
82   #author
83      global rmG_mailData           -- the active message including
84   header
85      global rmG_messageNumber
86      global rmG_testState          -- 0,1,2,3  template set for user
87   tests
88
89      --- internal globals
90      global rmG_symbolcastName     -- which castlib to use
91      global rmG_symbolGroup    --- lists cast members in currently selected
92   group
93      global rmG_templates      --- property list with entry for each
94   template
95      global rmG_theTemplateIndex   --- index of the current template
96      global rmG_msgBody
97      global rmG_state
98      global rmG_guesses
99
100     -- Initialize variables that would have been passed by email main
101     set rmG_userName = "user1"
102     set rmG_registeredUsers = ["user2", "user1"]
103     set rmG_mode = #author
104     set rmG_mailData = [#to:"User1", #from:" ", #re:"Rebus Challenge",¬
105                         #mimeType:"Rebus", #status:"new"]
106     addProp(rmG_mailData, #date, the abbreviated date)
```

Appendix D: KidCode® Lingo Client/Server Rebus Message Handling Component Scripts

Page 3

```
107      addProp(rmG_mailData, #msgBody, [#new, [], "default"])
108      set rmG_messageNumber= 1
109      set rmG_testState = 2    -- user group; determines castLib and
110    templates
111
112      -- Initialize private globals
113      set rmG_msgBody = getProp(rmG_mailData, #msgBody)  -- set up pointer
114      set rmG_state = getAt(rmG_msgBody, 1)
115
116      initializeTemplates       -- initializes rmG_templates
117
118      set rmG_theTemplateIndex = getPos(rmG_templates, "default")
119      set theTemplate = "default"
120      set rmG_symbolcastName = getTemplateProp(theTemplate, #library)
121      set rmG_symbolGroup = getTemplateProp(theTemplate, #symbols)
122
123      set rmG_guesses = []  -- guesses initialized after template is
124    selected
125
126      --- Format the font properties of text fields and the MessageSpace
127      setUpMessageSpace()
128      formatFields()
129
130      --- allow To field to be a listbox
131      puppetSprite 50, TRUE
132
133
134      fillToList()
135
136      -- data structures to improve efficiency in text and graphics layout
137      global rmG_layoutIndex
138      set rmG_layoutIndex = [:]   -- records word position and loc info by
139    index
140
141    end initSimulation
142
143    ────────────────────────────────────────────────────────────
144    --- closeWindow is not called unless Rebus plays as a MIAW.
145
146    on closeWindow
147      finishMovie
148    end closeWindow
149
150    ────────────────────────────────────────────────────────────
151    -- stopMovie is not called if Rebus plays as a MIAW
152
153    on stopMovie
154      finishMovie
155    end
156
157    ────────────────────────────────────────────────────────────
158    -- This needs to play whenever the movie closes,
159    -- whether as MIAW or standalone.
```

Appendix D: KidCode® Lingo Client/Server Rebus Message Handling Component Scripts

Page 4

```
on finishMovie
  global rmG_noSimulate clearHdrFields
  clearMessageSpace
  set the member of sprite 3 = member "SymbolButtonUp"
  set the member of sprite 4 = member "GuessesButtonUp"
  if soundBusy(1) then sound stop 1

-- next line will cause problems for the main movie
  -- for now just reset this by hand if you have been running in
  -- email mode and want to switch to simulate mode.
  -- Note, unless Director is restarted, the rmG_noSimulate global
  -- stays set even when a new Rebus movie is loaded.
  -- set rmG_noSimulate = FALSE end --- Template handlers
--- All information needed for each Template is stored
--- in the "Templates" castLib.
--- Each template is stored as a list with the following
--- elements:
---    template text string
---    list of indices of coded words
---    text string name of castlib for template's symbols
---    list of member numbers in castlib for template's symbols
---
--- e.g. [ "Can a truck fly?", [3,4], "UTsymbols",[4,23,24,25]]

-------------------------------------------------------------
--- initializeTemplates
--- set up the rmG_templates list of Rebus template names for the
--- user group determined by rmG_testState on initializeTemplates
  global rmG_testState      --- user testing group
  global rmG_templates      --- list of template names for this usergroup
  global rmG_userGroup set rmG_templates = ["default"]   -- reset for safety if rmG_testState = 0 then  -- administrator
    repeat with str in ["girlrain", "clownsaid", "withoutsun"]
      add(rmG_templates, str)
    end repeat else    --- user group -- Sentences common to all groups
```

Appendix D: KidCode® Lingo Client/Server Rebus Message Handling Component Scripts

Page 5

```
212      if 0 then --- sentences have been split up among pairs (1,2) and
213   (3,4)
214        repeat with str in ["attrib2", "attrib3", "attrib5", ¬
215                     "quant1", "quant5", "quant6", ¬
216                     "verb1", "verb3", "verb4"]
217          add(rmG_templates, str)
218        end repeat
219      end if
220
221      -- Add specialized sentences
222
223      case rmG_testState of
224        1: -- attrib: 2,3   quant: 3a,4a,6   verb: 1,3,5a
225          repeat with str in ["verb5a", "attrib2", "quant6", "attrib3",¬
226                     "verb1", "verb3", ¬
227                     "quant4a", ¬
228                     "quant3a"]
229            add(rmG_templates, str)
230          end repeat
231
232        2: --attrib: 4b,5   quant: 1,2,3b,5   verb: 2b,4,5b
233          repeat with str in ["attrib4b", "quant3b", "verb4", ¬
234                     "quant2", "verb2b", "attrib5",¬
235                     "quant1", "quant5", "verb5b"]
236            add(rmG_templates, str)
237          end repeat
238
239        3: --attrib: 2,3   quant: 3a,4b,6   verb: 1,3,5c
240          repeat with str in ["verb5c", "attrib2", "quant6", "attrib3",¬
241                     "verb1", "verb3", ¬
242                     "quant4b", ¬
243                     "quant3a"]
244            add(rmG_templates, str)
245          end repeat
246
247        4: --attrib: 4b,5   quant: 1,2,3c,5   verb: 2b,4,5b
248          repeat with str in ["attrib4b", "quant3c", "verb4", ¬
249                     "quant2", "verb2b", "attrib5",¬
250                     "quant1", "quant5", "verb5b"]
251            add(rmG_templates, str)
252          end repeat
253
254        otherwise:
255          alert "ERROR:initializeTemplates invalid user group."
256
257      end case
258
259    end if    -- administrator or usergroup
260
261  end initializeTemplates
262
263
264
```

Appendix D: KidCode® Lingo Client/Server Rebus Message Handling Component Scripts

Page 6

```
265   -- Accessor functions for template info:
266
267   on getTemplateProp memberName, prop
268
269     set cNum = the number of member memberName of castLib "Templates"
270
271     if cNum < 1 then
272       alert "ERROR:no member " & memberName & " in castlib Templates"
273       return(0)
274     end if
275
276     case prop of
277       #text: return(getAt(value(the text of field cNum), 1))
278       #coded: return(getAt(value(the text of field cNum), 2))
279       #library: return(getAt(value(the text of field cNum), 3))
280       #symbols:return(getAt(value(the text of field cNum), 4))
281       otherwise: return(0)
282     end case
283
284   end getTemplateProp
285
286   ----------------------------------------------------------------------
287   --------------------------------------------------
288   --- Returns a partial message body structure from a simple
289   --- list of the form [templateString, list_of_code_word_indices]
290   --- Used to read from templates cast members into message bodies
291
292   on readTemplate allwords, indices
293
294     set template = []
295     set val = [:]
296     set nwords = the number of words in allwords
297     set str = ""
298     set charPos = 1
299     set j = 1
300     set i = 1
301
302     repeat while j <= nwords
303       repeat while not getOne(indices, j) and j <= nwords
304         set str = str & word j of allwords & " "
305         set j = j+1
306       end repeat
307       if length(str) > 0 then   -- add uncoded words
308         addProp(val, #text, str)
309         addProp(val, #code, 0)
310         addProp(val, #charPos, charPos)
311         addProp(val, #wordIndex, i)   -- index of first word
312         add(template, duplicate(val))
313         set val = [:]
314         set charPos = charPos + length(str)
315         set str = ""
316       end if
317       if j <= nwords then   --- add the coded word
```

Appendix D: KidCode® Lingo Client/Server Rebus Message Handling Component Scripts

Page 7

```
318          addProp(val, #text, word j of allwords & " ")
319          addProp(val, #code, 1)
320          addProp(val, #charPos, charPos)
321          addProp(val, #wordIndex, j)
322          add(template, duplicate(val))
323          set val = [:]
324          set charPos = charPos + length(word j of allwords)+ 1
325          set j = j + 1
326        end if
327
328        set i = j
329
330      end repeat
331
332      return(template)
333    end readtemplate
334
335    --- Message handlers
336
337    ------------------------------------------------------------
338    -- openMessage function is only called by other Rebus functions
339    -- It does not handle laying out text properly for messages that
340    -- may have been in alternative mailboxes.  See msh_openMessage.
341
342    on openMessage
343      global rmG_msgBody, rmG_mailData, rmG_mode, rmG_state, rmG_symbolGroup
344      global rmG_lineHeightFix
345      global rmG_noSimulate     --- False to run simulation independent of
346    email
347      global rmG_testState
348      global rmG_symbolcastName
349      global rmG_userName
350
351      global rmG_traceFlag
352
353      put "In REBUS:openMessage"
354
355      if rmG_noSimulate then
356        set rmG_msgBody = getProp(rmG_mailData, #msgbody)
357
358        if count(rmG_msgBody) = 0 then   -- start a new message
359
360          startMessage("default")
361          --- Fill header fields
362          put getProp(rmG_mailData, #to) into field "To"
363          put getProp(rmG_mailData, #from) into field "From"
364          put the abbreviated date into field "Date"
365          put "Rebus Challenge" into field "Re"
366
367        else  --- Handle existing message
368          -- put "OPEN rmG_msgBody" & rmG_msgBody
369
370          set rmG_state = getAt(rmG_msgBody, 1)
```

Appendix D: KidCode® Lingo Client/Server Rebus Message Handling Component Scripts

Page 8

```
371        set whichTemplate = getAt(rmG_msgBody,3)
372
373        clearMessageSpace
374        putHdrFields()    -- read headers into field members
375
376        --- setup symbols in graphics palette to match template
377        set rmG_symbolGroup = getTemplateProp(whichTemplate, #symbols)
378        setupSymbolPalette rmG_symbolcastName
379        initializeGuesses      -- uses global var rmG_msgBody
380
381        case rmG_state of
382          #new:
383            layoutText(getat(rmG_msgBody,2), 6)   -- coded words red
384            makeLayoutIndex(getAt(rmG_msgBody, 2))
385            placeGraphics()
386
387          #decIn:
388
389            layoutText(getat(rmG_msgBody,2), 0) -- coded words white
390            makeLayoutIndex(getAt(rmG_msgBody, 2))
391            placeGraphics()
392
393          #codIn:
394
395            layoutText(getat(rmG_msgBody,2), 6) -- coded words red
396            makeLayoutIndex(getAt(rmG_msgBody, 2))
397            placeGraphics()
398
399          #gotIt:
400            -- hide scrolling symbol palette
401            repeat with i = 15 to 20
402              -- puppetsprite i, TRUE
403              set the visible of sprite i = FALSE
404            end repeat
405            layoutText(getat(rmG_msgBody,2), 6)  -- coded words white
406            makeLayoutIndex(getAt(rmG_msgBody, 2))
407            placeGraphics()
408            go to "gotIt"
409        end case
410
411.    end if
412
413
414    else    -- Simulate mode
415
416      setupSymbolPalette rmG_symbolcastName
417      set rmG_state = getAt(rmG_msgBody, 1)
418      if rmG_state = #new then       -- user picked a template
419        set rmG_msgBody = newMessageBody(whichTemplate)
420        layoutText(getAt(rmG_msgBody, 2), 6)   -- 6 is white
421        makeLayoutIndex(getAt(rmG_msgBody, 2))
422        initializeGuesses    -- uses global var rmG_msgBody
423      else   --- don't want to change message body or index
```

Appendix D: KidCode® Lingo Client/Server Rebus Message Handling Component Scripts Page 9

```
424         layoutText(getAt(rmG_msgBody, 2), 0)    -- 0 is white
425         makeLayoutIndex(getAt(rmG_msgBody, 2))
426         placeGraphics()
427         if rmG_state = #gotIt then
428            go to "gotIt"
429         end if
430       end if   -- Simulate
431
432     end if
433
434     if rmG_mode = #display then
435        set the editable of member "To" = FALSE
436     else if rmG_mode = #author then
437        fillToList()
438     end if
439
440
441   end openMessage
442
443
444
445   --- Start message gets called only when there is a new template
446   --- If a previous msg existed it is abandoned.
447
448   on startMessage whichTemplate
449      global rmG_msgBody, rmG_state, rmG_symbolGroup, rmG_symbolcastName
450
451      clearMessageSpace
452      set rmG_msgBody = newMessageBody(whichTemplate)
453      set rmG_state = getAt(rmG_msgBody, 1)
454      layoutText(getat(rmG_msgBody,2), 6)   -- coded words red
455      makeLayoutIndex(getAt(rmG_msgBody, 2))
456      set rmG_symbolGroup = getTemplateProp(whichTemplate, #symbols)
457      setupSymbolPalette rmG_symbolcastName
458
459      initializeGuesses      -- uses global var rmG_msgBody
460
461   end startMessage
462
463
464
465   --- function for coder to reply with a gotIt message
466
467   on handleGotIt
468      global rmG_state, rmG_msgBody, rmG_mailData, rmG_mode
469
470      if rmG_mode = #display then
471         alert "You must click on reply first!"
472         return(0)
473      end if
474
475      if rmG_state <> #decIn then
476         set rmG_state = #gotIt
```

Appendix D: KidCode® Lingo Client/Server Rebus Message Handling Component Scripts Page 10

```
477        deleteAt(rmG_msgBody,1)
478        AddAt(rmG_msgBody,1, #gotIt)
479        put "Rebus Success!" into field "Re".
480        setProp(rmG_mailData, #re, "Rebus Success!")
481        alert "click on send to send Success!"
482
483      else alert "Only the coder can tell you GOT IT!"
484
485    end handleGotIt
486
487
488
489
490    -- Make new messageBody data structure from a template by adding
491    -- the symbol and the guess to coded words.
492
493    on newMessageBody  whichTemplate
494
495      set mBody = readTemplate(getTemplateProp(whichTemplate, #text),¬
496                               getTemplateProp(whichTemplate, #coded))
497
498      repeat with i = 1 to count(mBody)
499        set nextItem = getAt(mBody,i)
500        set nextText = getProp(nextItem, #text)
501        if getProp(nextItem, #code) then
502          deleteAt mBody, i
503          AddProp nextItem, #symbol, 0
504          AddProp nextItem, #guess, " "
505          addAt mBody, i, nextItem
506        end if
507      end repeat
508
509      -- add the rebusState as first item of messageBody
510      -- and the template name as the last item of messageBody
511      return list(#new, mBody, whichTemplate)
512
513    end newMessageBody
514
515
516    --- update the character positions and
517    --- read text strings into the message body
518    --- for now assume guesses are updated elsewhere
519
520    on updateMsgBody
521      global rmG_msgBody
522
523      set msg = getAt(rmG_msgBody,2)
524      set nItems = count(msg)
525      set i = 1
526
527      if 0 then
528
529        repeat with x in msg
```

Appendix D: KidCode® Lingo Client/Server Rebus Message Handling Component Scripts

Page 11

```
530        set index = getProp(x, #wordIndex)
531        set charPos = getLayoutProp(index, #firstCharPos)
532        -- setProp(x, #charPos, charPos)
533        set symbol = getLayoutProp(index, #symbolSprite)
534        if symbol then
535           setProp(x, #symbol, the memberNum of sprite symbol)
536        end if
537        if i < nItems then
538           -- set nextIndex = getProp(getAt(msg, i+1), #wordIndex)
539           set lastChar = getLayoutProp(getProp(getAt(msg, i+1),
540   #wordIndex),¬
541                                     #firstCharPos) -1
542        else
543           set lastChar = the length of field "MessageSpace"
544        end if
545        set ts = char charPos to lastChar of field "MessageSpace"
546        setProp(x, #text, ts)
547        set i = i+1
548     end repeat
549   end if
550 end updateMsgBody
551 ------------------------------------------------------------
552 ---
553 -- CLEAR THE TO, FROM, RE, DATE, MIMETYPE FIELDS
554
555 on clearHdrFields
556    put " " into field "To"
557    put " " into field "ToDown"
558    put " " into field "From"
559    put " " into field "Re"
560    put " " into field "Date"
561 end
562
563
564 ------------------------------------------------------------
565 --
566 -- updateHeader reads info from the message header
567 -- fields back into the message
568
569 on updateHeader
570    global rmG_mailData
571
572    setProp rmG_mailData, #to, the text of member "To"
573    setProp rmG_mailData, #from, the text of member "From"
574    setProp rmG_mailData, #date, the text of member "Date"
575    setProp rmG_mailData, #re, the text of member "Re"
576    setProp rmG_mailData, #mimetype, "rebus"
577
578 end updateHeader
579
580 _____
581
582 on putHdrFields
```

Appendix D: KidCode® Lingo Client/Server Rebus Message Handling Component Scripts Page 12

```
583    global rmG_mailData
584
585    put getProp(rmG_mailData, #to) into field "To"
586    put getProp(rmG_mailData, #from) into field "From"
587    put getProp(rmG_mailData, #re) into field "Re"
588    put getProp(rmG_mailData, #date) into field "Date"
589
590  end putHdrFields
591
592  -- Symbol sprites
593  -- getFreeSymbolSprite returns the sprite number of a
594  -- free sprite if it exists.  Otherwise it returns 0.
595  -- If a sprite reserved for a symbol has an empty
596  -- castmember then it is available for use.
597  -- This way we avoid using a global list of free sprites.
598
599  on getFreeSymbolSprite
600
601    repeat with i = 21 to 35     -- sprites 21-35 reserved for symbols
602      if the memberNum of sprite i = 0 then return i
603    end repeat
604
605    return(0)   -- none found
606
607  end getFreeSymbolSprite
608
609
610
611  --- Initializes a new symbol and returns the sprite number.
612  --- If no symbol sprites are available it returns 0.
613  --- The argument graphicMember is the member, not the
614  --- memberNumber.
615
616  --- Maybe should make symbols uneditable when they are
617  --- created (if #decIn or #display) instead of in the
618  --- placeGraphics handler, as is currently the case.
619
620  on newMessageSymbol  graphicMember
621
622    set newSymbolNum = getFreeSymbolSprite()
623    if newSymbolNum = 0 then
624      beep
625      return(0)
626    else
627      puppetsprite newSymbolNum, TRUE
628      set baseloc = the loc of sprite newSymbolNum
629      set the member of sprite newSymbolNum = graphicMember
630      set the visible of sprite newSymbolNum = TRUE
631      set the moveablesprite of sprite newSymbolNum = TRUE
632      set wordIndex = 0
633      return(newSymbolNum)
634    end if
635
```

Appendix D: KidCode® Lingo Client/Server Rebus Message Handling Component Scripts

Page 13

```
636    end newMessageSymbol
637
638    -- Palette of graphic symbols
639    ----------------------------------------------------------------
640    -- Setup scrolling symbol palette
641    -- Sprites 15 thru 20 are reserved for symbols visible on the palette.
642    -- Symbol bitmaps are max of 100 pixels in either direction.
643    -- Set up one sprite directly above palette and one sprite
644    -- directly below the palette.
645
646    on setupSymbolPalette  whichCast
647      global rmG_symbolGroup  -- cast members of selected symbol group
648      global rmG_mode, rmG_state
649
650      set firstY = -55   -- sprite directly above palette
651
652      set nextMember = 1
653      repeat with i = 15 to 20
654        puppetsprite i, TRUE
655        set the visible of sprite i to TRUE
656        if rmG_state = #decIn OR rmG_mode = #display then
657          set the moveableSprite of sprite i = FALSE
658        else
659          set the moveableSprite of sprite i = TRUE
660        end if
661        -- set the ink of sprite i to 36  -- background transparent
662        set firstSymbolY = firstSymbolY + 120
663        set the member of sprite i = member getAt(rmG_symbolGroup,
664   nextMember) of castLib whichCast
665        set the memberIndex of sprite i = i-14   --- index in symbolgroup
666        set the locH of sprite i to 582
667        set the locV of sprite i to firstSymbolY
668        set firstY = firstY + 120
669
670        -- sprite should have palette behaviors
671        set the paletteLoc of sprite i = the loc of sprite i
672
673        set nextMember =  (nextMember mod 6) + 1
674      end repeat
675
676      updatestage
677    end setupSymbolPalette
678
679    _____
680
681    --- sprites 15 thru 20 are reserved for symbols
682    --- on scrolling palette
683    --- whichCast is a string that refers to the castName in the
684    --- templates castLib.
685
686    on chooseCast  whichCast
687      global rmG_symbolGroup
688      global rmG_symbolcastName
```

Appendix D: KidCode® Lingo Client/Server Rebus Message Handling Component Scripts Page 14

```
689
690       set rmG_symbolGroup = getTemplateProp(whichCast, #symbols)
691       set rmG_symbolcastName = getTemplateProp(whichCast, #library)
692       setupSymbolPalette rmG_symbolcastName
693
694
695    end chooseCast
696
697    -- Palette Symbol
698    -- Intellinet Inc. behavior
699    -- Implements behaviors for a palette sprite.
700    -- This includes the ability to create copies of itself
701    -- if placed in a message and the ability to scroll.
702
703
704    property paletteloc, memberIndex
705
706    -- paletteLoc is the location of the sprite in the palette.
707    -- memberIndex is the Index of the sprites castMember in the list
708    -- of castMembers in the symbol palette. (rmG_symbolGroup)
709
710    on mouseUp me
711       global rmG_symbolcastName, rmG_state, rmG_mode
712
713       set upLoc = point(the mouseH, the mouseV)   -- the clickloc???
714
715       if rmG_state <> #decIn and rmG_mode <> #display then -- message can be
716    edited
717          -- put "symbol " & the spriteNum of me & " uploc = " & uploc
718
719          set textCast = the number of member "MessageSpace"
720          set textSprite = 2    --reserved for the message space
721          set castNum = the memberNum of sprite the clickon
722
723          -- it's an original from the symbol palette put it back
724          set the loc of sprite the spriteNum of me to paletteLoc
725
726          if inside(upLoc, the rect of sprite textSprite) then
727
728             set wordI = locToWordPos(member textCast, ¬
729                                 upLoc - the loc of sprite textSprite)
730             if wordI > 0 then
731                if codewordP(wordI) then
732                   if getLayoutProp(wordI, #symbolSprite) then -- word already
733    has a symbol
734                      --- just swap its cast member with the new one
735                      set the memberNum of sprite getLayoutProp(wordI,
736    #symbolSprite) = ¬
737                              the memberNum of sprite the spriteNum of me
738                      updatestage
739                   else
740                      set newSpriteNum = newMessageSymbol(member castNum of
741    castLib¬
```

Appendix D: KidCode® Lingo Client/Server Rebus Message Handling Component Scripts Page 15

```
                                                       rmG_symbolcastName)
             if newSpriteNum <> 0 then
                placeSymbolInText(sprite newSpriteNum, wordI)
             else -- can't do anything, no more sprites.
             end if end if
         end if
       end if
     else nothing --- dragged somewhere outside of MessageSpace updatestage end if    --- symbols editable?
end mouseUp --- Palette Symbol continued --- to scrollUp
--- cycle in the next CastMember in the currentSymbolGroup on scrollUp me
  global rmG_symbolGroup, rmG_symbolcastName if memberIndex = count(rmG_symbolGroup) then
    set memberIndex = 1
  else set memberIndex = memberIndex + 1 set the member of sprite the spriteNum of me = member ¬
              getAt(rmG_symbolGroup, memberIndex) of castLib
rmG_symbolcastName end scrollUp --- to scrollDown
--- cycle in the previous CastMember in the currentSymbolGroup on scrollDown me
  global rmG_symbolGroup, rmG_symbolcastName if memberIndex = 1 then
    set memberIndex = count(rmG_symbolGroup)
  else set memberIndex = memberIndex - 1 set the member of sprite the spriteNum of me = member ¬
              getAt(rmG_symbolGroup, memberIndex) of castLib
rmG_symbolcastName end scrollDown
```

Appendix D: KidCode® Lingo Client/Server Rebus Message
Handling Component Scripts Page 16

```
795    -- Message Symbol
796    -- Intellinet Inc. behavior
797    -- Implements behaviors for a graphic sprite in message.
798    -- When the message has a text component, the message symbol sprites
799    -- snap to coded words.
800
801    property baseLoc, wordIndex
802
803    -- wordIndex is the index of the message word that this sprite
804    -- is attached to.
805    -- wordIndex = 0 if sprite is not attached to a coded word.
806
807
808    -- to mouseUp need to add method to allow symbols to be placed into
809    empty
810    -- messages (e.g. default template = clear) and moved around in the
811    -- messages. Need also to add method to handle messages that consist of
812    -- nothing but symbols. Probably check to see if template is default.
813
814
815
816    -- ReInitializes the properties of sprite and resets the
817    -- memberNumber to 0, making the sprite available for reuse.
818
819    on recycleMessageSymbol me
820
821      set wordIndex = 0
822      set baseloc = point(-100, -100)    -- offstage
823      set the visible of sprite the spriteNum of me = 0
824      set the memberNum of sprite the spriteNum of me = 0
825      set the loc of sprite the spriteNum of me = baseloc
826
827    end recycleMessageSymbol
828
829
830
831    on mouseUp me
832      global rmG_state, rmG_mode
833
834      set upLoc = point(the mouseH, the mouseV)    -- the clickloc???
835
836      if rmG_state = #decIn OR rmG_mode = #display then    --- disable symbol
837        return(0)
838      end if
839
840      --- symbol enabled
841
842      set textSprite = 2    -- reserved for the message space
843
844      if not inside(uploc, the rect of sprite textsprite) then
845        deleteSymbolInMsg(me) -- take it out of msg
846        return(0)
847      end if
```

Appendix D: KidCode® Lingo Client/Server Rebus Message Handling Component Scripts

Page 17

```
848
849        -- since symbol can only be in the message
850        -- symbol was clicked in the message; maybe moved
851
852        if wordIndex <> 0 then -- moved from a coded word in message
853
854           set toWord = locToWordPos(member "MessageSpace", ¬
855                                  upLoc - the loc of sprite textsprite)
856
857           if toWord = wordIndex then -- they left sprite where it started
858              return(0)                -- do nothing
859           end if
860
861           if codeWordP(toWord) then  -- symbol moved to a different code word
862
863              moveSymbolInMsg(me, toWord)
864
865           else    -- symbol not placed on a coded word; disappear it
866              -- change this to accomodate picture messages
867
868              deleteSymbolInMsg(me) -- take it out of msg
869
870           end if
871
872        else -- symbol moved from somewhere else; maybe new or no text in msg
873           --- this shouldn't happen until we accomodate picture messages
874
875        end if
876
877        updatestage
878
879     end mouseUp
880
881
882
883     -- WordI is the index of the word in the message.
884     -- Normally wordI points to a coded word.
885     -- Checks should have been done prior to call to ensure that wordI
886     -- does not already have a symbol.
887
888     -- Note all locations in layoutIndex are relative to the origin of
889     -- the "MessageSpace" field
890
891     on placeSymbolInText me, wordI
892
893        global rmG_spaceWidth
894        global rmG_msgBody
895
896        set wordIndex = wordI    -- update my property
897        set fieldNum = the number of member "MessageSpace"
898        set textOrigin = the loc of sprite 2    -- sprite for "MessageSpace"
899        set message = getAt(rmG_msgBody,2)
900
```

Appendix D: KidCode® Lingo Client/Server Rebus Message Handling Component Scripts

Page 18

```
901      set startChar = getLayoutProp(wordIndex, #firstCharPos)
902      set startloc = getLayoutProp(wordIndex, #firstCharLoc)
903      set endloc = getLayoutProp(wordIndex, #lastCharLoc)
904
905      If wordSpaceH(wordI) < 120 then  --includes spaces before & after
906        set shiftDistance = integer((120 - (getAt(endloc,1) - ¬
907                                     getAt(startloc,1)) ) /2)
908        --- shift at beginning of word
909        set nchars = shiftTextRight(startChar, shiftDistance, fieldNum,
910  rmG_spaceWidth)
911        set startChar = startChar + nchars
912        set startLoc = myCharPosToLoc(member "MessageSpace", startChar)
913        set endChar = getLayoutProp(wordIndex, #lastCharPos) + nchars
914
915        --- shift at the end of word
916        shiftTextRight(endChar, shiftDistance, fieldNum, rmG_spaceWidth)
917        set endLoc = myCharPosToLoc(member "MessageSpace", endChar)
918
919        setLayoutProp(wordI, #firstCharPos, startChar)
920        setLayoutProp(wordI, #firstCharLoc, startLoc)
921        setLayoutProp(wordI, #lastCharPos, endChar)
922        setLayoutProp(wordI, #lastCharLoc, endLoc)
923
924
925        -- update all forward words info and symbols
926        repeat with x in message
927          set i = getProp(x, #wordIndex)
928          if i > wordI then
929            set startchar = getLayoutProp(i, #firstCharPos) + 2*nchars
930            --- setProp(x, #charPos, startChar)   -- never change this
931            setLayoutProp(i, #firstCharPos, startChar)
932            set startLoc = myCharPosToLoc(member fieldNum, startChar)
933            setLayoutProp(i, #firstCharLoc, startLoc)
934            set endChar = getLayoutProp(i, #lastCharPos) + 2*nchars
935            setLayoutProp(i, #lastCharPos, endChar)
936            set endLoc = myCharPosToLoc(member fieldNum, endChar)
937            setLayoutProp(i, #lastCharLoc, endLoc)
938
939            --- place the symbol
940            set nextSymbol = getLayoutProp(i, #symbolSprite)
941            if nextSymbol then
942              set the baseLoc of sprite nextSymbol = ¬
943                centerOnWord(member "MessageSpace", startLoc, endLoc) +
944  textOrigin
945              set the loc of sprite nextSymbol = the baseLoc of sprite
946  nextSymbol
947            end if
948
949          end if     -- i > wordIndex
950        end repeat   -- all forward words
951
952      end if         --- need to shift words
953
```

Appendix D: KidCode® Lingo Client/Server Rebus Message Handling Component Scripts

Page 19

```
954       --- handle this word's symbol placement  (whether or not text shifted)
955       setLayoutProp(wordI, #symbolSprite, the spriteNum of me)
956       set the forecolor of word wordindex of field "MessageSpace" = 0
957
958       --- update my sprite property
959       --- location is adjusted to be relative to stage origin
960       set baseLoc = centerOnWord(member "MessageSpace", ¬
961                        getLayoutProp(wordI, #firstCharLoc), ¬
962                        getLayoutProp(wordI, #lastCharLoc)) + textOrigin
963
964       set the loc of sprite the spriteNum of me = baseloc
965       --- record the symbol's castmember into the MessageBody
966       setProp(getAt(message, getLayoutProp(wordI, #msgIndex)), ¬
967              #symbol, the memberNum of sprite the spriteNum of me)
968
969    end placeSymbolInText
970
971
972    ------------------------------------------------------------
973    --- Moves the location of the symbol in the message
974    --- If necesary, checks that toWord is a codeWord should be done
975    --- prior to calling this handler.
976
977    on moveSymbolInMsg me, toWord
978
979       --- remove sprite from old word
980       setLayoutProp(wordIndex, #symbolSprite, 0)
981       setProp(getAt(getAt(rmG_msgBody, 2), getLayoutProp(wordIndex,
982    #msgIndex)),¬
983              #symbol, 0)
984       -- since decoder can't move symbols in message, this is the coder
985       set the forecolor of word wordIndex of field "MessageSpace" = 6  --red
986
987       --- put sprite on new word
988       placeSymbolInText(me, toWord)
989
990    end moveSymbolInMsg
991
992
993
994    --- Currently does not rejust text to create less space
995    --- around the word the symbol was moved from.
996
997    on deleteSymbolInMsg me
998       global rmG_msgBody
999
1000      setLayoutProp(wordIndex, #symbolSprite, 0)
1001      setProp(getAt(getAt(rmG_msgBody, 2), getLayoutProp(wordIndex,
1002   #msgIndex)),¬
1003             #symbol, 0)
1004
1005      -- since decoder can't move symbols in message, this is the coder
1006      set the forecolor of word wordIndex of field "MessageSpace" = 6  --red
```

Appendix D: KidCode® Lingo Client/Server Rebus Message Handling Component Scripts Page 20

```
     recycleMessageSymbol(me)

end deleteSymbolInMsg on toggleVisible me set the visible of me = not the visible of me end togglevisible -- message authoring handlers
-- clearMessageSpace clears the workspace, the symbols and
-- the guesses.
-- For now, in order to simulate SENDING a MSG this function
-- does not get rid of the active message in rmG_msgBody on clearMessageSpace
   global gFreeSpriteList
   global rmG_noSimulate if not rmG_noSimulate then end if --  first, make symbols invisible and free sprites
   repeat with i = 21 to 35
     recycleMessageSymbol(sprite i)
   end repeat -- clear the references to symbol sprites from the message Index
   clearLayoutSymbols()

--  second, clear away TypeInText fields for guesses
   repeat with i = 39 to 44
     set the visible of sprite i = FALSE
     set the loc of sprite i = point(-100, -100)   --put offstage
     -- put "  " into field (the memberNum of sprite i)
   end repeat --  third, clear away old template if any
   put "  " into member "MessageSpace"
   set the forecolor of member "MessageSpace" = 0    -- white updateStage end clearMessage -- message authoring handlers continued
```

Appendix D: KidCode® Lingo Client/Server Rebus Message Handling Component Scripts

Page 21

```
--- PlaceGraphics is called to put the symbols and guesses into the
text.
--- Assumes that the text has been laid out and the layout
--- index has been created.

on placeGraphics global rmG_msgBody
  global rmG_guesses, rmG_state, rmG_mode
  global rmG_symbolcastName set textSprite = 8     -- sprite reserved for Rebus message field
  set textOrigin = the loc of sprite textSprite
  set message = getAt(rmG_msgBody,2)

-- First, place the symbol graphics
  repeat with x in message
    if getProp(x, #code) then         -- code word might have symbol
      set index = getProp(x, #wordIndex)
      set xMember = getProp(x, #symbol)

if xMember > 0 then                 -- code word does have symbol
        set xSprite = getLayoutProp(index, #symbolSprite)
        if xSprite = 0 then         -- no sprite assigned to symbol
          set xSprite = newMessageSymbol(member xMember of castLib¬
                                                  rmG_symbolcastName)
        end if
        if xSprite <> 0 then   -- 0 if newMessage couldn't get one
          placeSymbolInText(sprite xSprite, index)
        else -- can't do anything, no more sprites.
          alert "No more sprites for symbols!!"
        end if if rmG_mode = #display OR rmG_state = #decIn or rmG_state =
done then
          --can't move symbols
          set the moveableSprite of sprite xSprite = FALSE
        end if else nothing    -- code word does not have a symbol
    else nothing    -- not a code word
  end repeat       -- finished processing symbols -- Second, place the typein text fields
  if rmG_state <> #new then    -- coder or decoder needs to see typedtxt
    placeGuesses
  end if updateStage end placeGraphics
```

Appendix D: KidCode® Lingo Client/Server Rebus Message Handling Component Scripts Page 22

```
1113   -- message authoring handlers continued
1114   --- message is a msgBody without state
1115   --- Needs to insert spaces when text is laid out
1116
1117   on layoutText message, cWordColor
1118
1119      global rmG_traceFlag
1120
1121      if rmG_traceFlag then
1122         put "In REBUS:layoutText"
1123         put " coded word color = " & cWordColor
1124      end if
1125
1126      -- text invisible until changed
1127      put " " into member "MessageSpace"
1128      set the forecolor of member "MessageSpace" = 0
1129
1130      set ts = ""
1131      set indices = []
1132      set symbols = [:]
1133      set charPos = 1
1134      repeat with x in message
1135         set nspaces = 1
1136         set ts = ts & getProp(x, #text)
1137         if getProp(x, #code) then
1138            add(indices, getProp(x, #wordIndex))
1139            addProp(symbols, getProp(x, #wordIndex), getProp(x, #symbol))
1140         end if
1141      end repeat
1142
1143      put ts into field "MessageSpace"
1144
1145      -- color the text and make it visible
1146      repeat with x = 1 to the number of words in ts
1147         if getOne(indices, x) then   -- x is a code word
1148            if getProp(symbols, x) <> 0 then -- x has been coded
1149               set the forecolor of word x of field "MessageSpace" = cWordColor
1150            else
1151               set the forecolor of word x of field "MessageSpace" = 6 --red
1152            end if
1153         else
1154            set the forecolor of word x of field "MessageSpace" = 3 -- blue
1155         end if
1156      end repeat
1157
1158   end layoutText
1159
1160
1161   --- layout index handlers
1162   --- The layout index records information about the position and
1163   --- location of coded words in the "MessageSpace" authoring and
1164   --- display area.
1165   --- It is a property list with the following structure:
```

Appendix D:   KidCode® Lingo Client/Server Rebus Message Handling Component Scripts Page 23

```
---
---   [ layoutIndex: [ firstCharPos, firstCharLoc, ¬
                       lastCharPos, lastCharLoc, symbolsprite, msgIndex]
---      etc..... ]
--- msgIndex is a pointer to the list location of the word in the
--- rmG_msgBody data structure.

on addIndexedWord   wordIndex
  global rmG_layoutIndex if getOne(getWordIndices(), wordIndex) then
    return 0
  else addProp(rmG_layoutIndex, wordIndex, [])

end addIndexedWord

--- Properties in rmG_layoutIndex should NEVER be set outside of
--- this function!
--- Error handling should be inserted.

on setLayoutProp  wordIndex,  indexProp,  val
  global rmG_layoutIndex if listp(getProp(rmG_layoutIndex, wordIndex)) then    --index is valid
    case indexProp of
      #firstCharPos:
        setAt(getProp(rmG_layoutIndex, wordIndex), 1, val)
      #firstCharLoc:
        setAt(getProp(rmG_layoutIndex, wordIndex), 2, val)
      #lastCharPos:
        setAt(getProp(rmG_layoutIndex, wordIndex), 3, val)
      #LastCharLoc:
        setAt(getProp(rmG_layoutIndex, wordIndex), 4, val)
      #symbolSprite:
        setAt(getProp(rmG_layoutIndex, wordIndex), 5, val)
      #msgIndex:
        setAt(getProp(rmG_layoutIndex, wordIndex), 6, val)
      otherwise
        alert "ERROR: " & indexProp & " not a valid property for ¬
                  rmG_layoutIndex"
    end case
  else
    alert "ERROR: Invalid word index. Word " & wordIndex & ¬
              " may not be a coded word."
  end if end setLayoutProp
```

Appendix D: KidCode® Lingo Client/Server Rebus Message Handling Component Scripts Page 24

```
1219    --- layout index handlers continued
1220    --- Access function for LayoutIndex
1221
1222    on getLayoutProp wordIndex, indexProp
1223      global rmG_layoutIndex
1224
1225      set val = []
1226      if listp(getProp(rmG_layoutIndex, wordIndex)) then    --index is valid
1227        case indexProp of
1228          #firstCharPos:
1229            set val = getAt(getProp(rmG_layoutIndex, wordIndex), 1)
1230          #firstCharLoc:
1231            set val = getAt(getProp(rmG_layoutIndex, wordIndex), 2)
1232          #lastCharPos:
1233            set val = getAt(getProp(rmG_layoutIndex, wordIndex), 3)
1234          #LastCharLoc:
1235            set val = getAt(getProp(rmG_layoutIndex, wordIndex), 4)
1236          #symbolSprite:
1237            set val = getAt(getProp(rmG_layoutIndex, wordIndex), 5)
1238          #msgIndex:
1239            set val = getAt(getProp(rmG_layoutIndex, wordIndex), 6)
1240          otherwise
1241            alert "ERROR: " & indexProp & " not a valid property."
1242        end case
1243      else
1244        alert "ERROR: Invalid word index. "
1245      end if
1246
1247      return val
1248
1249    end getlayoutProp
1250
1251
1252    on getWordIndices
1253      global rmG_layoutIndex
1254
1255      set indices = []
1256      repeat with i = 1 to count(rmG_layoutIndex)
1257        add(indices, getPropAt(rmG_layoutIndex, i))
1258      end repeat
1259
1260      return indices
1261    end getWordIndices
1262
1263
1264
1265    -- return the wordIndex associated with the sprite
1266
1267    on getSpriteWord spriteNum
1268
1269      set codeWords = getWordIndices()
1270      repeat with i in codeWords
1271        if getLayoutProp(i, #symbolSprite) = spriteNum then return(i)
```

Appendix D: KidCode® Lingo Client/Server Rebus Message Handling Component Scripts Page 25

```
1272      end repeat
1273
1274      return(0)  -- no coded wrod associated with sprite
1275
1276   end getSpriteWord
1277
1278
1279   --- layout index handlers continued
1280   ----------------------------------------------------------------
1281   -- Should only be called after the template has been laid out
1282   -- in the MessageSpace.  Otherwise the information will not be
1283   -- correct.
1284
1285   on makeLayoutIndex  msgWords
1286      global rmG_layoutIndex
1287
1288      -- for safety make sure LayoutIndex is clear before starting
1289      set rmG_layoutIndex = [:]
1290      set textOrigin = the loc of sprite 2   --sprite for MessageSpace"
1291
1292      set i = 1
1293      repeat with x in msgWords
1294         set index = getProp(x, #wordIndex)
1295         addIndexedWord(index)
1296         set startPos = getProp(x, #charPos)
1297         setLayoutProp(index, #firstCharPos, startPos)
1298         setLayoutProp(index, #firstCharLoc, ¬
1299                  myCharPosToLoc(member "MessageSpace", startPos) )
1300
1301         set endPos = startPos + length(getProp(x, #text)) - 1
1302         setLayoutProp(index, #lastCharPos, endPos)
1303         setLayoutProp(index, #lastCharLoc, ¬
1304                  myCharPosToLoc(member "MessageSpace", endPos))
1305         setLayoutProp(index, #msgIndex, i)
1306         set i = i+1
1307
1308         -- assume that if the index has not been created,
1309         -- sprites have not yet be assigned to symbol graphics
1310         -- Could use this property only for coded words but it is probably
1311         -- not worth it.
1312         setLayoutProp(index, #symbolSprite, 0)
1313
1314      end repeat
1315
1316   end makeLayoutIndex
1317
1318
1319
1320
1321   on clearLayoutSymbols
1322      global rmG_layoutIndex
1323
1324      repeat with x in rmG_layoutIndex
```

Appendix D: KidCode® Lingo Client/Server Rebus Message Handling Component Scripts Page 26

```
1325        setAt(x, 5, 0)
1326      end repeat
1327
1328    end clearLayoutSymbols
1329
1330
1331
1332    -- View Handlers     Sprites 39 to 44 are reserved for guesses
1333
1334    on HideGuesses
1335      repeat with i = 39 to 44
1336        puppetSprite i, TRUE
1337        set the visible of sprite i = FALSE
1338      end repeat
1339    end HideGuesses
1340
1341    on ShowGuesses
1342      repeat with i = 39 to 44
1343        puppetSprite i, TRUE
1344        set the visible of sprite i = TRUE
1345      end repeat
1346    end ShowGuesses
1347
1348    on HideSymbols
1349      global rmG_state, rmG_userName
1350
1351      if rmG_state = #decIn then
1352        if getProp(rmG_mailData, #to) = rmG_userName then
1353          --- from the decoder's inbox
1354          set wcolor = 0 -- coded words white
1355        else -- User sent this message to someone else
1356          set wcolor = 6 -- coded words red
1357        end if
1358      else
1359        if getProp(rmG_mailData, #to) <> rmG_userName then
1360          --- User is not the coder
1361          set wcolor = 0 -- coded words white
1362        else -- user is the coder
1363          set wcolor = 6 -- coded words red
1364        end if
1365      end if
1366
1367      set codeWords = getWordIndices()
1368      repeat with i in codeWords
1369        set sNum = getLayoutProp(i, #symbolSprite)
1370        if sNum then
1371          set the visible of sprite sNum = FALSE
1372          set the forecolor of word i of field "MessageSpace" = wcolor
1373        end if
1374      end repeat
1375
1376    end HideSymbols
1377
```

Appendix D: KidCode® Lingo Client/Server Rebus Message Handling Component Scripts Page 27

```
1378   on ShowSymbols
1379
1380     set codeWords = getWordIndices()
1381     repeat with i in codeWords
1382       set sNum = getLayoutProp(i, #symbolSprite)
1383       if sNum then
1384         set the visible of sprite sNum = TRUE
1385         set the forecolor of word i of member "MessageSpace" = 0
1386       end if
1387
1388     end repeat
1389
1390   end ShowSymbols
1391
1392   -- Type-in text fields used to record decoder's solution for the
1393   message.
1394   -- Eventually these should be changed to list boxes for younger
1395   children.
1396
1397   -- Assume sprites 39-44 have been reserved for guesses
1398   -- Field cast members "Guess1" through "Guess6" are reserved for
1399   guesses.
1400   -- The width of these cast members should be set at 100 pixels
1401   -- or less (currently 90). This cannot be done with Lingo.
1402   -- The boxtype should be #fixed.  If text can't fit, the boxtype
1403   -- should be changed to #scroll at runtime.
1404
1405   ----------------------------------------------------------------
1406   -- assumes that the global variable rmG_msgBody has been
1407   -- initialized.
1408
1409   on initializeGuesses
1410     global rmG_msgBody, rmG_guesses
1411
1412     --- for safety reset rmG_guesses
1413     set rmG_guesses = []
1414     if not listp(rmG_msgBody) or count(rmG_msgBody) = 0 then
1415       alert "ERROR: rmG_msgBody not initialized correctly"
1416       return
1417     end if
1418
1419     set gNum = 1
1420     repeat with x in getAt(rmG_msgBody, 2)
1421
1422       if getProp(x, #code) then   --this word needs a guess
1423
1424         set cNum = the number of member ("Guess" & gNum)
1425         put getProp(x, #guess) into field cNum
1426
1427         -- format fields
1428         -- most text formatting is done in startMovie handler
1429         set the forecolor of member cNum = 6   -- red
1430         set the boxtype of member cNum = #adjust
```

Appendix D: KidCode® Lingo Client/Server Rebus Message Handling Component Scripts

Page 28

```
1431            set the border of member cNum = 1
1432
1433            -- assign a sprite (from 39-44) to this guess
1434            set sNum = 38 + gNum      -- first guess is 1
1435
1436            -- Although macromedia says you don't need to
1437            -- puppet sprites in Director 6,
1438            -- the guesses do not appear correctly unless the
1439            -- sprites are puppeted.  This is probably a result
1440            -- of the fact that there is nothing in the sprite
1441            -- channels for guesses in the score.
1442            -- In any event unless this method turns out to be
1443            -- unstable.  We will use it.
1444            puppetsprite sNum, TRUE
1445
1446            set the visible of sprite sNum = FALSE
1447            set the moveablesprite of sprite sNum = FALSE
1448            set the loc of sprite sNum = point(-100, -100)   --offstage
1449            set the memberNum of sprite sNum = cNum
1450            -- set the editable of sprite sNum = FALSE
1451
1452            -- record guess info into rmG_guesses
1453            set guess = [:]
1454            addProp(guess, #cast, cNum )
1455            addProp(guess, #sprite, sNum)
1456            addProp(guess, #wordIndex, getProp(x, #wordIndex))
1457            append(rmG_guesses, guess)
1458
1459            set gNum = gNum + 1
1460          else nothing    --- it is not a coded word
1461        end repeat
1462
1463    end initializeGuesses
1464
1465
1466    on cleanupGuesses
1467      global rmG_guesses
1468
1469      repeat with x in rmG_guesses
1470        set sNum = getProp(x, #sprite)
1471        set the visible of sprite sNum = FALSE
1472        set the memberNum of sprite sNum = 0
1473        put " " into member getProp(x, #cast)
1474      end repeat
1475
1476      set rmG_guesses = []
1477
1478    end cleanupGuesses
1479
1480
1481    -- Places a sprite for each guess just below the word that it
1482    corresponds to.
```

Appendix D: KidCode® Lingo Client/Server Rebus Message Handling Component Scripts Page 29

```
1483    -- Assume that rmG_guesses has been properly initialized with each
1484    guess.
1485
1486    on placeGuesses
1487       global rmG_guesses, rmG_state, rmG_mode
1488
1489       --- sprite 2 is Rebus message field. It's cast member is
1490    "MessageSpace"
1491       set textOrigin = the loc of sprite 2
1492
1493       repeat with x in rmG_guesses
1494
1495          if getLayoutProp(getProp(x, #wordIndex), #symbolSprite) then
1496             -- this word is coded;  it needs a guessbox
1497
1498             set guessSprite = getProp(x, #sprite)
1499             set guessMember = the memberNum of sprite guessSprite
1500
1501             if rmG_state = #decIn and rmG_mode = #author then
1502                set the editable of member guessMember = TRUE
1503             else set the editable of member guessMember = FALSE
1504
1505             -- place the sprite
1506             set the loc of sprite guessSprite = ¬
1507                   getLayoutProp(getProp(x, #wordIndex), ¬
1508                                 #firstCharLoc) + textOrigin + point(0, 2)
1509             set the visible of sprite guessSprite = TRUE
1510
1511          end if    -- x is a coded word
1512
1513       end repeat   -- x in rmG_guesses
1514       updatestage
1515
1516    end placeGuesses
1517
1518    ----------------------------------------------------------------
1519    -- Reads latest guesses from the guess cast members back into
1520    -- the message body.
1521
1522    on putGuessesInMsg
1523       global rmG_msgBody, rmG_guesses
1524
1525       set message = getAt(rmG_msgBody, 2)
1526
1527       repeat with x in rmG_guesses
1528          set str = the text of member getProp(x, #cast)
1529          repeat with y in message
1530             if getProp(y, #code) then
1531                if getProp(y, #wordIndex) = getProp(x, #wordIndex) then
1532                   setProp(y, #guess, str)
1533                   exit repeat
1534                end if
1535             end if
```

Appendix D: KidCode® Lingo Client/Server Rebus Message Handling Component Scripts Page 30

```
1536
1537        end repeat
1538      end repeat
1539
1540    end putGuessesInMsg
1541
1542
1543
1544
1545    -- this function is obsoleted..
1546
1547    on sendIt
1548      global rmG_msgBody, rmG_mailData, rmG_state, rmG_mode
1549      global rmG_noSimulate
1550
1551      -- It seems that rmG_state gets reset on return to EmailMain
1552      -- reset it here
1553      -- set rmG_state = getAt(rmG_msgBody, 1)
1554      -- IF SIMULATE SEND but don't change MsgBody, otherwise send
1555
1556      if not rmG_noSimulate then
1557        simulateSend()
1558
1559      else    -- called from email main
1560
1561        -- next is not sufficient; should check for a valid address
1562        if the text of member "To" = "" then
1563          alert "No one to send to...."
1564          return
1565        end if
1566
1567        -- read header information from fields
1568        -- back into the message body
1569
1570        updateHeader
1571
1572        toggleRebusState()
1573        set rmG_mode = #display  -- can't edit message further
1574
1575        putGuessesInMsg
1576
1577        -- ADD UPDATED MESSAGE BODY TO rmG_mailData
1578
1579        setaProp rmG_mailData, #msgbody, rmG_msgBody
1580
1581
1582        -- SEND MESSAGE TO EMAIL MAIN
1583        ---  NOTE: sendToggle lets messageHandler know to send the message
1584        ---  rather than simply save a previously sent message
1585
1586        set sendToggle = 1
1587
1588        tell the stage
```

Appendix D: KidCode® Lingo Client/Server Rebus Message Handling Component Scripts Page 31

```
            global rmG_mailData, rmG_mode messageHandler sendToggle end tell end if end on simulateSend
      global rmG_msgBody, rmG_mailData, rmG_state alertSent()
      toggleRebusState()
      setProp(rmG_mailData, #From, the text of field "to")
      clearMessageSpace    -- this clears symbols and guesses
      openMessage end simulateSend on toggleRebusState
      global rmG_state, rmG_msgBody case rmG_state of
         #new:
            deleteAt(rmG_msgBody, 1)
            AddAt(rmG_msgBody,1,#decIn)
         #decIn:
            deleteAt(rmG_msgBody, 1)
            AddAt(rmG_msgBody,1,#codIn)
         #codIn:
            deleteAt(rmG_msgBody, 1)
            addAt(rmG_msgBody, 1, #decIn)
         #gotIt:
            -- coder indicated that they solved it before sending
            -- deleteAt(rmG_msgBody, 1)
            -- addAt(rmG_msgBody, 1, #gotIt)
      end case set rmG_state = getAt(rmG_msgBody, 1)

end toggleRebusState

-- Text format
   -------------------------------------------------------------
   -- Initialize formatting of all visible text fields
```

Appendix D: KidCode® Lingo Client/Server Rebus Message Handling Component Scripts Page 32

```
1642    -- Should be called when movie starts
1643
1644    on formatFields
1645
1646      repeat with i = 1 to 6
1647        SetTextInfo "Guess" & i, "  ", "left", "arial", 20, "bold"
1648      end repeat
1649
1650      SetTextInfo "To", "  ", "left", "arial", 14, "bold"
1651      SetTextInfo "ToDown", "  ", "left", "arial", 14, "bold"
1652      set the lineHeight of field "ToDown" = 30
1653      -- set the lineHeight of field "To" = 18
1654      --set the border of member "To" = 1
1655      set the border of member "ToDown" = 1
1656      set the margin of member "To" to 4
1657      set the margin of member "ToDown" to 8
1658
1659    end formatFields
1660
1661
1662    -------------------------------------------------------
1663    -- SetUpMessageSpace
1664    -- need to know difference between default line height
1665    -- for a given fontsize and the lineHeight we have set
1666
1667    on setupMessageSpace
1668      global rmG_spaceWidth       -- pixel width of a space in "MessageSpace"
1669
1670      setTextInfo "MessageSpace", "  ", "left", "arial", 32, "bold"
1671
1672      set the forecolor of member "MessageSpace" = 0   --white is invisible
1673
1674      -- standard lineheight for 32 pt font = 39
1675      set the lineHeight of member "MessageSpace" = 95
1676
1677      set rmG_spaceWidth = charwidth(1, "MessageSpace")
1678
1679
1680    end setupMessageSpace
1681
1682
1683
1684    -- Utilities
1685    -------------------------------------------------------
1686    --- MyCharPosToLoc
1687    --- Adjusts for bug in Lingo charPosToLoc function and returns
1688    --- correct results regardless of whether the lineHeight of the
1689    --- field has been set.
1690
1691    --- Lingo bug causes charPosToLoc function to return different
1692    --- results if the lineheight of a field has been set - even
1693    --- if the lineheight is set to exactly the value it started at
1694    --- The function works correctly as long as lineheight has not
```

Appendix D: KidCode® Lingo Client/Server Rebus Message Handling Component Scripts

Page 33

```
1695    --- been set. If the lineheight has been set, vertical
1696    --- coordinates = point(x,-2) for characters in the first line
1697    --- and point(x, line#*lineHeight -2) characters on subsequent
1698    --- lines. Unfortunately, this is not where the characters are!
1699
1700    on myCharPosToLoc  fieldMember,  charPos
1701
1702      set maybeLoc = charPosToLoc(fieldMember, 1)
1703      if getAt(maybeLoc, 2) <> -2 then   -- Macromedia is good
1704        return(charPosToLoc(fieldMember, charPos))
1705
1706      else  -- fix the loc
1707
1708        set memNum = the number of member fieldMember
1709        set fHeight = getFontHeight(memNum)
1710        set lHeight = the lineHeight of field memNum   --if badloc, this is
1711    correct
1712        if the fontSize of field memNum <=24 then
1713          set topHeight = 2
1714        else set topHeight = 6
1715        set belowHeight = lHeight - fHeight - 2
1716
1717        --- adjust Lingo value to be correct
1718        set badLoc = charPosToLoc(fieldMember, charPos)
1719        return( badLoc + point(0, fHeight +2 + topHeight))
1720      end if
1721
1722    end myCharPosToLoc
1723
1724    ─────────────────────────────────────────────
1725    --- GetFontHeight is used to determine the vertical distance of
1726    --- tallest character for any font.
1727    --- This distance excludes any space above or below the font.
1728
1729    on getFontHeight  fieldMemberNum
1730      --- lineheight may have been changed so need to create a
1731      --- new cast member with font, fontsize and style. To determine
1732      --- the fontHeight
1733
1734      set tmpNum = findEmpty(member 1)
1735      set tmpMember = new(#field, member tmpNum of castLib "Internal")
1736
1737      put "Test" into field tmpNum
1738      set the font of field tmpNum = the font of field fieldMemberNum
1739      set the fontSize of field tmpNum = the fontSize of field
1740    fieldMemberNum
1741      set the fontStyle of field tmpNum = the fontStyle of field
1742    fieldMemberNum
1743
1744      -- get the location of the lower left corner of 1st char
1745      set bottomLeft = charPosToLoc(member tmpNum, 1)
1746
1747      set tmpMember = 0     -- clear reference to the field before erasing
```

Appendix D: KidCode® Lingo Client/Server Rebus Message Handling Component Scripts

Page 34

```
1748      erase member tmpNum
1749
1750      if the fontsize of field fieldMemberNum <=24 then
1751        -- 1st line starts 2 points below top of field
1752        return(getAt(bottomLeft,2) - 2)
1753      else
1754        -- 1st line starts 6 points below top of field
1755        return(getAt(bottomLeft,2) - 6)
1756      end if
1757
1758    end getFontHeight .
1759
1760    ----------------------------------------------------------------
1761    --- LocToWordPos returns the index of the word under loc in
1762    --- the field. Vertical space in the field is assigned to the
1763    --- closest char in the field. If loc is on a space between
1764    --- words (horizontal only, see below), the function returns 0.
1765    --- If the loc is not in the field, results are unpredictable.
1766    --- The Lingo loctoCharPos function will return either the first
1767    --- or the last character in the field, depending upon the loc.
1768    --- Comparable to the built-in Lingo locToCharPos function,
1769    --- the location argument is assumed to be relative to the origin
1770    --- of the text field.
1771
1772    --- Uses the Lingo function locToCharPos. locToCharPos is not
1773    --- subject to the Lingo lineHeight bug. All locations with
1774    --- vertical coordinates within a lineheight return a character
1775    --- on that line. For example, if lineheight is 36 then any location
1776    --- in the interval, [point(x,0) point(x, 36)] with return a character
1777    --- on the first line, any location in the interval,
1778    --- [point(x, 37) point(x, 72)] will return a character in the second
1779    --- line, etc. Note: a character is returned even if the location
1780    --- is on the white space between lines.
1781
1782    on locToWordPos fieldMember, locInField
1783
1784      set charPos = locToCharPos(fieldMember, locInField)
1785
1786      -- FIX THIS TO CHECK THAT LOC IS IN FIELD ELSE RETURN 0.
1787      -- locTocharPos will return 1 if the loc is above or left of the field
1788      -- It will return lenght(text) + 1 if the loc is below or right of
1789    field
1790
1791      if char charPos of field fieldMember = " " then -- on a space
1792        return(0)
1793      else
1794        return(the number of words in char 1 to charPos of field
1795    fieldMember)
1796      end if
1797
1798    end locToWordPos
1799
1800    ────────────────────────────────────────────────────────────────
```

Appendix D: KidCode® Lingo Client/Server Rebus Message Handling Component Scripts Page 35

```
1801
1802   on charWidth charPos, afield
1803     return GetAt(charPosToLoc(member afield, charPos+1) - ¬
1804           charPosToLoc(member afield, charPos), 1)
1805   end charWidth
1806
1807
1808   -- determines how much horizontal space in pixels is taken
1809
1810   on wordSpaceH wordIndex
1811
1812     set textOrigin = the loc of sprite 2
1813     set lastC = length(word 1 to (wordIndex+1) of field "MessageSpace")¬
1814               - length(word wordIndex +1 of field "MessageSpace") + 1
1815     if wordIndex = 1 then
1816       set firstC = 1
1817     else
1818       set firstC = length(word 1 to (wordIndex-1) of field "MessageSpace")
1819   + 1
1820     end if
1821
1822     set firstLoc = myCharPosToLoc(member "MessageSpace", firstC)
1823     set lastLoc =  myCharPosToLoc(member "MessageSpace", lastC)
1824
1825     if getAt(firstLoc, 2) <> ¬
1826               getAt(getLayoutProp(wordIndex, #firstCharLoc), 2) then
1827       -- if word before is not on same line this is first in line
1828
1829       set wspace = getAt(lastLoc,1) - the left of sprite 8
1830
1831     else if getAt(lastLoc, 2) <> ¬
1832               getAt(getLayoutProp(wordIndex, #lastCharLoc), 2) then
1833       -- if word after is not on same line this is last in line
1834
1835       set wspace = the right of sprite 8 - getAt(firstLoc,1)
1836
1837     else --- this is in the middle of the line
1838
1839       set wspace = getAt(lastloc, 1) - getAt(firstLoc, 1)
1840
1841     end if
1842
1843     return wspace
1844   end wordSpaceH
1845
1846
1847
1848   --- centerInBox sets sprite location to align registration point
1849   --- to the center of the rectangle
1850
1851   on centerInBox aSprite, aRect
1852
```

Appendix D: KidCode® Lingo Client/Server Rebus Message Handling Component Scripts

Page 36

```
      set wordHCenter = getAt(aRect,1) + integer((getAt(aRect,3)-
getAt(aRect,1))/2)
      set wordVCenter = getAt(aRect,2) + integer((getAt(aRect,4)-
getAt(aRect,2))/2)
      set the locH of sprite aSprite = wordHCenter
      set the locV of sprite aSprite = wordVCenter return(the loc of sprite aSprite)
    end centerInBox --- CenterOnWord returns a point that is the center of the
    --- word contained in the space between startLoc and endLoc.
    --- Mainly it takes care of vertical position of word center.
    --- It centers at 1/2 the height of the font. (Not lineheight)
    --- Assumes startloc and endloc are bottom left corners of first
    --- and last characters.

on centerOnWord fieldMember, startLoc, endLoc

-- for performance make this a global for "MessageSpace"
      set fHeight = getFontHeight(fieldMember)
      set xCoord = getAt(startLoc, 1)+ ((getAt(endLoc, 1) - getAt(startLoc,
1))/2)
      return(point(xCoord, getAt(startLoc, 2) - fHeight/2))

end centerOnWord

-- makeWordRect returns a rect that bounds a word in a field member.
    -- The rect includes 1/2 of the space below the line of the word.
    -- The return value has coordinates relative to the field Member.
    -- Assume startloc and endloc are coordinates relative to origin
    -- of the fieldMember argument.
    -- Assume that startloc and endloc point to the bottom left corner
    -- of the first and last characters of the word.

on makeWordRect  fieldMember, startloc, endloc set wordRect = rect(0,0,0,0)   -- value to be returned set fieldNum = the number of fieldMember end makeWordRect on shiftTextRight cPos, pixDistance, fieldNum, spaceWidth
```

Appendix D: KidCode® Lingo Client/Server Rebus Message Handling Component Scripts Page 37

```
      set nchars = integer( float(pixdistance) / spaceWidth)
      repeat with i = 1 to nchars
        put " " before char cPos of field fieldNum
      end repeat
      return nchars end shiftTextRight --- codeWordP returns true if the word is a word
    --- in the message to be coded
    --- on codeWordP wordIndex
      global rmG_msgBody set message = getAt(rmG_msgBody,2)
      repeat with i = 1 to count(message)
        set nextItem = getAt(message,i)
        if getProp(nextItem, #code) then
          if getProp(nextItem, #wordIndex) = wordIndex then
            return(1)
          end if
        end if
      end repeat return(0)

end codeWordP on fillToList
      global rmG_registeredUsers put "" into field "ToDown"
      repeat with uname in rmG_registeredUsers
        put uname & RETURN after field "ToDown"
      end repeat end filltoList on alertSent go to frame "sent"

end alertSent
```

Appendix D: KidCode® Lingo Client/Server Rebus Message Handling Component Scripts Page 38

```
on flashSprite  spriteNum
  set the visible of sprite spriteNum = ¬
           not (the visible of sprite spritenum)

starttimer
  repeat while the timer < 30
    nothing
  end repeat end flashSprite -- programming utility to easily copy scripts to cast members
-- call from the message window on copyScript  fromCast, toCast1,  toCast2
  repeat with i = toCast1 to toCast2
    set the scriptText of member i = the scripttext of member fromCast
  end repeat
end copyScript
```

---

```
on clearScripts  fromCast, toCast
  repeat with i = fromCast to toCast
    set the scriptText of member i = ""
  end repeat
end clearScripts --  score  scripts  sentmsg_loop on exitFrame
  flashSprite(49)
  go to the frame
end on mouseDown -- make sure the flashing sprite is visible
  set the visible of sprite 49 = TRUE
  go to frame 2 end
```

---

```
--   score  scripts  fr_startMenus
```

Appendix D: KidCode® Lingo Client/Server Rebus Message Handling Component Scripts Page 39

```
on exitFrame
  global rmG_testState

-- first clear any existing menus
  installMenu 0

-- maybe should setup graphics palette here
  if rmG_testState then
    installMenu "userTestMenu"
  else
    installMenu "standardMenu"
  end if end -- score scripts fr_gotIt_loop on exitFrame repeat with i = 21 to 35
    togglevisible sprite i
  end repeat go to the frame
end -- API Public Handlers
-------------------------------------------------
--- Ugly hack to work around problem with Director startup
--- of MIAWs.  The problem is that, after calling a handler in the
--- MIAW, the StartMovie handler for the MIAW does not run until
--- the calling movie advances to its next frame.
--- Therefore, the calling sequence in the calling movie
--- has to be engineered so that the real handlers in the MIAW do not
--- run until after control has been transfered back to the calling
--- movie. However, at least one handler in the MIAW must be called
--- by the calling movie before the StartMovie handler will run.

--- startMeUp is the fake handler that, when called by the
--- main movie, will upon return to the main movie,
--- cause this movie's startMovie handler to run.

--- The second part of this wormy hack is contained in the MIAW's
--- startMovie handler... It is a call to a workAround handler in
--- the calling movie called continueComponent
--- The calling movie's continueRebus handler calls the real handlers
--- in the MIAW.

on emc_startMeUp
  -- put "Macromedia sucks!"
```

Appendix D: KidCode® Lingo Client/Server Rebus Message Handling Component Scripts Page 40

```
2065      global rmG_noSimulate
2066      set rmG_noSimulate = TRUE
2067      return(1)
2068
2069   end emc_startMeUp
2070
2071   _____
2072   -- API Public Handlers continued
2073   -- initWindow is called by the stage when a Rebus movie is opened
2074   -- It sets up the user information
2075   -- Need to wait for the message before the templates and symbol group
2076   -- can be setup.
2077
2078   on emc_initWindow userName
2079      global rmG_registeredUsers    -- list of KidCode system usernames
2080      global rmG_userName           -- current username
2081      global rmG_UserGroup          -- user group of current user
2082      global rmG_layoutIndex            -- ds to improve efficiency of layout
2083      global rmG_templates
2084      global rmG_traceFlag
2085
2086      if rmG_traceFlag then
2087         put "In REBUS:emc_InitWindow"
2088         put "     userName = " & userName
2089      end if
2090
2091      tell the stage to emh_getRegisteredUsers()
2092      set rmG_registeredUsers = the result
2093      set rmG_userName = userName
2094
2095      tell the stage to emh_getUserData(userName)
2096      set userData = the result
2097      set rmG_UserGroup = getAt(userData, 3)
2098
2099      -- NEXT EXISTS SO THAT REBUS MOVIE CAN BE RUN IN SIMULATION MODE
2100      -- MUST BE SET TO FALSE TO RUN AS EMAIL COMPONENT!!!!
2101      global rmG_noSimulate    -- if TRUE, runs independent of email
2102
2103      If the result = 0 then
2104         set rmG_noSimulate = FALSE
2105      else
2106         set rmG_noSimulate = TRUE
2107      end if
2108
2109
2110      initializeTemplates()  --set up rmG_templates
2111
2112      --- Format the font properties of text fields and the MessageSpace
2113      setUpMessageSpace()
2114      formatFields()
2115
2116      --- allow To field to be a listbox
2117      puppetSprite 50, TRUE
```

Appendix D: KidCode® Lingo Client/Server Rebus Message Handling Component Scripts Page 41

```
2118
2119      set rmG_layoutIndex = [:]   -- records word position and loc info by
2120   index
2121
2122      return(1)
2123   end emc_initWindow
2124
2125
2126   -- API Public Handlers continued
2127   --- closeWindow is not called unless Rebus plays as
2128   --- a MIAW.
2129
2130   on emc_closeWindow
2131      finishMovie
2132      return(1)
2133   end emc_closeWindow
2134
2135   _____
2136
2137   on emc_getComponentInfo
2138
2139      -- eventually the MIMEtype field will be application/x-rebus
2140
2141      return(list("Rebus",3,#msgHandler,"rebus"))
2142
2143   end emc_getComponentInfo
2144
2145   _____
2146
2147   on msh_openMessage mailData, mode
2148      global rmG_traceFlag
2149      global rmG_registeredUsers
2150      global rmG_msgBody, rmG_mailData, rmG_mode, rmG_state, rmG_symbolGroup
2151      global rmG_lineHeightFix
2152      global rmG_noSimulate      --- False to run simulation independent of
2153   email
2154      global rmG_testState
2155      global rmG_templates, gTemplateIndex
2156      global rmG_symbolcastName, rmG_symbolGroup
2157      global rmG_userName
2158
2159      set rmG_mailData = mailData
2160
2161      if rmG_traceFlag then
2162         put "In REBUS:msh_openMessage"
2163         put "     mode = " & mode
2164         put "     maildata = " & mailData
2165      end if
2166
2167      set rmG_mode = mode
2168
2169      if rmG_noSimulate then
2170         set rmG_msgBody = getProp(mailData, #msgbody)
```

Appendix D: KidCode® Lingo Client/Server Rebus Message Handling Component Scripts

Page 42

```
2171
2172      if count(rmG_msgBody) = 0 then    -- start a new message
2173
2174        startMessage("default")
2175        --- Fill header fields
2176        put getProp(mailData, #to) into field "To"
2177        put rmG_userName into field "From"
2178        put the abbreviated date into field "Date"
2179        put "Rebus Challenge" into field "Re"
2180
2181        -- setup templates and symbols
2182        set rmG_theTemplateIndex = getPos(rmG_templates, "default")
2183        set rmG_symbolGroup = getTemplateProp("default", #symbols)
2184
2185        -- administrator uses a different symbol library
2186        if rmG_testState = 0 then
2187          set rmG_symbolcastName = "Symbols"
2188        else
2189          set rmG_symbolcastName = getTemplateProp("default", #library)
2190        end if
2191
2192      else   --- Handle existing message
2193
2194        set rmG_state = getAt(rmG_msgBody, 1)
2195        set whichTemplate = getAt(rmG_msgBody,3)
2196
2197        clearMessageSpace
2198        putHdrFields()    -- read headers into field members
2199
2200        --- setup symbols in graphics palette to match template
2201        set theTemplate = getAt(rmG_msgBody,3)
2202        set rmG_theTemplateIndex = GetPos(rmG_templates, theTemplate)
2203        set rmG_symbolcastName = getTemplateProp(theTemplate, #library)
2204        set rmG_symbolGroup = getTemplateProp(theTemplate, #symbols)
2205        setupSymbolPalette rmG_symbolcastName
2206        initializeGuesses       -- uses global var rmG_msgBody
2207
2208        case rmG_state of
2209          #new:
2210            layoutText(getat(rmG_msgBody,2), 6)  -- coded words red
2211            makeLayoutIndex(getAt(rmG_msgBody, 2))
2212            placeGraphics()
2213
2214          #decIn:
2215            if getProp(rmG_mailData, #to) = rmG_userName then
2216              --- from the decoder's inbox
2217              layoutText(getat(rmG_msgBody,2), 0) -- coded words white
2218            else -- User sent this message to someone else
2219              layoutText(getat(rmG_msgBody,2), 6) -- coded words red
2220            end if
2221            makeLayoutIndex(getAt(rmG_msgBody, 2))
2222            placeGraphics()
2223
```

Appendix D: KidCode® Lingo Client/Server Rebus Message Handling Component Scripts

Page 43

```
          #codIn:
             if getProp(rmG_mailData, #to) <> rmG_userName then
                --- User is not the coder
                layoutText(getat(rmG_msgBody,2), 0) -- coded words white
             else -- user is the coder
                layoutText(getat(rmG_msgBody,2), 6) -- coded words red
             end if
             makeLayoutIndex(getAt(rmG_msgBody, 2))
             placeGraphics()

#gotIt:
             -- hide scrolling symbol palette
             repeat with i = 15 to 20
                -- puppetsprite i, TRUE
                set the visible of sprite i = FALSE
             end repeat
             layoutText(getat(rmG_msgBody,2), 6)   -- coded words white
             makeLayoutIndex(getAt(rmG_msgBody, 2))
             placeGraphics()
             go to "gotIt"
          end case end if else    -- Simulate mode setupSymbolPalette rmG_symbolcastName
       set rmG_state = getAt(rmG_msgBody, 1)
       if rmG_state = #new then       -- user picked a template
          set rmG_msgBody = newMessageBody(whichTemplate)
          layoutText(getAt(rmG_msgBody, 2), 6)    -- 6 is white
          makeLayoutIndex(getAt(rmG_msgBody, 2))
          initializeGuesses     -- uses global var rmG_msgBody
       else    --- don't want to change message body or index
          layoutText(getAt(rmG_msgBody, 2), 0)    -- 0 is white
          makeLayoutIndex(getAt(rmG_msgBody, 2))
          placeGraphics()
       end if
    end if   -- Simulate if mode = #display then
       set the editable of member "To" = FALSE
    else if mode = #author then
       fillToList()

end if return(1)

end msh_openMessage
```

Appendix D: KidCode® Lingo Client/Server Rebus Message Handling Component Scripts Page 44

```
on msh_clearMessage clearMessageSpace
  return(1)
end msh_clearMessage

-- API Public Handlers continued on msh_sendMessage global rmG_msgBody, rmG_mailData, rmG_state, rmG_mode, rmG_userName
  global rmG_noSimulate --IF SIMULATE SEND do everything differently if not rmG_noSimulate then
    simulateSend()
    return(1)
  end if -- called from email main -- next is not sufficient; should check for a valid address
  if the text of member "To" = "" then
    alert "No one to send to...."
    return(0)
  end if -- read header information from fields
  -- back into the message body updateHeader toggleRebusState()
  putGuessesInMsg
  setaProp rmG_mailData, #msgbody, rmG_msgBody --  ADD UPDATED MESSAGE BODY TO rmG_mailData
  -- create a copy for main because we need new rmG_mailData set msgToSend = duplicate(rmG_mailData)

--- prepare MessageSpace to start a new message
  tell the stage to emh_getMessage(0, "rebus")
  set rmG_mailData = the result
  startMessage("default")

--- Fill header fields
```

Appendix D: KidCode® Lingo Client/Server Rebus Message Handling Component Scripts Page 45

```
2330      put getProp(rmG_mailData, #to) into field "To"
2331      put rmG_userName into field "From"
2332      put getProp(rmG_mailData, #date) into field "Date"
2333      put "Rebus Challenge" into field "Re"
2334
2335
2336      if 0 then --old code
2337         set rmG_mode = #display  -- can't edit message further
2338
2339         putGuessesInMsg
2340
2341         -- ADD UPDATED MESSAGE BODY TO rmG_mailData
2342
2343         setaProp rmG_mailData, #msgbody, rmG_msgBody
2344
2345
2346         if 0 then  --- debugging flags
2347            --- email main messageHandler calls resetStage (in main)
2348            --- which should reset rmG_mailData
2349            --- check here to see what has happened
2350            put "IN SendIt; AFTER stage MessageHandler:"
2351            put "Rebus:rmG_mailData = " & rmG_mailData
2352            put "Rebus:rmG_msgBody = " & rmG_msgBody
2353            put "Rebus:rmG_state = " & rmG_state
2354         end if
2355      end if  -- old code
2356
2357      alertSent()
2358      return(msgToSend)   --in old code this was rmG_mailData
2359
2360   end msh_sendMessage
2361
2362
2363
2364   on  msh_replyMessage
2365
2366      global rmG_mailData, rmG_msgBody, rmG_state, rmG_mode, rmG_userName
2367      global rmG_traceFlag
2368
2369      if rmG_traceFlag then
2370         put "In REBUS:msh_replyMessage"
2371      end if
2372
2373      if rmG_state = #gotIt then   --- do nothing and return
2374         alert "You can't reply, please start a new message."
2375         return(0)
2376      end if
2377
2378      --- otherwise process the reply command
2379      -- first swap the fields and reset the mode
2380      set rmG_mode = #author
2381      setProp(rmG_mailData, #to, getProp(rmG_mailData, #from))
2382      setProp(rmG_mailData, #from, rmG_userName)
```

Appendix D: KidCode® Lingo Client/Server Rebus Message Handling Component Scripts

Page 46

```
2383        setProp(rmG_mailData, #re, "Re: " & getProp(rmG_mailData, #re))
2384        openMessage()
2385
2386        return(rmG_mailData)
2387
2388     end msh_replyMessage
2389
2390     ------------------------------------------------------------
2391
2392
2393     on msh_PrintMessage
2394
2395        -- needs to be implmented
2396        return(1)
2397
2398     end msh_PrintMessage
2399
2400     --- script of cast member closeWindow
2401
2402     on mouseUp
2403
2404        -- Close the mailbox window
2405
2406        if soundBusy(1) then sound stop 1
2407
2408        tell the stage to emh_killComponent()
2409
2410     end
2411
2412
2413
2414     --- script of cast member messageSpace
2415
2416     on mouseUp
2417
2418        set textOrigin = the loc of sprite 2
2419        set upLoc = point(the mouseH, the mouseV) - textOrigin
2420        set myword = loctowordpos(member "MessageSpace", upLoc)
2421        set astr = word myword of field "MessageSpace"
2422
2423        if myword > 0 then
2424           if the forecolor of word myword of field "messageSpace" <> 0 then
2425              speak( astr)
2426           end if
2427        end if
2428
2429     end
2430
2431
2432
2433     --- script of cast member symbolButtonUp
2434
2435     on mouseUp
```

Appendix D: KidCode® Lingo Client/Server Rebus Message Handling Component Scripts

Page 47

```
         -- if here then the symbol button was up set the memberNum of sprite 3 = member "SymbolButtonDown"
         hideSymbols()
       end --- script of cast member symbolButtonDown on mouseUp
   --- if here then symbol button was down set the memberNum of sprite 3 = member "SymbolButtonUp"
   showSymbols()
end --- script of cast member guessButtonUp on mouseUp
   -- if here then the guesses button was up set the memberNum of sprite 4 = member "GuessesButtonDown"
   hideGuesses()
end --- script of cast member guessButtonDown on mouseUp
   -- if here then the guesses button was down set the memberNum of sprite 4 = member "GuessesButtonUp"
   showGuesses()
end --- script of cast member templateButtonUp on mouseUp
   global rmG_templates, rmG_theTemplateIndex set nTemplates = count(rmG_templates)
   if rmG_theTemplateIndex = nTemplates then
     set rmG_theTemplateIndex = 1
   else
     set rmG_theTemplateIndex = rmG_theTemplateIndex +1
   end if
```

Appendix D: KidCode® Lingo Client/Server Rebus Message Handling Component Scripts Page 48

```
2489      clearMessageSpace
2490      startMessage(getAt(rmG_templates, rmG_theTemplateIndex))
2491
2492    end
2493
2494
2495
2496    --- script of cast member paletteUpButton
2497
2498    -- scroll up picts button
2499    -- sprites 15 thru 20 are reserved for symbols on
2500    --    scrolling symbol palette
2501
2502    on mouseDown
2503
2504      repeat while the stillDown = TRUE
2505
2506        startTimer   --- control scroll speed
2507
2508        repeat with i = 15 to 20     -- palette sprites
2509          scrollUp sprite i
2510          ---- alternative calling code for behavior
2511          -- set xref = getAt (the scriptInstanceList of sprite i,1)
2512          -- call (#scrollup, xref)
2513        end repeat
2514
2515        -- adjust timing of scroll speed
2516        repeat while the timer < 20
2517          nothing
2518        end repeat
2519
2520        updateStage
2521
2522      end repeat    -- while mouse stilldown
2523
2524    end
2525
2526
2527
2528    --- script of cast member paletteDownButton
2529    -- scroll the symbol palette down
2530
2531    on mouseDown
2532
2533      repeat while the stillDown = TRUE
2534
2535        startTimer   --- control scroll speed
2536
2537        repeat with i = 15 to 20     -- palette sprites
2538          scrolldown sprite i
2539        end repeat
2540
2541        -- adjust timing of scroll speed
```

Appendix D: KidCode® Lingo Client/Server Rebus Message Handling Component Scripts Page 49

```
2542        repeat while the timer < 20
2543          nothing
2544        end repeat
2545
2546        updateStage
2547
2548      end repeat    -- while mouse stilldown
2549
2550    end
2551
2552
2553    --- script of cast member To
2554
2555    on mouseUp
2556      global rmG_mode
2557      -- Pull down student field: change field from
2558      -- up (member 50) to down (member 51)
2559
2560      if rmG_mode = #author then   -- allow changes to to field
2561        set the memberNum of sprite 50 to the number of member "ToDown"
2562      end if
2563
2564    end
2565
2566
2567
2568    --- script of cast member ToDown
2569
2570    on mouseUp
2571
2572      -- Put selected user name into up version of student field
2573      -- and switch the
2574      -- field from down to up
2575
2576      put word 1 of line (the mouseLine) of field "ToDown" into field "To"
2577
2578      set the memberNum of sprite 50 to the number of member "To"
2579
2580    end
2581
2582
2583    -- sample script for symbol cast member
2584    -- each symbol cast member needs this script
2585
2586    on mouseDown
2587      global RGdownLoc
2588      set RGdownLoc = the loc of sprite the clickon
2589    end mouseDown
2590
2591    on mouseUp
2592      global RGdownLoc
2593      symbolClickUp(point(the mouseH, the mouseV), RGdownLoc)
2594    end mouseUp
```

Appendix D: KidCode® Lingo Client/Server Rebus Message Handling Component Scripts Page 50

```
2595
2596 _____
2597
2598
2599 -- sample data structure for a template
2600 -- the elements of this data structure are:
2601    ♦    template sentence
2602    ♦    indices of coded words
2603    ♦    name of symbol cast member
2604    ♦    indices of symbol cast members for default symbol palette
2605
2606 ["His mother scolded him when he threw the ball through the
2607 window.",[7,9,10,12], "UTsymbols",
2608 [135,124,125,126,132,127,128,4,5,133,6,7,8,134,9]]
```

Appendix E: KidCode® API

Page 1

KidCode® Application Programming Interface (API)

This API defines the data and function calls that are used for communication between the KidCode Main Email program and installable components. Each installable component can be one of two types:
- mailbox browser/editor component
- message authoring/display component KidCode Main Email application may communicate with another mail server such as an SMTP compliant server to retrieve and store email messages. Alternatively, the Email Main program may include code for many of the functions normally associated with a mail server program. Whether in conjunction with a mail server, or on its own, the Email Main program handles all functions associated with sending and receiving email messages. This includes reading and writing mailbox files to/from permanent storage or other mail servers on a network (e.g. using POP3), finding and verifying network addresses, and sending mail messages to other servers on a network.

The Main Email Program also provides a GUI that provides interaction with a user for those functions that are directly associated with storage and transfer of electronic mail messages and mailboxes. In particular, the Main Email program includes buttons and/or menu items that allow a user to:
- Send (a message),
- Reply (to a message),
- Open (a message or a mailbox),
- Delete/Trash (messages or mailboxes),
- Save (a message to an alternative mailbox)
- Print (a message)

The Main Email Program also handles all data bundling and unbundling that may be required to transform the message data used by a message authoring component into a fully MIME compliant message type. This way each message authoring component can handle data in a format most convenient to it and all MIME parsing and details associated with protocol compliance can be centralized in the Main Email application. The only requirement for the message data passed between a message authoring component and the Main Email Program is that the message body data be formatted either as an ASCII string or in a binhex format.

The KidCode Main Email program communicates with installable components in order to execute the commands defined above.

Mailbox browser/editor components
Mailbox components are used to display, edit, and browse mailboxes. Different kinds of users and different types of messaging applications (e.g. fax, traditional email, internet voice) may require very different displays and functionality from a mailbox viewer/editor. Installable mailbox components make it possible to upgrade, select from multiple viewing formats, utilize different mailbox viewer/editors for different users, and in general increase the range of functionality that can be achieved within one basic messaging application program.

Message authoring/display components
Message handler components make it possible to handle an unlimited number of message types. Each message handler component is designed to deal with a specific MIME type of message. The MIME data standard has been designed so that application developers can define new MIME types as needed by labeling these with the "/application-x" prefix. A message handler component can be any program that defines a message MIME type of data that it handles and that implements the callback entry points described in this document. These functions allow the Main Email application to obtain information about the message handler and allows the message handler to respond to standard mail commands such as Send

Appendix E: KidCode® API

Page 2 or Reply, that have been issued by a user through the Main Email interface. Example message handler components included in the KidCode application are an ordinary ascii text message handler, a game called Rebus that allows users to create and respond to graphical rebus messages, an a sample mathematics workbook that allows students and a teacher to send workbook problems to one another.

Global variable naming conventions:

Each movie should name its global variables with a prefix that identifies the movie and a capital "G" for "global". We will keep track of each movie's prefix. For now we have the following identifing prefixes:

| component prefix | component | global variable prefix |
|---|---|---|
| em_ | main movie | emG_ |
| tm_ | text movie | tmG_ |
| rm_ | rebus movie | rmG_ |
| cm_ | connect movie | cmG_ |
| tgm_ | text grid movie | tgmG_ |
| pm_ | puzzle movie | pmG_ |
| mbx_ | mailbox movie | mbxG_ |

Appendix E: KidCode® API

Page 3

```
 73  Main Movie Public Data Types
 74
 75  em_ComponentType    symbol = #mailbox or #msgHandler
 76
 77  em_UserName  string
 78
 79  em_UserData struct (
 80              str       UserName
 81              str       FullName
 82              str              ReturnAddress
 83       em_AddressBook   AddressBook
 84       em_MailboxList   Mailboxes
 85              str       SMTPHost
 86              str       POP3Host
 87              str       Password
 88  )
 89
 90  em_MailboxName  string
 91
 92  em_Mailbox struct (
 93           em_mailboxName  boxName
 94           list of emMailData
 95  )
 96
 97  em_RegisteredUsers  list of em_UserName
 98
 99  em_MailData struct (
100           em_Address       To
101           em_Address       From
102              str           Re
103              str           Data
104              str           MimeType
105              list          MsgBody
106  )
107
108  em_MessageNumber int
109
110  em_Mode symbol = #author or #display
111
112  em_ComponentInfo struct (
113              str              ComponentName
114              int              ComponentID
115       em_ComponentType        ComponentType
116              str              ComponentMIMEType  ; nil if mailbox
117  )
118
119
120
```

Appendix E: KidCode® API

Page 4

121 Email Main API Functions
122
123 These functions are called by the installable components to access services provided in the
124 KidCode Main Email program.
125
126
127 /*********************************************************************
128 **/
129 /* emh_getUserMailbox
130 Return a mailbox data structure for the current user and mailbox name. This function is
131 normally called by a mailbox handling component.  Mailbox handling components may use
132 temporary files to hold mailbox contents but they should never access the users mailbox files.
133 All access to these files must be obtained through the Main Email program.
134 */
135
136 em_Mailbox   emh_getUserMailbox (
137             em_MailBoxName
138 )
139
140
141 /*********************************************************************
142 **/
143 /* emh_getUserData
144 Return a data structure with user information. The KidCode Main Email program maintains
145 all user information and handles user administration functions.  The Main program also
146 communication with external Mail servers which may contain other user information not part
147 of the KidCode API.
148 */
149
150 em_UserData emh_getUserData (
151         em_UserName,
152 )
153
154
155 /*********************************************************************
156 **/
157 /* emh_continue
158 Used by installable components to explicitly pass control back to the Main Email program.
159 This function is necessary for the Director/Lingo implementation.
160 */
161
162 void emh_continue (
163         em_ComponentType
164 )
165
166

Appendix E: KidCode® API

Page 5

```
/************************************************************
**/
/* emh_killComponent
Used by an installable component to inform the Main Email program that it is preparing to
terminate. This allows the Main program to free any memory and/or data structures that have
been allocated to the component.
*/ void emh_killComponent (
)

/************************************************************
**/
/* emh_passMessage
Used primarily by mailbox components to pass a message to the Main program so that it can
be displayed by the appropriate message handling component. Email main takes the message
argument (em_MailData, looks up the Mimetype of the message, and invokes the appropriate
message handler to display the message.
*/ void emh_passMessage (
        em_MailData,
        em_MessageNumber
)

/************************************************************
**/
/* emh_getMessage
Returns the message (em_MailData) with Number MessageNumber from the MailboxName
of the current user. Can be used by installable components to retrieve specific messages from
the user's mailboxes.

If this is called with the messageNumber set to 0, email main assume the typeOrBoxName
argument is a mimetype and returns a new message structure. Message handling components
should call emh_getMessage with the number set to 0 and the mimetype whenever a new
message is started. Normally this should be done whenever an active message is trashed.
*/ em_MailData emh_getMessage (
        em_MessageNumber
        str     typeOrBoxName
)
```

Appendix E: KidCode® API

Page 6

```
/*******************************************************
**/
/* emh_getRegisteredUsers
Returns a list of usernames for the users that are registered with the KidCode system, i.e. that
have been added as users by the User Adminstration part of the Main Email Program. This is
the same list of users that appear in the logon listbox when the program is started up. It may
be used by installable components to create listboxes for filling address fields in messages or
for checking on whether a particular address is external to the system.
*/ em_RegisteredUsers emh_getRegisteredUsers (
)

/*******************************************************
**/
/* emh_sendMessage
Email Main sends the message argument (em_MailData) by either forwarding to an external
mail server or, if it is a registered KidCode user, writing the message to the user's incoming
mail mailbox.
*/ void emh_sendMessage (
        em_MailData
)

/*******************************************************
**/
/* emh_saveMessage
Email Main saves the message argument (em_MailData) for the currently logged on user by
writing the message to the user's "notes in progress" mail mailbox.
*/ void emh_saveMessage (
        em_MailData
)

```

Appendix E: KidCode® API

Page 7

```
/************************************************************
**/
/* emh_disableButton
It is recommended that this function be used carefully. Normally Email Main controls the
state of all the buttons available to users to access message handling of the main program (i.e.
buttons in the purple left hand panel). This function can be used to request that Email Main
disable the button specified by the argument, ButtonName. If the button is disabled - whether
it was already disabled or is disabled as a result of the function call - the function will return
TRUE, otherwise it will return FALSE. The calling component should check on whether the
function call succeeded and proceed accordingly.
*/ em_ReturnValue emh_disableButton (
            str             ButtonName
)

/************************************************************
**/
/* emh_enableButton
It is recommended that this function be used carefully. Normally Email Main controls the
state of all the buttons available to users to access message handling of the main program (i.e.
buttons in the purple left hand panel). This function can be used to request that Email Main
enable the button specified by the argument, ButtonName. If the button is enabled - whether
it was already disabled or is disabled as a result of the function call - the function will return
TRUE, otherwise it will return FALSE. The calling component should check on whether the
function call succeeded and proceed accordingly.
*/ em_ReturnValue emh_enableButton (
            str             ButtonName
)
```

Appendix E: KidCode® API

Page 8

API Functions Required Implementation of all Component Types

```
/*******************************************************************
**/
/* emc_startMeUp
Used by Email Main to tell an installable component to start. This function will execute prior
to initialization of the component's data structures. Which should only be intialized after the
component receives the emc_initWindow call from Email Main.
This function is necessary for the Director/Lingo implementation.
*/ em_ReturnValue emc_startMeUp (
)

/*******************************************************************
**/
/* emc_initWindow
Used by Email Main to tell an installable component to initialize it's data structures and
prepare its graphical display. The component is passed the username of the current user. If
it requires additional user information in order to initialize, it can call emh_getUserInfo
within it's implementation of this function.
*/ em_ReturnValue emc_initWindow (
        em_UserName
)

/*******************************************************************
**/
/* emc_closeWindow
Used by Email Main to tell an installable component to free all memory that it has used, close
it's window, and shut down.
*/ em_ReturnValue emc_closeWindow (
)

/*******************************************************************
**/
/* emc_getComponentInfo
Used by Email Main to get required information such as componentName, componentID, etc.
from the installable component.
*/ em_ComponentInfo emc_getComponentInfo (
)
```

API Functions required of a Mailbox Handler Component

```
/*******************************************************************
**/
/* mbx_getMessageNumbers
```

Appendix E: KidCode® API

Page 9

```
Used by Email Main to get the message number of the currently selected message in the
mailbox browser. If no message is selected, the list should be empty.
*/ list of int mbx_getMessageNumbers (
)

/*****************************************************
**/
/* mbx_getMessage
Used by Email Main to get the message data structure of the message with
em_MessageNumber from the mailbox currently displayed in the mailbox browser. If the
function fails, e.g. if there is no message with the given message number, the function returns
an empty list.
*/ em_MailData mbx_getMessage (
        em_MessageNumber
)

/*****************************************************
**/
/* mbx_trashMessages
Used by Email Main to tell the mailbox component to update it's display and it's data
structures to delete messages with messageNumbers in the argument list. If the function fails,
e.g. if one of the message numbers is invalid, the function returns FALSE, otherwise it returns
TRUE. This function should be implemented so that it does not perform partial deletes, i.e.
either it succeeds in deleting all of the messages in the list or it should not delete any message.
*/ em_ReturnValue mbx_trashMessages (
        list of em_MessageNumber
)
```

Appendix E: KidCode® API

Page 10

```
382  /******************************************************
383  **/
384  /* mbx_openMailbox
385  Used by Email Main to tell the mailbox component to display the mailbox passed in the
386  argument.
387  */
388
389  em_ReturnValue mbx_openMailbox (
390          em_Mailbox
391  )
392
393
```

Appendix E: KidCode® API

Page 11

Functions required of a Message Handler Component

```
/*************************************************************
**/
/* msh_sendMessage
Used by Email Main to tell a message handling component to pass back a fully completed
message data structure so that it can be sent to the recipient specified in the message's address
field. The message handling component should update it's display as appropriate for a
message that has been sent. It should also change it's state to #display mode because a
message that has already been sent should not be editable. If the function fails, e.g. if a fully
completed message cannot be constructed (for example, if the user has not specified a
message recipient), the function returns an empty list.

The message handling component will normally control all dialogs with a user that pertain to
the message under construction. For example to alert the user to the fact that a message
recipient is required. However, if the message handling component fails to pass back a
properly formatted, completed message data structure, (or an empty list acknowledging
failure) Email Main will detect the error and alert the user about the field or fields that have
not been specified.
*/ em_MailData  msh_sendMessage (
)

/*************************************************************
**/
/* msh_openMessage
Used by Email Main to pass a message data structure to a message handling component so
that it can be displayed. The message handling component should display the message in the
specified mode - either #author or #display. If the em_Mode argument is #display the
message should not be editable. Otherwise the message should be opened so that it can be
edited.

If the function fails, e.g. if an error is detected in the message body, the message handler
returns FALSE, otherwise the message handler returns TRUE.
*/ em_ReturnValue  msh_openMessage (
        em_MailData
        em_Mode
)

/*************************************************************
**/
/* msh_replyMessage
Used by Email Main to inform a message handling component to display the currently active
message for editing as a reply. In order to reply the message handing component will
generally create a new message with the mode set to #author. The new message body may
contain material from the original message that is being replied to. In addition, message
handling components that handle different player roles may enable or disable various role
specific tools at this time. For example, the Rebus message handler will change the
RebusState of the new message and enable guessboxes as appropriate.
```

Appendix E: KidCode® API

Page 12

```
452    If the function fails, e.g. if an error is detected in the message body, the message handler
453    returns FALSE, otherwise the message handler returns TRUE.
454    */
455
456    em_ReturnValue  msh_replyMessage (
457    )
458
459
460    /************************************************************
461    **/
462    /* msh_clearMessage
463    Used by Email Main to inform a message handling component that the current message
464    should be cleared from the display and from the message handling component's data
465    structures. This function is used, for example, when the user indicates they want to trash the
466    current message by clicking on the "trash" button in the Email Main purple panel.
467
468    If the function fails, the message handler returns FALSE. Otherwise the message handler
469    returns TRUE.
470    */
471
472    em_ReturnValue  msh_clearMessage (
473    )
474
475
```

Appendix E: KidCode® API

Page 13

```
/*******************************************************************
**/
/* msh_printMessage
Used by Email Main to inform a message handling component that a message should be
printed. This function is used, for example, when the user indicates they want to print the
current message by clicking on the "print" button in the Email Main purple panel.
When the argument, em_mailData, is an empty list, the message handler component should
print the currently active message. Otherwise the message handler component should print
the message argument. Normally, if the message handler component has been fully
initialized and is displayed in a window, Email Main will call this function with an empty list
for an argument.

The function may also be used by the Main Email program to have a message handler print a
message even though the message handler component has not been fully initialized and
displayed in a window. For example, this will occur if an active mailbox component receives
a print request from Email Main for a message that has been selected in the mailbox browser.
In this case, Email Main will send a request to the appropriate message handler component to
print the message without fully starting it up and initializing its window. Therefore the
message handler should implement the msh_printMessage function so that the following
sequence of function calls succeeds - emc_startMeUp, msh_printMessage(message).

If the function fails, the message handler returns FALSE. Otherwise the message handler
returns TRUE.
*/ em ReturnValue  msh_printMessage (
        em_MailData
)
```

APPENDIX P

Internet Mail Functionality Programming Notes
doc birth: 12/5/98                                                        12/06/98 7:11 AM

Internet mail messaging infrastructure for client software - pseudocode and specs The Internet mail functionality in the KidCode client software is used to send and receive messages to/from an SMTP/POP3 server on the Internet. Since KidCode is a multiuser client, it includes some mail server-like functionality. If a message recipient is a local user (i.e. a KidCode registered user) then messages are delivered directly to the recipient's mail file.

Sending a message: When a message needs to be sent the KidCode client checks whether the recipient is a local or a remote user. If the recipient is local, the message is written directly to the recipient's mailbox file on the local machine. If the recipient is not a local user, the system opens a SMTP connection and sends the message to the user's SMTP host on the Internet.

Receiving Internet mail: The POP3 protocol is used to receive the user's mail from his Internet POP3 server. When a user goes to open her inbox, the KidCode client opens a connection to the user's POP3 server on the Internet and requests a maildrop. The downloaded messages are MIME decoded and written to the end of the inbox in the user's mail file.

Internet messaging functionality is called in the main email program in the API functions emh_sendMessage and emh_getUserMailbox.

```
--- emh_sendMessage
--- as implemented here, emh_sendMessage opens and closes a
--- SMTP connection to the user's SMTP host each time a message
--- is sent.
...
on emh_sendMessage kcMessage if getOne( getRecipient(kcMessage), vmG_RegisteredUsers) then
-- recipient is local
   messageHandler(#sent)

else  -- recipient should be on the Internet
 set retVal = sendSMTPMessage(kcMessage)
end if if retVal <> 0 then alert("problem sending message to Internet")

end emh_sendMessage
```

Internet Mail Functionality Programming Notes
doc birth: 12/5/98                                    12/06/98 7:12 AM

```
--- emh_getUserMailbox
--- as implemented here, new mail is read from the server each
--- time the inbox is opened by the user.  Alternatively, email
--- main can be setup to check the POP server periodically for
--- new mail regardless of whether the inbox is opened.

on emh_getUserMailbox mailboxName
global emG_userName, emG_userAddress set oldBox = readMailbox(mailboxName)

if mailboxName = "inbox" then
     set newMail = getPOPmail()
     append(newMail, oldBox)
end if return(oldBox)

end emG_getUserMailbox
```

Internet Mail Functionality Programming Notes
doc birth: 12/5/98                                                    12/06/98 7:13 AM Functions used to implement Internet mail standards for client software:

1. SMTP for sending messages
    a) `sendSMTPMessage`
2. POP3 for receiving maildrops
    a) `getPopMail`
3. minimal MIME compliance for message format
    a) translate KidCode message data structure to MIME complaint string
        i) `makeMimeCompliant`
            a) message header maker/checker
            b) `KCtoMime`
    b) MIME decoder to handle the following encoding schemes and translate the message body back to it's unencoded form
        i) `decodeMime`
            a) base64
            b) quoted-printable
            c) 8 bit
            d) 7 bit Internet Mail Functionality Programming Notes
doc birth: 12/5/98

12/06/98 7:13 AM

The function sendSMTPMessage is pseudocode to implement the client side of the SMTP protocol. kcMessage is the message to be sent as coded in the kidCode maildata datastructure.

RemoveNextSMTPdata returns the next characters from the mimeMessage to be sent. I assume it returns up to 998 characters each time it is called. If it is called and there are no more characters to be sent, it returns a single ".".

The code structure used below to handleSMTPerror may not work well. I assume that certain errors will cause the transaction to be aborted and the connection closed. This will need to be rethought carefully. I use it here because it makes the code easy to read and understand.

OpenSMTPConnection implements the first part of the SMTP connection protocol...it may be better to incorporate this part of the protocol directly into the sendSMTPMessage function.

Similarly, CloseSMTPConnection implements the last part of the SMTP protocol.

```
on sendSMTPMessage kcMessage
global emG_SMTPServer, emG_userAddress set mimeMessage = makeMimeCompliant(kcMessage)
set socket = openSMTPConnection(emG_SMTPServer)

-- SMTP accepts SENDER and RECIPIENT fields separately....
-- The remaining MIME message headers are sent as part of the message data.

set retVal = sendLineToSocket("MAIL FROM:" & emG_userAddress
                                              & RETURN & LINEFEED)
if retVal <> "250 OK" then handleSMTPerror(retVal)

--- next only sends a single recipient...it needs to be expanded to
--- handle multiple recipients
set retVal = sendLineToSocket("RCPT TO:" & getRecipient(KCMessage)
                                              & RETURN & LINEFEED)
if retVal <> "250 OK" then handleSMTPerror(retVal)

set retVal = sendLineToSocket("DATA:" & RETURN & LINEFEED)
if retVal <> "250 OK" then handleSMTPerror(retVal)

repeat while nextData <> "." & RETURN & LINEFEED
--- extract the next 998 characters from the messagebody and send them
--- this assumes that removeNextSMTPdata returns a single "."
--- when the message has been completely send, e.g. mimeMessage = ""
    set nextData = removeNextSMTPdata(mimeMessage) & RETURN & LINEFEED
    set retVal = sendLineToSocket(nextdata)
    if retVal <> "250 OK" then handleSMTPerror(retVal)
end repeat CloseSMTPConnection(socket)

if retVal = "250 OK" then return(1) else return(0)
```

Internet Mail Functionality Programming Notes      12/06/98 7:14 AM
doc birth: 12/5/98

```
end sendSMTPMessage
--- GetPOPMail
--- connects to the user's POP server, gets a maildrop,
--- and returns the messages in a list.

on getPopMail
global emG_POPServer, emG_userAddress

-- opens the POP connection and handles user verification
set socket = openPOPconnection(emG_POPServer, emG_userAddress)

--- get mailDrop returns a list of MIME encoded messages from the
--- POP3 server.
set popMailbox = getmailDrop(socket)
set newMail = []

closePOPconnection()

--- need to decode each message before putting it into the
--- user's local mailbox repeat with msg in popMailbox
    set kcMessage = decodeMime(msg)
    append(kcMessage, newMail)
end repeat return(newMail)

end getPopMail
```

Internet Mail Functionality Programming Notes
doc birth: 12/5/98                                    12/06/98 7:14 AM

```
--- MakeMimeCompliant accepts a Kidcode internal mailData
--- structure and returns a data structure (to be determined)
--- that is a mimeCompliant message including headers and Mime
--- encoded message. A lot goes on in this function including
--- handling RETURN characters that are part of the message in
--- such a way as to not mess up SMTP...see the MIME specs document
--- for more on this.

on makeMimeComplaint maildata end makeMimeComplaint

--- decodeMime
--- This function accepts a Mime compliant message and returns a
--- KidCode message data structure to represent the message.
--- The Mime message is decoded (if standard Mime encoding is used).
--- If the content-type of the message is not known, the message
--- body is written to a file in the standard manner of handling
--- attachments. In this event, a text string is written into the
--- message body to indicate the name and location of the file that
--- was written.
--- If the content-type is known, the decoded message body is
--- returned intact in the KidCode message data structure.

on decodeMime mimeMessage end decodeMime
```

The invention claimed is:

1. An electronic mail client embodied in an executable computer-readable medium, comprising:
   a) a plurality of authoring and reading components, a first of said plurality of authoring components for creating a representation of a document including an other than text portion and for creating the other than text portion of the document;
   b) encoding means for automatically encoding said representation created with said authoring components into an Internet-compatible email message; and
   c) decoding means for automatically decoding said representation encoded by said encoding means, wherein said encoding means and said decoding means communicate bidirectionally with said authoring components.

2. An electronic mail client according to claim 1, wherein:
   said plurality of authoring components include at least one installable component.

3. An electronic mail client according to claim 1, wherein:
   said plurality of authoring components includes at least one component selected from the group consisting of a game component, a spreadsheet component, and a graphic editor component wherein at least two of said authoring components provide user interfaces different from each other.

4. An electronic mail client according to claim 1, wherein:
   said plurality of authoring components includes at least one component selected from the group consisting of a database component, a presentation component, and a puzzle component.

5. An electronic mail client according to claim 1, wherein:
   said encoding means includes MIME-compatible encoding means.

6. An electronic mail client according to claim 1, wherein:
   said encoding means includes means for creating a MIME file and means for creating a multipart MIME message,
   each of said authoring component cooperating with said encoding means such that a creation of said MIME file and said multipart MIME message is transparent to a user.

7. An electronic mail client according to claim 6, wherein:
   said decoding means includes means for concatenating a multipart MIME message and means for decoding a MIME file,
   each of said authoring component cooperating with said decoding means such that a concatenation of said multipart MIME message and said decoding of MIME files is transparent to the user.

8. An electronic mail client according to claim 1, further comprising:
   d) a plurality of installable mailbox/browser components, each of said mailbox/browser components displaying different types of documents in a user's mailbox.

9. An electronic mail client according to claim 1, further comprising:
   d) a plurality of installable mailbox/browser components, each of said mailbox/browser components displaying mailbox contents in a different style.

10. An electronic mail client according to claim 1, wherein:
    at least one of said authoring components includes means for recognizing whether a user is an author or a reader and for responding differently to authors and readers.

11. An electronic mail client according to claim 1, wherein:
    at least one of said authoring components includes means for allowing a user to create a read-only document.

12. An electronic mail client for a student and a teacher embodied in an executable computer-readable medium, comprising:
    a) a plurality of authoring components, a first of said plurality of authoring components for creating a representation of a text document and a second of said plurality of authoring components for creating a representation of a document including other than text;
    b) encoding means for automatically encoding representations created with said authoring components into an email message; and
    c) decoding means for automatically decoding said representations encoded with said encoding means, wherein
       at least one of said authoring components includes means for determining whether the user is the student or the teacher.

13. An electronic mail client according to claim 12, wherein:
    said plurality of authoring components include at least one installable component.

14. An electronic mail client according to claim 12, wherein:
    said plurality of authoring components includes at least one component selected from the group consisting of a game component, a workbook component, and a graphic editor component.

15. An electronic mail client according to claim 12, wherein:
    said plurality of authoring components includes at least one component selected from the group consisting of a database component, a presentation component, and a puzzle component.

16. An electronic mail client according to claim 12, wherein:
    said encoding means includes MIME-compatible encoding means.

17. An electronic mail client according to claim 12, wherein:
    said encoding means includes means for creating a MIME file and means for creating a multipart MIME message,
    each of said authoring components cooperating with said encoding means such that a creation of said MIME file and said multipart MIME message is transparent to the student and the teacher.

18. An electronic mail client according to claim 17, wherein:
    said decoding means includes means for concatenating a multipart MIME message and means for decoding a MIME file,
    each of said authoring component cooperating with said decoding means such that a concatenation of said multipart MIME message and said decoding of MIME files is transparent to a user.

19. A method of authoring a document and sending it by electronic mail, said method comprising:
    a) providing a document-authoring component which authors a portion of a document which is other than a plain-text;
    b) providing a document-encoding component which encodes the document as Internet-compatible email;
    c) linking the document-authoring component with the document encoding component such that documents generated under said document-authoring component are automatically encoded as Internet-compatible email.

20. A method according to claim 19, wherein:

said step of providing a document-authoring component includes providing a plurality of document-authoring components, and said step of linking includes linking each of said document authoring components with the document-encoding component.

21. A method according to claim 19, further comprising:

d) providing a document-decoding component which decodes a received document encoded as Internet-compatible email;

c) linking the document-authoring component with the document decoding component such that documents are automatically decoded.

22. A method according to claim 21, wherein:

the document-decoding component includes means for concatenating a multipart MIME message and means for decoding a MIME file.

23. A method according to claim 19, wherein:

the document-encoding component includes means for creating a MIME file and means for creating a multipart MIME message.

24. An electronic mail client, comprising:

a) a plurality of authoring and reading components, each authoring component for creating a different kind of email message;

b) encoding means for automatically encoding email messages created with said authoring components into an Internet-compatible email message with said email message including a message type identifier; and c) decoding means for automatically decoding said email messages encoded by said encoding means, wherein said message type identifier is used to determine which reading component is used to read a decoded email message.

25. An electronic mail client, comprising:

a) a plurality of authoring and reading components for authoring and reading different kinds of documents including documents which have content that is not plain text;

b) encoding means for automatically encoding said documents created with said authoring components into an Internet-compatible email messages;

c) decoding means for automatically decoding said documents encoded by said encoding means; and d) means for determining which of said plurality of reading components are needed to read said documents, wherein said means for determining automatically opens documents with the reading component needed to read it.

* * * * *